(12) United States Patent
Tabieros et al.

(10) Patent No.: US 9,081,747 B1
(45) Date of Patent: Jul. 14, 2015

(54) COMPUTER PROGRAM DEPLOYMENT TO ONE OR MORE TARGET DEVICES

(71) Applicant: Big Bang LLC, Franklin, WI (US)

(72) Inventors: Dennis G. Tabieros, Cudahy, WI (US); Justin R. Shidell, West Allis, WI (US); Patrick E. Garvens, Milwaukee, WI (US); Matthew J. Burger, Milwaukee, WI (US)

(73) Assignee: Big Bang LLC, Franklin, WI (US)

( * ) Notice: Subject to any disclaimer, the term of this patent is extended or adjusted under 35 U.S.C. 154(b) by 308 days.

(21) Appl. No.: 13/787,120

(22) Filed: Mar. 6, 2013

Related U.S. Application Data

(60) Provisional application No. 61/607,432, filed on Mar. 6, 2012.

(51) Int. Cl.
*G06F 15/177* (2006.01)
(52) U.S. Cl.
CPC .................... *G06F 15/177* (2013.01)
(58) Field of Classification Search
CPC .............. G06F 8/60; G06F 8/61; G06F 8/63; G06F 9/44; G06F 9/46; G06F 9/50; G06F 9/445; G06F 9/4411; G06F 9/4416
USPC ....... 709/220, 222; 713/2; 717/174; 719/321; 718/100
See application file for complete search history.

(56) References Cited

U.S. PATENT DOCUMENTS

| | | | |
|---|---|---|---|
| 6,105,063 A | 8/2000 | Hayes, Jr. | |
| 6,725,367 B2 | 4/2004 | Morrison et al. | |
| 6,854,009 B1 | 2/2005 | Hughes | |
| 7,346,910 B1 | 3/2008 | Ahern et al. | |
| 7,398,524 B2 | 7/2008 | Shapiro | |
| 7,441,092 B2 | 10/2008 | Lyon | |
| 7,447,857 B2 | 11/2008 | Lyon | |
| 7,493,627 B2 | 2/2009 | Chambers, Jr. et al. | |
| 7,546,448 B2 * | 6/2009 | Dickens et al. | 713/1 |
| 7,565,517 B1 | 7/2009 | Arbon | |
| 7,574,592 B2 | 8/2009 | Dickens et al. | |
| 7,583,457 B2 | 9/2009 | Miller et al. | |
| 7,631,038 B2 | 12/2009 | Dickens et al. | |
| 7,631,175 B2 | 12/2009 | Dickens et al. | |
| 7,644,264 B1 | 1/2010 | Olsen | |
| 7,653,903 B2 | 1/2010 | Purkeypile et al. | |
| 7,712,094 B2 | 5/2010 | Shapiro | |
| 7,814,126 B2 | 10/2010 | Prabu et al. | |
| 7,886,292 B2 | 2/2011 | Leung et al. | |
| 7,900,002 B2 | 3/2011 | Lyon | |
| 8,037,290 B1 | 10/2011 | Stutton | |
| 8,086,659 B2 | 12/2011 | Steeb et al. | |

(Continued)

*Primary Examiner* — Frantz Jean
(74) *Attorney, Agent, or Firm* — K&L Gates, LLP

(57) ABSTRACT

Each target device to which a full operating system (O/S) or other image is to be deployed using a deployment solution undergoes pre-O/S processing before booting into a temporary O/S, where preparatory processing includes a real-time hardware scan that generates a hardware device ID list that is compared to a driver repository accessed by the target device using a special communication channel between the target device and the driver repository. Drivers corresponding to listed hardware devices IDs are delivered to the target device and are staged by the target device before booting into a full O/S that installs the drivers. During full O/S operation post-deploy processing includes one or more additional real-time hardware scans performed to discover additional hardware devices missed in earlier scans, again with drivers delivered to the target device for installation.

16 Claims, 62 Drawing Sheets

(56) References Cited

U.S. PATENT DOCUMENTS

| | | | |
|---|---|---|---|
| 8,132,186 B1 | 3/2012 | Okcu et al. | |
| 8,146,076 B1 | 3/2012 | Shumway et al. | |
| 8,150,948 B2 | 4/2012 | Andrews et al. | |
| 8,181,186 B1 | 5/2012 | Holcomb et al. | |
| 8,225,309 B2 * | 7/2012 | Zhang et al. | 717/175 |
| 8,245,222 B2 | 8/2012 | Chalupa et al. | |
| 8,306,946 B2 | 11/2012 | Bansode et al. | |
| 8,346,897 B2 | 1/2013 | Jaroker | |
| 8,352,769 B1 | 1/2013 | Ghose et al. | |
| 8,359,590 B2 | 1/2013 | Brannen, Jr. et al. | |
| 8,375,072 B1 | 2/2013 | Burgess et al. | |
| 8,375,361 B2 | 2/2013 | Bell et al. | |
| 2003/0097422 A1 | 5/2003 | Richards et al. | |
| 2004/0117414 A1 | 6/2004 | Braun et al. | |
| 2004/0268292 A1 | 12/2004 | Steeb et al. | |
| 2004/0268340 A1 | 12/2004 | Steeb et al. | |
| 2005/0114854 A1 | 5/2005 | Padisetty et al. | |
| 2005/0172280 A1 | 8/2005 | Ziegler et al. | |
| 2005/0193286 A1 | 9/2005 | Thatte et al. | |
| 2005/0210228 A1 | 9/2005 | Miller et al. | |
| 2005/0240815 A1 | 10/2005 | Purkeypile et al. | |
| 2005/0240931 A1 | 10/2005 | Padisetty et al. | |
| 2006/0074618 A1 | 4/2006 | Miller et al. | |
| 2006/0089995 A1 | 4/2006 | Kerr et al. | |
| 2006/0090136 A1 | 4/2006 | Miller et al. | |
| 2006/0107087 A1 | 5/2006 | Sieroka et al. | |
| 2006/0173893 A1 | 8/2006 | Kristoffersen et al. | |
| 2006/0173894 A1 | 8/2006 | Kristoffersen et al. | |
| 2006/0195678 A1 | 8/2006 | Jalobeanu | |
| 2006/0195839 A1 | 8/2006 | Lin et al. | |
| 2006/0218547 A1 | 9/2006 | Purkeypile et al. | |
| 2007/0061818 A1 * | 3/2007 | Williams et al. | 719/327 |
| 2007/0088630 A1 | 4/2007 | MacLeod et al. | |
| 2007/0101328 A1 | 5/2007 | Baron et al. | |
| 2007/0101342 A1 * | 5/2007 | Flegg et al. | 719/321 |
| 2007/0143783 A1 | 6/2007 | Wagner et al. | |
| 2007/0150886 A1 | 6/2007 | Shapiro | |
| 2007/0150887 A1 | 6/2007 | Shapiro | |
| 2007/0150888 A1 | 6/2007 | Shapiro | |
| 2007/0150889 A1 | 6/2007 | Shapiro | |
| 2007/0150890 A1 | 6/2007 | Shapiro | |
| 2007/0150891 A1 | 6/2007 | Shapiro | |
| 2007/0198652 A1 | 8/2007 | Dickens et al. | |
| 2007/0198819 A1 | 8/2007 | Dickens et al. | |
| 2007/0198820 A1 | 8/2007 | Dickens et al. | |
| 2007/0240154 A1 | 10/2007 | Gerzymisch et al. | |
| 2007/0245135 A1 | 10/2007 | Dickens et al. | |
| 2007/0250671 A1 | 10/2007 | Lyon | |
| 2008/0033902 A1 | 2/2008 | Glaizel et al. | |
| 2008/0040455 A1 | 2/2008 | MacLeod et al. | |
| 2008/0059214 A1 | 3/2008 | Vinberg et al. | |
| 2008/0092134 A1 * | 4/2008 | Zhang et al. | 717/174 |
| 2008/0141242 A1 | 6/2008 | Shapiro | |
| 2008/0155245 A1 | 6/2008 | Lipscombe et al. | |
| 2008/0168111 A1 | 7/2008 | Lyon | |
| 2008/0208933 A1 | 8/2008 | Lyon | |
| 2008/0228506 A1 | 9/2008 | Oates et al. | |
| 2008/0235483 A1 | 9/2008 | Bi et al. | |
| 2008/0244563 A1 | 10/2008 | Sonkin et al. | |
| 2008/0250405 A1 | 10/2008 | Farhangi et al. | |
| 2008/0320594 A1 | 12/2008 | Jiang | |
| 2009/0007095 A1 | 1/2009 | Alverson et al. | |
| 2009/0025004 A1 | 1/2009 | Barnard et al. | |
| 2009/0043778 A1 | 2/2009 | Jambunathan et al. | |
| 2009/0043890 A1 | 2/2009 | Noonan, III | |
| 2009/0144514 A1 | 6/2009 | Lamantia et al. | |
| 2009/0216866 A1 | 8/2009 | Lu et al. | |
| 2009/0307035 A1 | 12/2009 | Steinglass et al. | |
| 2009/0313266 A1 | 12/2009 | Khan et al. | |
| 2009/0319766 A1 | 12/2009 | Ward et al. | |
| 2009/0327465 A1 | 12/2009 | Flegg et al. | |
| 2010/0011203 A1 | 1/2010 | Dickens et al. | |
| 2010/0058105 A1 | 3/2010 | Spence et al. | |
| 2010/0058120 A1 | 3/2010 | Coleman et al. | |
| 2010/0257346 A1 | 10/2010 | Sosnosky et al. | |
| 2010/0333086 A1 | 12/2010 | Prabu et al. | |
| 2011/0191571 A1 | 8/2011 | Perusse, Jr. | |
| 2011/0197053 A1 | 8/2011 | Yan et al. | |
| 2011/0225405 A1 | 9/2011 | Lyons et al. | |

* cited by examiner

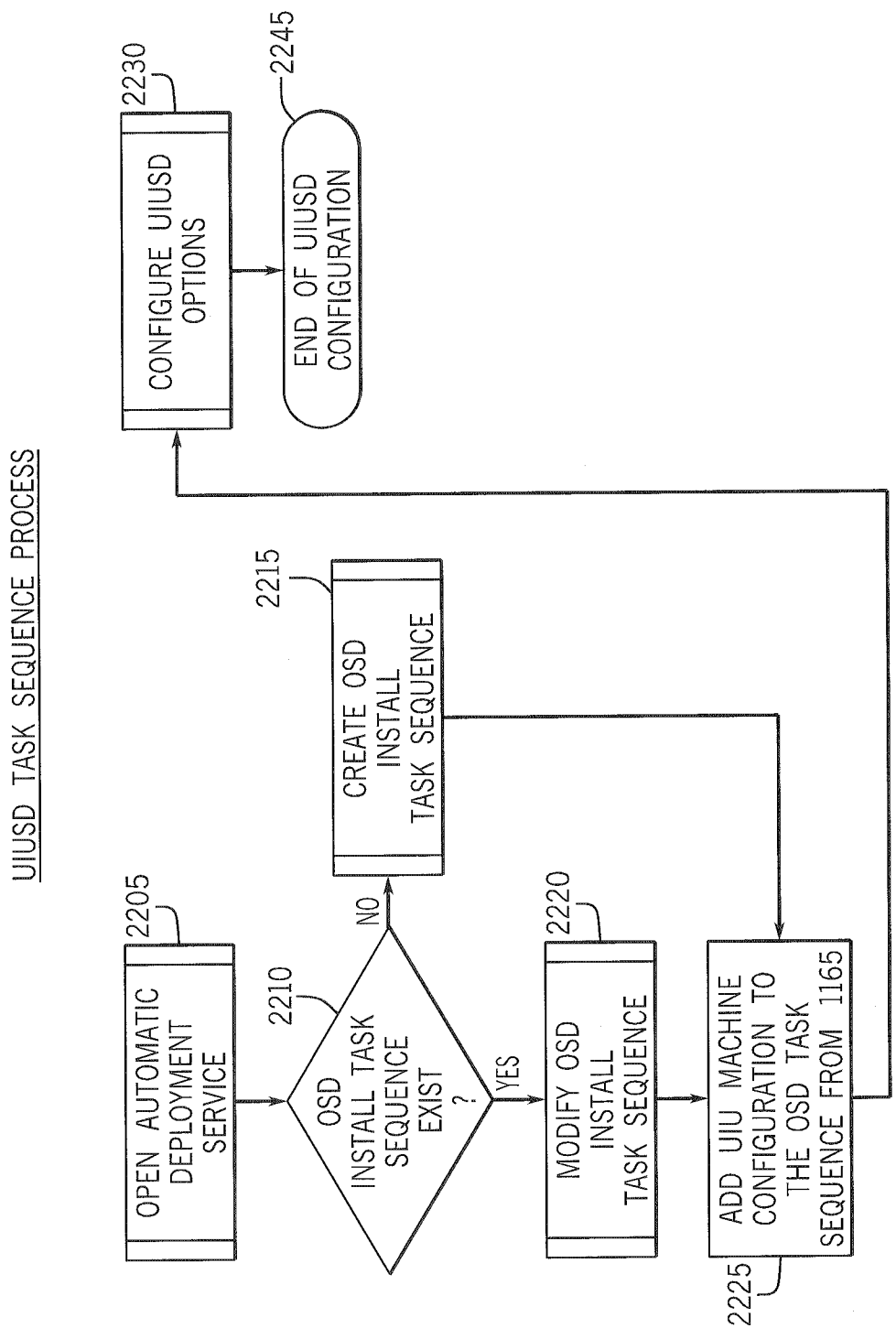

NEW TASK SEQUENCE WIZARD

TASK SEQUENCE INFORMATION

CREATE A NEW TASK SEQUENCE
TASK SEQUENCE INFORMATION
INSTALL WINDOWS
CONFIGURE NETWORK
INSTALL CONFIGMGR
STATE MIGRATION
INCLUDE UPDATES
INSTALL SOFTWARE
SUMMARY
PROGRESS
CONFIRMATION

PROVIDE A NAME AND COMMENT FOR THE TASK SEQUENCE.

TASK SEQUENCE NAME: DEPLOY UIU WIM IMAGE

COMMENT:

BOOT IMAGE: BOOT IMAGE (x86) 6.1.7600.16385 en-U  [BROWSE...]

[< PREVIOUS] [NEXT >]  [FINISH]  [CANCEL]

FIG. 10B

NEW TASK SEQUENCE WIZARD

CONFIGURE THE NETWORK

- CREATE A NEW TASK SEQUENCE
- TASK SEQUENCE INFORMATION
- INSTALL WINDOWS
- CONFIGURE NETWORK
- INSTALL CONFIGMGR
- STATE MIGRATION
- INCLUDE UPDATES
- INSTALL SOFTWARE
- SUMMARY
- PROGRESS
- CONFIRMATION

SELECT THE DOMAIN OR WORKGROUP TO JOIN.

○ JOIN A WORKGROUP
   WORKGROUP: [                    ]

◉ JOIN A DOMAIN
   DOMAIN:     [bblic.local                ] [BROWSE...]
   DOMAIN OU:  [LDAP://OU=example.ou,DC=bblic,DC=local] [BROWSE...]

ENTER THE ACCOUNT WHICH HAS PERMISSION TO JOIN THE DOMAIN.

ACCOUNT: [bblic\administrator] [SET...]

[<PREVIOUS] [NEXT>] [FINISH] [CANCEL]

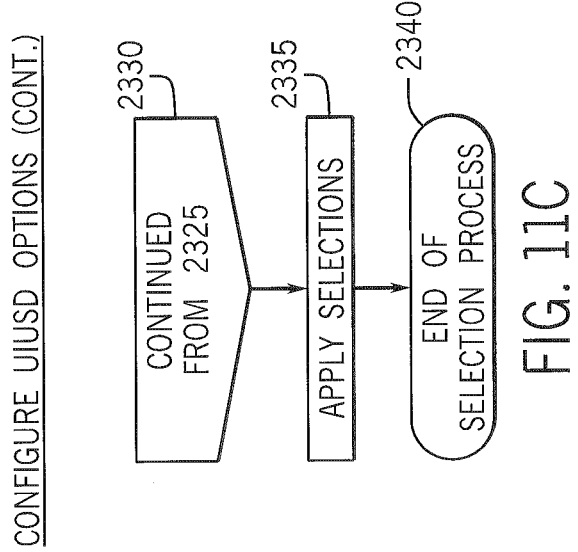

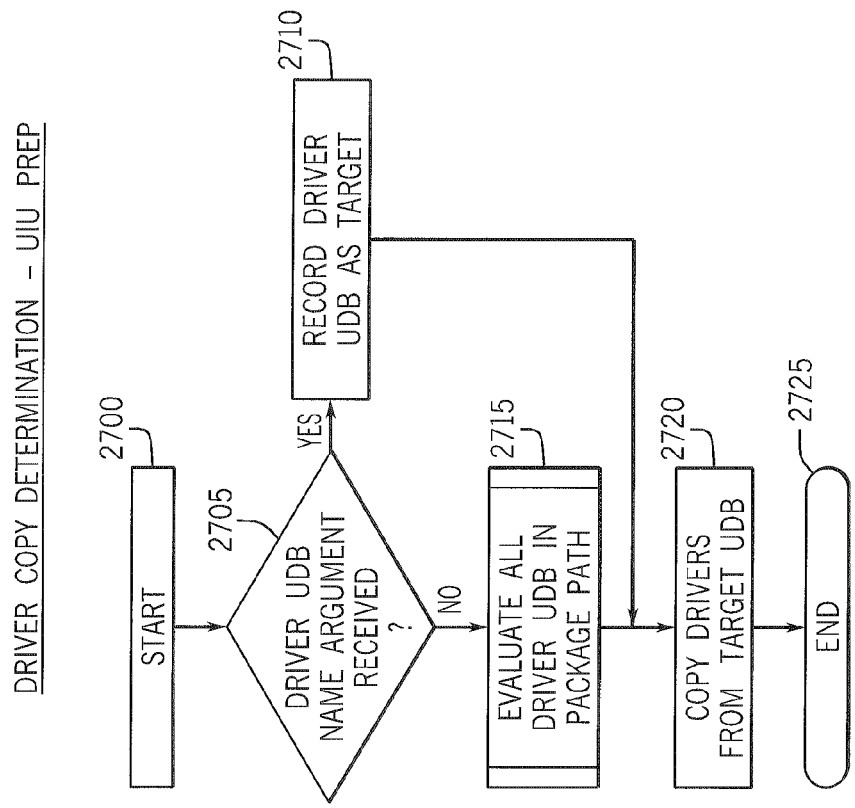

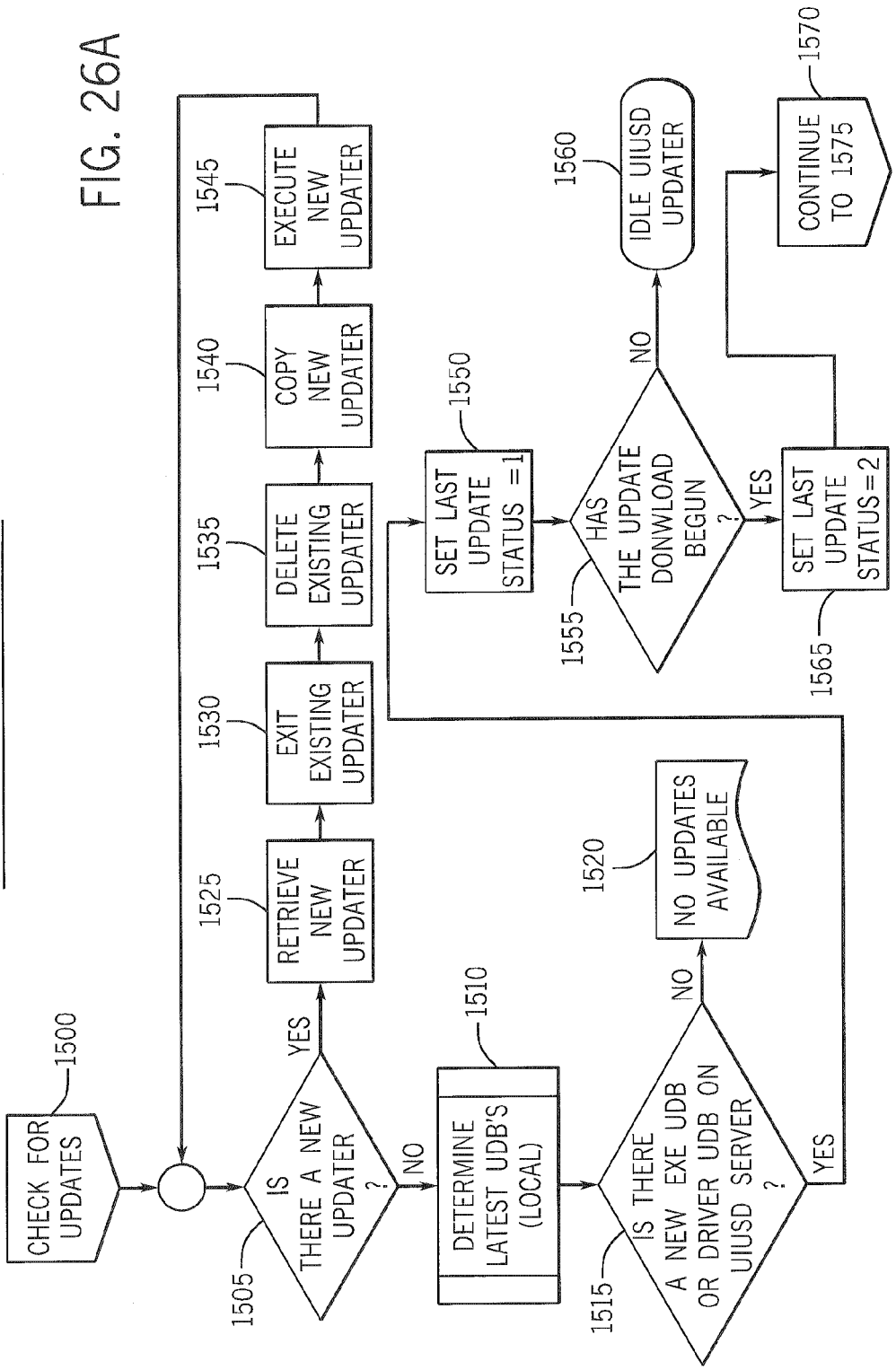

COMPUTER PROGRAM DEPLOYMENT TO ONE OR MORE TARGET DEVICES

PRIORITY CLAIM AND CROSS-REFERENCE TO RELATED APPLICATIONS

This application claims priority to and the benefit of the following prior filed application:

U.S. Ser. No. 61/607,432 filed 6 Mar. 2012, entitled OPERATING SYSTEM DEPLOYMENT. The entire disclosure of that application (including any appendices) is incorporated herein by reference in its entirety for all purposes.

STATEMENT REGARDING FEDERALLY SPONSORED RESEARCH OR DEVELOPMENT

None.

REFERENCE TO SEQUENCE LISTING, A TABLE, OR A COMPUTER PROGRAM LISTING COMPACT DISK APPENDIX

None.

BACKGROUND

1. Technical Field

The present disclosure relates generally to managing computers, including computer networks and devices coupled thereto. Some embodiments are usable with deployment solutions and/or task sequences that are used to deploy operating systems, software and the like to multiple network devices such as computers and to manage such network devices.

2. Description of Related Art

Due to the size and complexity of many operating systems, software and/or image deployment (e.g., installation of an operating system (O/S) on a computer) can be time-consuming and involve many manual steps, thus being expensive in terms of time and required human resources, and subject to human error. Installing additional software on the computer after the operating system is installed makes the installation even more time-consuming. Also, as the number of computers on which operating systems, etc. are being installed increases, the time needed to deploy to all of the computers similarly increases.

To solve some of these problems, systems management software applications and products, including so-called deployment solutions, are used to deploy operating systems (e.g., Microsoft's Systems Management Server (SMS) and System Center Configuration Manager (SCCM)). These software products provide remote control, patch management, software distribution, O/S deployment, network access protection, remote computer administration, etc. However, such earlier approaches to operating system deployment suffer from several shortcomings. Moreover, other deployment solutions like Ghost, ImageX and others also suffer from similar shortcomings. For example, hardware independent imaging solutions present driver-related issues that are cumbersome if not practically impossible to solve. Many device drivers available to imaging solution users are poorly written (e.g., having incorrect or incomplete instructions) and require substantial time to correct and/or verify. Moreover, users encounter problems with the quantity of drivers added to SCCM, for example, with regard to the character length of the DevicePath. Administrators in some prior approaches must create and/or maintain Driver Packages for subsets of PC collections. Networks possessing a large number of PC/machine makes and/or models encounter trouble when the O/S deployment process reaches a limit with regard to what it can handle with drivers and simply (and without error) ceases to consider additional drivers past a given point.

Moreover, although certain drivers are included with any O/S release, all drivers needed to operate all of the various hardware components on all makes and models of a given network's PCs and other machines are not necessarily included in the standard O/S driver set. Consequently, network administrators using previous software products, such as SCCM, must create and maintain their own driver packages, often requiring that they segregate driver packages (e.g., by make and model of machine). Thus an administrator for a modestly sized network can either create and maintain a single driver package containing every driver potentially required by any network machine, or alternatively the administrator must create and maintain driver packages containing subsets of all drivers (e.g., where each driver package is used for a different class of network machines). This imposes a substantial ongoing burden on the network's administrator. In either case, the administrator must have the needed driver package(s) prepared and available prior to O/S deployment requiring access to such driver packages. Beyond creating and maintaining their own driver packages, each administrator also is responsible for only including drivers that are known to be effective in operating the hardware for which they are intended within the context of each operating system for which they are intended. In addition to the burden imposed on the administrator, downloading large driver packages to target devices on the network during O/S deployment can substantially impair the speed and performance of the deployment system by requiring copying and/or transmission of large and sometimes massive driver files. Other problems and shortcomings are well known to those skilled in the art.

It would advantageous to have a methods, apparatus, computer-readable media, etc. to deploy operating systems and the like that would avoid these problems and shortcomings.

SUMMARY

The present invention is readily understood by the following detailed description in conjunction with the accompanying drawings. Embodiments of computer management herein provide automated driver management compatible with a variety of deployment solutions such as Microsoft SCCM, Ghost, ImageX and others. In the SCCM environment, an administrator can advertise a single administrator-configured task sequence to a set of target devices regardless of manufacturer or model. Creation or modification of the task sequence integrates a system deploy package (referred to as a UIUSD Package) with the SCCM console and eliminates the need for SCCM administrators to locate, manage, and package driver files. An updatable driver repository is accessible to target devices via a specialized second communication channel so that real-time hardware scans on target devices can be used to download only drivers matching hardware device IDs found on the target device, in both a preparatory processing phase (in a temporary operating system like Windows Preinstallation Environment, or "WinPE") and in a post-deploy processing phase (in a full operating system like Windows 7, Windows 8, Windows XP, etc.). In addition to drivers based on the results of the preparatory and post-deploy hardware scans, the downloaded drivers can also include drivers requested by an administrator.

Other computer management embodiments integrate with deployment solutions like Ghost, ImageX and others to generate an augmented WinPE boot image that instructs the target device to perform preparatory processing that includes a real-time hardware scan in WinPE and download of corresponding drivers from the driver repository to be installed when the target device boots into a full operating system. Once in the full operating system, post-deploy processing is performed that includes one or more additional hardware scans that find any hardware devices not found in the WinPE hardware scan and download appropriate drivers for the later-discovered hardware.

BRIEF DESCRIPTION OF THE DRAWINGS

Embodiments of the present invention will be readily understood by the following detailed description in conjunction with the accompanying drawings, wherein like reference numerals designate like structural elements, and in which:

FIGS. 9, 10A, 10B, 10C, 10D, 10E, 10F, 10G, 10H, 10I, 10J, 10K, 10L, 10M, 10N, 11A, 11B, 11C and 12 illustrate one or more embodiments for creating or modifying an exemplary task sequence.

FIGS. 13, 14A, 14B, 15, 16, 17A, 17B, 18, 19, 20A, 20B, 21, 22 and 23 illustrate one or more embodiments for deploying a full operating system or the like to a target device set.

FIGS. 24, 25, 26A, 26B, 27, 28A, 28B, 29, 30, 31, 32, 33, 34, 35, 36, 37, 38 and 39 illustrate one or more embodiments for updating an exemplary universal imaging utility system deployment.

DETAILED DESCRIPTION

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

As will be appreciated by those skilled in the art, computer management embodiments include (but are not limited to) operating system deployment and other deployment solution functions. Some embodiments will be referred to as a Universal Imaging Utility System Deploy, "UIUSD" that integrates smoothly and unobtrusively with various deployment solutions and other available software. One example of such a deployment solution is the Microsoft SCCM Configuration Manager Console, which is a systems management software application. Some aspects of SCCM are covered by U.S. Pat. No. 7,814,126, issued to Prabu et al. on 12 Oct. 2010, entitled "Using Task Sequences to Manage Devices"; U.S. Publication No. 2010/0333086, published for Prabu et al. on 30 Dec. 2010, entitled "Using Task Sequences to Manage Devices"; and U.S. Publication No. 2007/0101328, published for Baron et al. on 3 May 2007, entitled "Sequencing a Single Task Sequence Across Multiple Operating Environments" (these are incorporated by reference in their entireties for all purposes).

In an SCCM setting, embodiments are implemented through operating system deployment (OSD) task sequence methodologies and the like, including providing a user interface that is consistent with SCCM Task Sequence implementation, thus reducing the complexity and time required to perform operating system deployment. Some embodiments herein operate independently of SCCM so that processes users have set up in their environment will not be changed (which may be important where a very specific configuration is required for a particular group of machines). This also means that a trial can be installed or uninstalled with confidence that the SCCM environment will not be negatively impacted.

Figure 40:
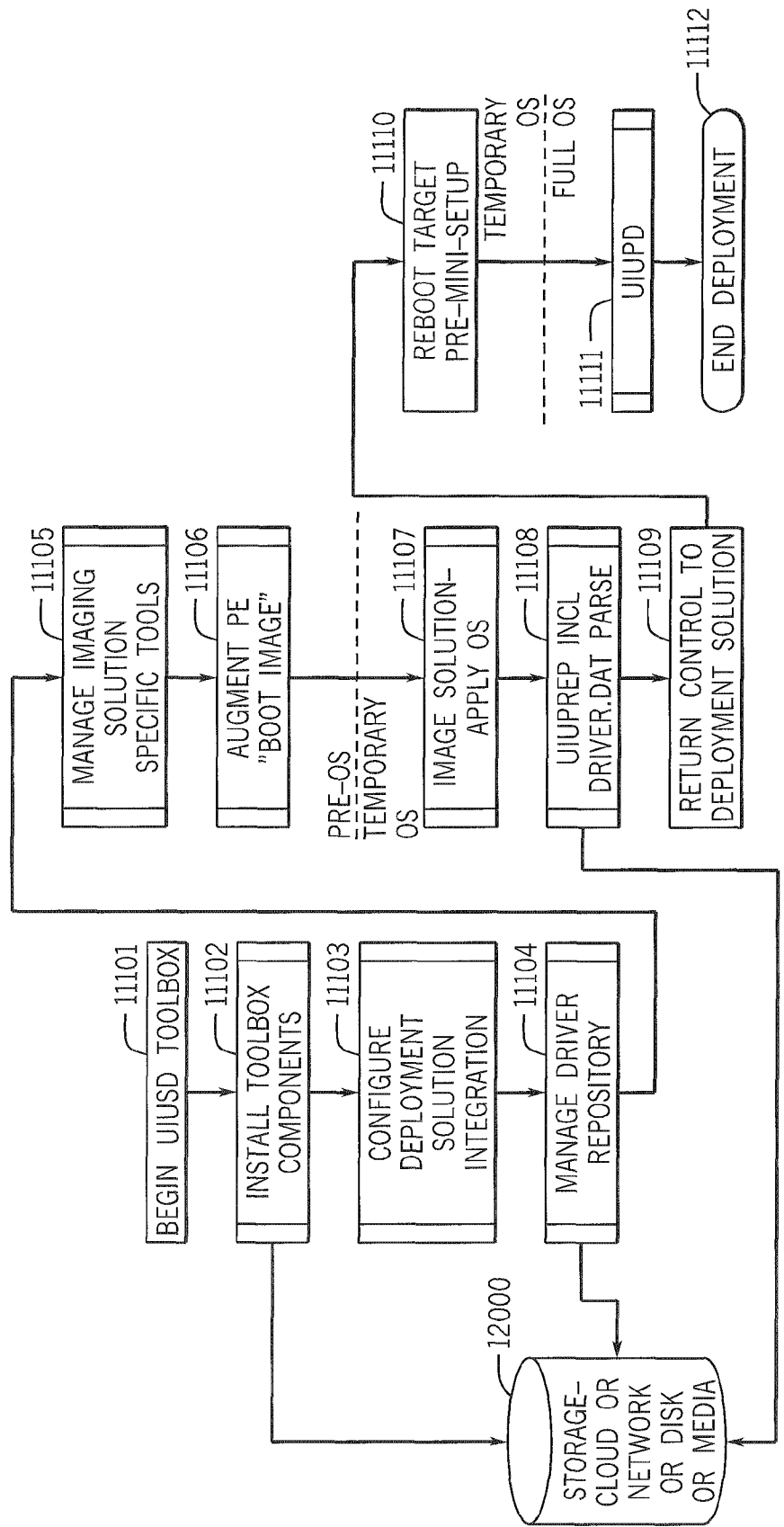
FIG. 40 is a flow diagram illustrating one or more embodiments for deploying an image using an exemplary deployment solution.

Other embodiments of computer management used in connection with deployment solution implementation can integrate with Ghost, ImageX and/or other deployment solutions, using some or all of the same tools used in connection with deployment in SCCM settings. In FIG. 40, steps 11101-11106 are all performed before the target device boots into WinPE or another temporary operating system. Once the target device boots into the temporary operating system, the process essentially follows the same steps/processes as those noted herein for SCCM-related embodiments.

Integrating the UIUSD into an existing management system like SCCM eliminates the need for administrators to locate, manage and package drivers within the OSD framework and enables a task sequence including the UIUSD Machine Configuration step to be easily advertised to any collection of target devices, regardless of hardware used on each target device. When integrated with SCCM in a network, some embodiments of the UIUSD install a UIUSD plug-in and distribute a UIUSD Package to each SCCM distribution point in the network. An existing task sequence can be modified (or a new task sequence created) to include the UIUSD Machine Configuration step (e.g., using parameters associated with the UIUSD Machine Configuration step and selecting the UIUSD Package from the list of packages in the SCCM Software Distribution Point). The resulting Install Task Sequence is advertised to a collection of defined target devices and deployment begins. As the Install Task Sequence is executed by the SCCM Client software, the UIUSD interjects its processes to determine the hardware configuration of each target device, then retrieves and installs drivers for that specific hardware configuration. During execution of the Install Task Sequence, Microsoft Sysprep is engaged to comply with Microsoft's standards for O/S deployment and to detect, compare and enumerate the target device's hardware (the comparison is made between the hardware identifications found on the target device and hardware IDs found in a driver store of the target device O/S). Mini-setup then is invoked by the UIUSD to set the correct HAL (when required, for Windows XP) and install appropriate drivers for each hardware component.

Some embodiments include one or more driver databases provided by an updating service or the like (e.g., one or more full driver databases collected from OEMs (not necessarily PC manufacturers), eliminating unnecessary, proprietary software). Driver database creation, management and maintenance can be an overly cumbersome part of PC deployments. Embodiments herein can include an updating service or the like to validate, maintain, refresh and install thousands of drivers for supported operating systems and the hardware devices using such operating systems, thus eliminating the need for locating and testing drivers for PCs on a network. Such driver databases can be tested for quality assurance by the updating service. In some embodiments, the updating service produces multiple driver database releases per year, allowing for automatic updates of driver databases upon release. The updating service also can allow for automatic update of executables when new versions are released as well. Such updates can be provided online, assuring that users have the most recent and most complete set of drivers when needed, not after discovering that they are missing.

Embodiments of the UIUSD disclosed and claimed herein address driver-related shortcomings of other hardware independent imaging (HII) solutions, including handling (or avoiding) non-standard, poorly written or unsigned drivers. One or more embodiments are configured as a plug-in, but other embodiments also can be implemented. Many drivers are prepared with incorrect or incomplete instructions. Using pre-screened driver databases in embodiments herein avoids such problematic situations and allows for correct driver installation for machines, avoiding scripts and other time-consuming manipulations to address driver problems. Embodiments herein also eliminate concerns over the number of drivers added to SCCM or the like with respect to the character length of the DevicePath, avoiding the need to create or maintain Driver Packages for subsets of PC collections. In networks or other environments with large numbers of PC makes and models, users may add all of the drivers necessary for those machines, only to find that some drivers are not installed. Even though the users have added all of the drivers, once the operating system deployment (OSD) process reaches the limit of what it is prepared to handle, it simply and without error ceases to consider additional drivers past that point. Computer management embodiments herein bypass such issues entirely, making large-scale hardware-independent images more reliable and simple.

Embodiments of operating system deployment and computer management herein also eliminate SCCM's HAL restrictions when "Installing" (deploying) Windows XP images. Deploying Windows XP images with embodiments disclosed herein eliminates restrictions based on HAL type when selecting collections of machines. Once the desired image is selected and deployed, the necessary HAL is installed.

The disk footprint on and setup time experienced by deployed machines (target devices) is reduced in some embodiments by using real-time hardware device discovery to identify and deliver to a target machine only the drivers required by that particular target machine, avoiding downloading of extensive driver package contents and/or files containing unneeded drivers. Thus, when deploying a UIUSD-prepared machine, fewer drivers are brought down to the machine as compared to earlier operating system deployment methods, so less time is spent copying those files and less time is required by Windows Setup to enumerate them properly. Hence, corollary efficiencies are realized regarding bandwidth usage and deployment time requirements for environments that may be sensitive to those factors.

Embodiments of computer management herein fully support SCCM environments with multiple Distribution Points, where a UIUSD Package can be installed on each such SCCM Distribution Point and embodiments disclosed and claimed herein effectively choose the Distribution Point that is most efficient for the target machine for copying files. No additional configuration is required.

Embodiments of computer management herein include computer-implemented methods, processes, plug-ins, systems, apparatus, computer storage media and the like for deploying operating systems and/or other programs and applications for use by multiple computer devices and the like. Some embodiments include one or more of the following: (1) installation of a universal imaging utility system deploy (UIUSD); (2) UIUSD task sequence creation or modification; (3) UIUSD deployment (including deployment preparation, deployment (e.g., of an operating system, a disk image, a software application, etc.), hardware correlation, and post deployment phases in some embodiments); and/or (4) UIUSD updating. These features can be provided in combination, separately and in subgroups of all processes to provide desired UIUSD performance to target devices by a server or the like.

Embodiments of computer management (UIUSD) processes, apparatus, modems, techniques, computer-readable storage media having stored thereon computer-executable code, instructions, etc. will be explained in the context of systems management products and processes (e.g., those created by Microsoft for managing large groups of Windows-based computer systems and the like). Examples include Microsoft Systems Management Server (SMS) and Microsoft System Center Configuration Manager (SCCM). SCCM provides remote control, patch management, software distribution, operating system deployment, network access protection, and hardware and software inventory. In particular, exemplary embodiments of computer management implementing operating system deployment claimed herein help illustrate such integration with SCCM. These computer management systems, apparatus and processes function across physical, virtual and mobile environments and can be used to assess, deploy and update servers, client computers, and other network devices and machines.

Prabu, Baron and similar earlier approaches to operating system and software deployment generally describe management of network devices using task sequences. Such task sequences are executed across multiple operating system environments to implement new operating system images and the like in some embodiments. Prabu can be summarized as including the following:

Target computing devices implementing task sequence management interact with automated deployment services; wherein the target devices operate in three basic modes:
   1—using a pre-boot component such as PXE in each target device that allows the target device to communicate with a controller prior to installation or execution of a temporary operating system on the target device. A network boot program can be used by the target device and a PXE service in an automated deployment service. PXE prepares the target device to accept and execute a temporary operating system like WinPE.
   2—using a "temporary" operating system such as Window Preinstallation Environment or "WinPE" (also referred to as all or part of a "deployment agent" in Prabu). WinPE allows rudimentary code to be executed through instructions from the automated deployment service (e.g., located in a network server), including things like copying files and modifying registry settings for use in a full operating system.

3—using a "full" operating system (e.g., Windows 7, Windows 8 or Windows XP) after its installation and execution on the target device; using this full operating system, software such as Microsoft SCCM Client performs additional functions defined by a task sequence with the increased capabilities of the full O/S code set.

Processes shown in Prabu and the like, and used in connection with computer management embodiments described herein, can be broken down into these several modes.

The temporary O/S can be the Windows Preinstallation Environment (or "Windows PE" or "WinPE"), which is a "lighter" operating system with limited services used, inter alia, for deployment of workstations and servers and can be booted via PXE and/or appropriate media. Other suitable temporary operating systems are well known to those skilled in the art. The temporary operating system, also referred to in Prabu as being or being part of the "deployment agent," when running on a target device 102, creates an environment for installing the full operating system on the target device.

The full O/S can be any of a number of operating systems well known to those skilled in the art (e.g., Windows XP, Vista, Windows 7 Windows 8, and Windows Thin PC). These can be stored as images and controlled by the Image Distribution Service (IDS) 206 of FIG. 4, as described therein and in more detail below.

With the background of Prabu and Baron in mind, embodiments of the present invention will be described in the context of this general management operation from Prabu and the like, though other modes of implementing embodiments of the present invention will be apparent to and understood by those skilled in the art.

Figure 1:
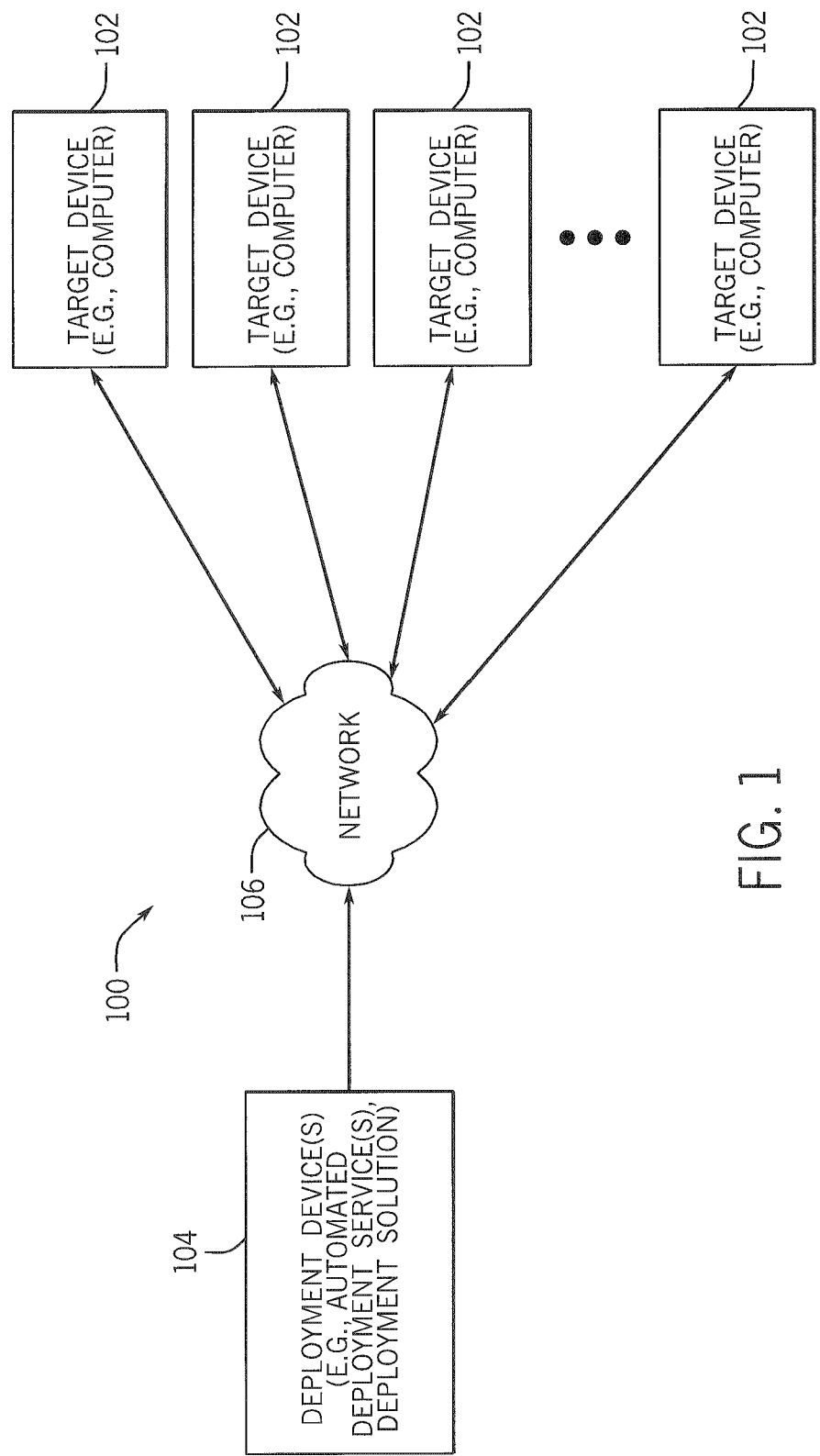
FIG. 1 illustrates an exemplary network.

FIG. 1 illustrates an exemplary network environment 100 in which multiple computing devices 102 and one or more automated deployment services (ADSs) 104 are coupled to a network 106. Network 106 is intended to represent any of a variety of conventional network topologies and types (including wire and/or wireless), employing any of a variety of conventional network protocols (including public and/or proprietary protocols). Network 106 may include, for example, a local area network (LAN), a wide area network (WAN), portions of the Internet, and so forth. Environment 100 represents any of a wide variety of environments, including, for example, data centers (e.g., Internet data centers), office or business environments, home environments, educational or research facilities, retail or sales environments, and so forth. Devices 102 can be any of a variety of conventional computing devices, including desktop PCs, workstations, mainframe computers, server computers, Internet appliances, gaming consoles, handheld computers, cellular telephones, personal digital assistants (PDAs), etc. Some devices 102 can be of the same type or alternatively different types of devices. Even if multiple devices are the same types of devices, the multiple devices may still be configured differently (e.g., having different hardware configurations, such as different processors, different RAM, different hard disk drive sizes).

Figure 2:
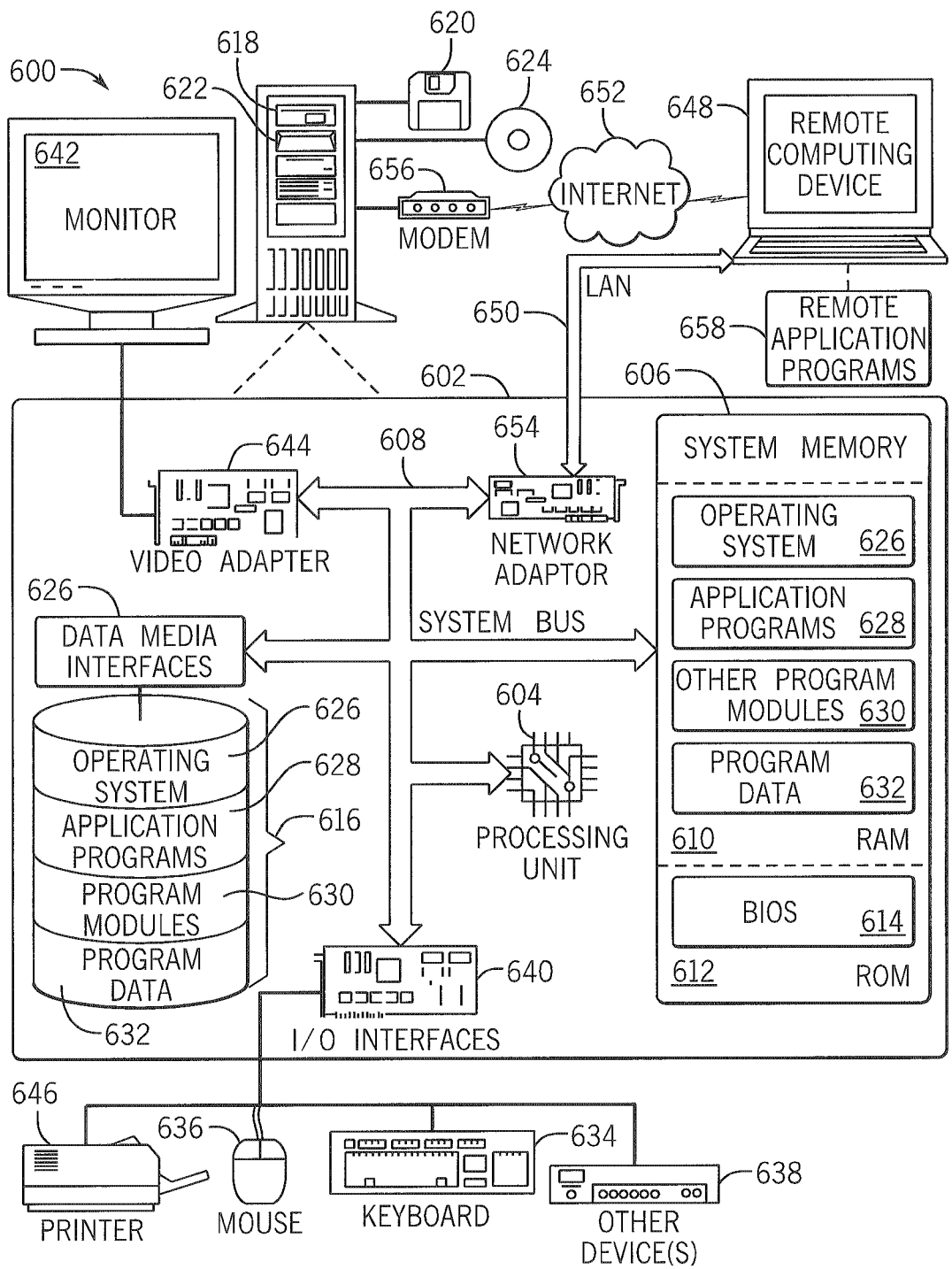
FIG. 2 illustrates a general computer device or environment that can be used to implement one or more embodiments herein.

ADSs 104 represent one or more computing devices that manage the configuration of and installation of software on devices 102, all of which can be managed by the same ADS, or alternatively by multiple services 104 with different services 104 managing different devices 102. During operation, one or more devices 102 can be added to environment 100 and/or reconfigured, for example by being automatically configured and having software (e.g., an O/S) automatically installed on a device 102 by ADSs 104 (multiple devices 102 added/reconfigured can be managed simultaneously by ADSs 104). A particular device 102 may operate for a period of time (e.g., minutes, hours, days, months) after which a different function is desired (e.g., change from being a server computer to a workstation computer, from a web server to a local file server). Each device 102 and/or ADSs 104 can possess one or more features of the exemplary computer assembly 600 of FIG. 2, which implies no limitation as to the use or functionality of computer and network architectures. Assembly 600 includes a general-purpose computing device in the form of computer 602 (e.g., being a computing device 10 or an ADS 104 of FIG. 1 or FIG. 4, or implementing an ADS). Computer 602 can include, but is not limited to, one or more processors or processing units 604, system memory 606, and a system bus 608 coupling various system components including connecting the processor 604 to the system memory 606. System bus 608 can be one or more of any of several types of bus structures, including a memory bus or memory controller, a peripheral bus, an accelerated graphics port, and a processor or local bus using any of a variety of bus architectures. Such architectures can include, e.g., an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media (includes both volatile and non-volatile media, removable and non-removable media), which can be any available media accessible by computer 602. System memory 606 (and any other memory referenced herein) includes computer readable media in the form of volatile memory, such as random access memory (RAM) 610, and/or non-volatile memory, such as read only memory (ROM) 612. A basic input/output system (BIOS) 614 contains basic routines to help transfer data between elements in computer 602, such as during start-up, and is stored in ROM 612 (which typically contains data and/or program modules that are immediately accessible to and/or presently operated on by processing unit 604). Computer 602 also can include other removable/non-removable, volatile/non-volatile computer storage media (e.g., a hard disk drive 616 for reading from and writing to a non-removable, non-volatile magnetic media, a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media). Hard disk drive 616, magnetic disk drive 618, and optical disk drive 622 are each connected to system bus 608 by one or more data media interfaces 626. Alternatively, hard disk drive 616, magnetic disk drive 618, and optical disk drive 622 can be connected to system bus 608 by one or more interfaces.

The disk drives and their associated computer-readable media provide non-volatile storage of computer readable instructions, data structures, program modules, and other data for computer 602. Although the example shows hard disk 616, magnetic disk 620, and optical disk 624, other types of computer readable media that can store computer-accessible data can also be used to implement the exemplary computing system and environment (e.g., as magnetic cassettes, other magnetic storage devices, flash memory cards, CD-ROM, digital versatile disks (DVD), other optical storage, random access memories (RAM), read only memories (ROM), electrically erasable programmable read-only memory (EEPROM), etc.). One or more program modules can be stored on hard disk 616, magnetic disk 620, optical disk 624, ROM 612, and/or RAM 610, including, for example, an O/S 626, one or more application programs 628, other program modules 630, and program data 632, each of which (or some combination thereof) can implement all or part of the resident components that support the distributed file system.

A user can enter commands and information into computer 602 via input devices like keyboard 634 and pointing device ("mouse") 636. Other input devices 638 can include a microphone, joystick, game pad, satellite dish, serial port, scanner, etc. connected to processing unit 604 via input/output interfaces 640 coupled to system bus 608 or connected by other interface and bus structures, such as a parallel port, game port, or a universal serial bus (USB). A monitor 642 or other display device can be connected to system bus 608 via an interface, such as a video adapter 644. In addition to monitor 642, other output peripheral devices can include components such as speakers and a printer 646 be connected to computer 602 via I/O interfaces 640.

Computer 602 operates in a networked environment using logical connections to one or more remote computers, such as a remote computing device 648, examples of which are a personal computer, portable computer, a server, a router, a network computer, a peer device or other common network node, etc. Remote device 648 is illustrated as a portable computer that can include many or all of the elements and features described herein relative to computer 602. Logical connections between computer 602 and remote computer 648 are shown as LAN 650 and WAN 652. Such networking environments are commonplace in offices, enterprise-wide computer networks, intranets, and the Internet. When implemented in a LAN environment, computer 602 is connected to a local network 650 via a network interface or adapter 654. When implemented in a WAN environment, computer 602 typically includes a modem 656 or other means for communicating over the wide network 652 and can be internal or external to computer 602, and connected to system bus 608 via I/O interfaces 640 or other appropriate means. These illustrated network connections are exemplary and that other means of establishing communication link(s) between the computers 602 and 648 can be employed.

In a networked environment like environment 600, program modules shown with computer 602, or portions thereof, may be stored in a remote memory storage device. For example, remote application programs 658 reside on a memory device of remote computer 648. For purposes of illustration, application programs and other executable program components such as one or more operating systems are illustrated as discrete blocks, though such programs and components can reside at various times in different storage components of device 602 and are executed by the computer data processor(s). Modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 3:
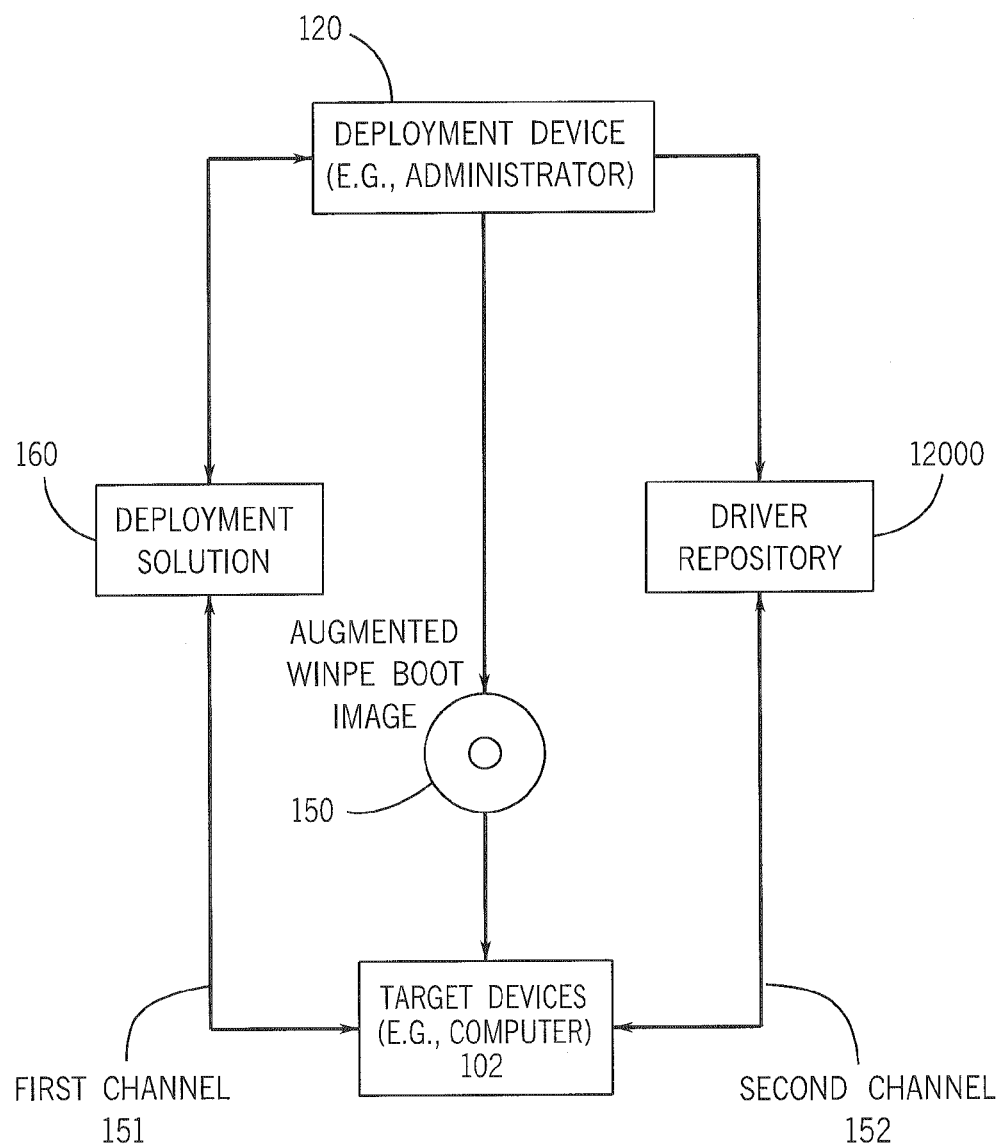
FIG. 3 illustrates one or more embodiments of computer management used in connection with a deployment solution and one or more target devices.

Embodiments of computer management herein can be implemented in a generic deployment solution setting as shown in FIG. 3, where one or more deployment devices 120 (e.g., under the control of a network administrator or the like) can communicate and interact with a given deployment solution 160 and a driver repository 12000 (a "driver repository" is also referred to herein as a "driver database" or driver storage location or the like). Using embodiments of the present invention, the deployment device(s) 120 generates an augmented boot image 150 of a temporary operating system that operates in a preinstallation environment (e.g., WinPE). This augmented boot image can then be delivered to one or more target devices 102 for deployment of an operating system or other software, etc. Each target device 102, through preparatory and post-deploy processing described herein, then interacts with the deployment solution 160 using a first (deployment solution) channel 151 and interacts with the driver repository 12000 via a second (driver repository) channel 152. A specific example of this is described in connection with the Microsoft SCCM systems management software application below.

Figure 4:
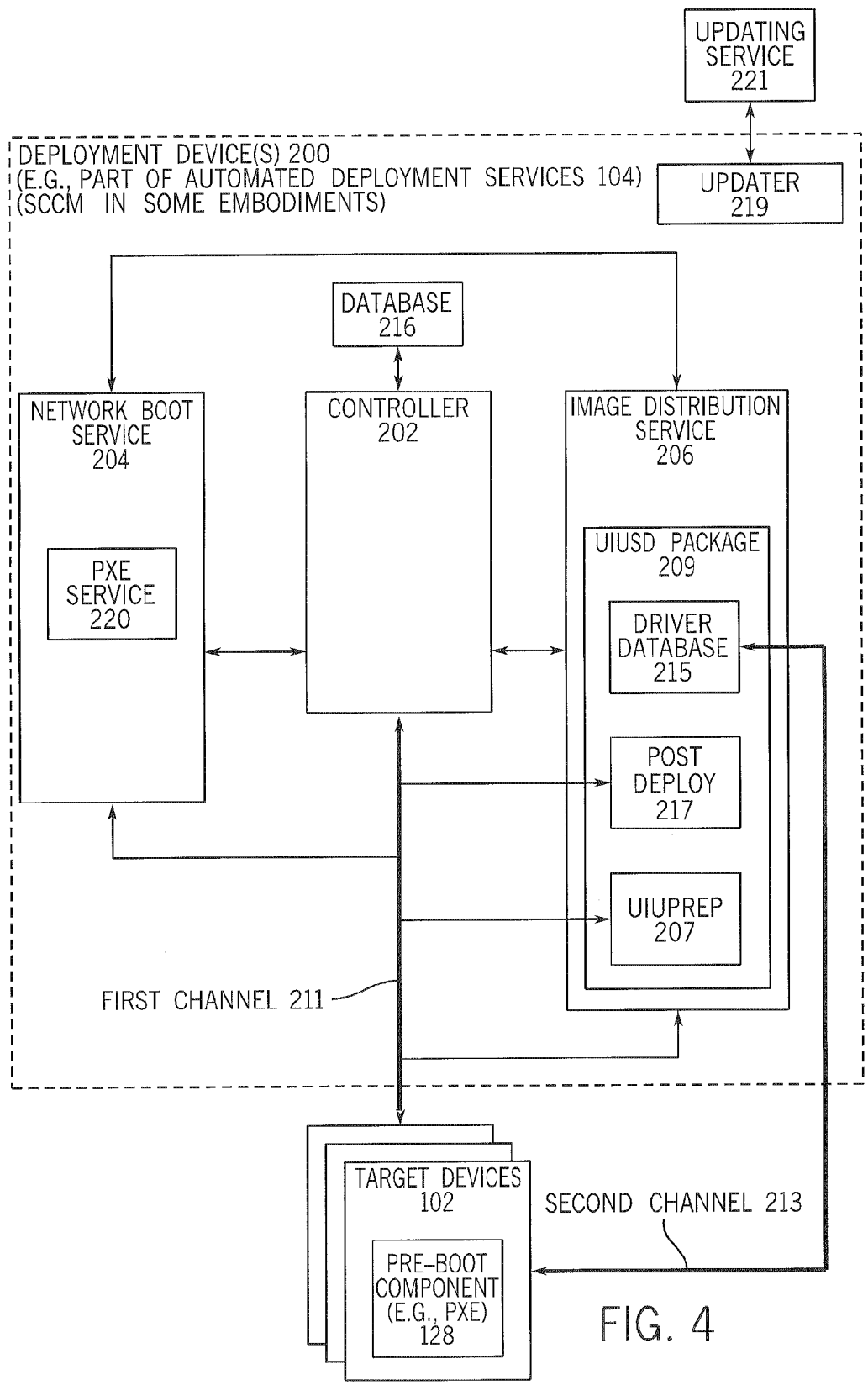
FIG. 4 illustrates one or more embodiments of computer management including an exemplary deployment device and/or automated deployment service.

FIG. 4 shows an exemplary deployment device 200 that can function as part of the automated deployment services (ADS) 104 of FIG. 1. Device 200 (which in some embodiments can be one or more network servers, one or more SCCM Distribution Points, etc.) includes a controller 202, a network boot service (NBS) 204, and an image distribution service (IDS) 206 and manages the configuration of and software installation on computing devices 102. Software installed on devices 102 typically includes an operating system and/or one or more other application programs. Controller 202, NBS 204, and IDS 206 can be deployed on the same device or across multiple devices. In some embodiments, a sequence of tasks (task sequences are well known to those skilled in the art) can be defined that describes what actions are to be taken by device 200 in configuring and/or installing software on a particular device 102.

Controller 202 is a control point for devices 102, 200 and keeps a record of devices 102 managed by deployment device 200, action taken by device 200 each time a device 102 is booted, and operations performed on each device 102. NBS 204 enables a device 102 to boot up as desired by NBS 204 (e.g., booting to an O/S on a disk of device 102, a virtual floppy on device 102, or to a deployment agent (temporary operating system) at device 102). NBS 204 detects when a device 102 is being booted, and optionally tells the device how it should boot (based on information received by controller 202). NBS 204 also can generate and/or download to a device 102 one or more programs to be executed in deploying an operating system. IDS 206 stores images that can be deployed onto the hard disks of devices 102, e.g., images used to install an O/S on a device 102.

Each device 102 includes a pre-boot component 128 that allows device 102 to communicate with controller 202 prior to any temporary or full operating system being executed on device 102 (and prior to any O/S being installed on device 102). Pre-boot component 128 can be implemented in hardware, software, firmware, or combinations thereof (e.g., implemented per the Preboot Execution Environment (PXE) Specification Version 2.1 (or alternatively other versions), from Intel Corp. of Santa Clara, Calif.).

Using the exemplary system of FIG. 4, an operating system can be deployed by deployment device 200 on one or more devices 102 using a process implemented in software, firmware, hardware, or combinations thereof. Initially, a device 102 is powered and notifies deployment device 200, for example using a PXE request is issued as part of a DHCP (Dynamic Host Configuration Protocol) message request (by setting an option in the DHCP message request identifying the requesting device 102 as a PXE client). NBS 204 in conjunction with controller 202 configures device 102's firmware. Different aspects of the firmware of the computing device 102 (e.g., BIOS (Basic Input/Output System) parameters, RAID (Redundant Array of Independent Disks) parameters) can be configured in different ways, for example by a system administrator where an automated deployment service is employed. Pre-O/S configuration implemented in different manners, for example using a set of instructions (e.g., software program(s)) downloaded from NBS 204 to device 102 that includes instructions causing the firmware of device 102 to be configured as desired when executed by device 102, or an instruction set that receives commands over the network from NBS 204 may be executed by device 102. After device 102 firmware is configured, device 102 may optionally be re-booted, after which additional programs may be copied to device 102, such as a temporary operating system (referred to in Prabu as a "deployment agent," such as WinPE), to facilitate downloading of a full operating system image.

The full operating system can be downloaded to device 102 as an operating system image copied from IDS 206 to the device 102, along with instructions to perform temporary operating system preparatory processing (referred to as "UIUPrep" herein). Once UIUPrep has been performed (including a real-time hardware scan of the target device, downloading of drivers for hardware found in the real-time scan, and the staging of any downloaded drivers), the device 102 is booted into the newly downloaded full operating system. The drivers downloaded as a result of the UIUPrep preparatory processing are installed and post-deploy processing (referred to as "UIUPD") is performed (including a real-time hardware scan of the target device while operating in the full operating system, downloading of drivers for new hardware found in the most recent real-time scan, and the staging of any downloaded drivers). The target device 102 is booted again into the full operating system and any staged drivers are installed. UIUPD can be performed iteratively until no new hardware devices are found. Other parameters for and additional configuration of the operating system for the target device 102 can then be initiated as desired (e.g., configuring the name of the device, passwords and/or user IDs, a static IP address, etc.).

FIG. 4 illustrates exemplary components of a deployment device 200, for example as used in an automated deployment service. Device 200 of FIG. 4 is an example implementation and includes a controller 202, network boot service (NBS) 204, and image distribution service (IDS) 206, which are analogous to and operate analogous to controller 202, network boot service 204, and image distribution service 127 of FIG. 2.

Controller 202 can include a Windows Management Instrumentation (WMI) interface, a controller service, and an auto-discovery component and be coupled to a database 216, which is a relational database maintaining information related to devices 102 managed by controller 202 and task sequences that can be performed on those devices. A WMI interface is an object model interface providing an object model of database; information can be obtained from database 216 by way of the WMI interface. The controller service is a control module that manages communications with the IDS 206 and NBS 204, and also manages task sequences, maintaining a record of what step(s) are currently being performed on devices 102 and what step(s) are next to be performed on devices 102 in deploying software to the devices 102. An auto-discovery component receives notifications from devices 102 as the devices are booting (e.g., from operating systems booting on the devices 102). Such notifications allow devices 102 to be identified by controller 202. Controller service 212 maintains a record (e.g., in database 216) of devices that controller 202 manages, and auto-discovery allows the controller service to identify devices currently running on the network and/or devices that have just been booted on the network. Auto-discovery (and/or a PXE service discussed below) also allows a controller service to determine when a device 102 has just been booted on the network, allowing controller service to know that it should check for steps to be performed on the device.

NBS 204 can include a Preboot Execution Environment (PXE) service 220, a Trivial File Transfer Protocol (TFTP) service, and a deployment agent builder service. PXE service 220 detects PXE requests from devices 102, and communicates with controller 202 to determine what action to take in response to each PXE request. Information regarding actions to take in response to PXE requests can also be received from controller 202 and cached in NBS 204. Action taken in response to a particular PXE request may involve a response being sent from NBS 204 to a requesting device 102 informing it of particular actions to take, or the PXE request can be ignored. A TFTP service is a file server that downloads requested files to devices 102, for example files generated at NBS 204 (e.g., by a deployment agent builder service), or obtained by the TFTP service elsewhere (e.g., database 216). NBS 204 may also maintain a cache of files previously downloaded to a device 102, and the TFTP service may access this cache to obtain the files for download to a requesting device 102. A deployment agent builder service dynamically builds a temporary operating system (deployment agent) for a particular device 102 based on information describing the particular device 102. A loader runs on each device 102 and returns to NBS 204 information describing the device 102, (e.g., installed hardware for which drivers are needed to run the temporary operating system on that device 102). This temporary operating system, when running on a device 102, creates an environment from which a full operating system can be installed, as discussed below.

As can be seen in FIG. 4, a UIUSD Package 209 has been installed in the IDS 206. This UIUSD Package 209 includes a driver repository 215 (also referred to as a driver database), a post-deploy processing (UIUPD) unit 217 and a preparatory processing (UIUPrep) 207 unit. During operating system deployment or the like, the deployment device 200 will deliver an image to each target device 102 according to SCCM operation. This delivery of the image will also include one or more features obtained from the UIUSD Package 209, including instructions, commands, code and/or other information to allow each target device 102 to perform preparatory processing (UIUPrep) and (in some case iterative) post-deploy processing (UIUPD) as part of the deployment of an operating system to each target device 102. As described below in more detail, this preparatory and post-deploy processing will allow each target device 102 to deploy its operating system or other software using hardware scans, driver downloads and other features of computer management disclosed and claimed herein.

FIG. 4 illustrates the use of 2 different communication channels for deployment. The standard SCCM communications and/or exchanges between each target device 102 and the deployment device 200 are performed using a standard SCCM channel (referred to as the "first communication channel" 211 in FIG. 4). That is, whether it is communicating with the controller 202, NBS 204 or IDS 206, each target device 102 uses the standard SCCM deployment device locations and protocols for much of the deployment process. However, during UIUPrep preparatory processing and UIUPD post-deploy processing, when each target device 102 is communicating with the driver repository 215 to identify and download drivers needed for each target device's specific hardware configuration, a specialized communication channel is used (referred to as the "second communication channel" 213 in FIG. 4). This alternative communication means assists with interaction between each target device 102 and the UIUSD Package 209 that distinguishes embodiments of computer management herein from earlier versions of SCCM and/or other deployment solutions. The second channel also allows computer management embodiments herein to work with one or more driver repositories that are implemented in different places and ways—for example, a given driver repository can be a memory installed on a deployment device (as shown in FIG. 4), a memory accessed using a Universal Naming Convention storage location, and/or a memory installed on an SCCM Distribution Point.

Processes shown in Prabu and the like, and used in connection with computer management embodiments described herein, can be broken down into several phases or segments for convenience. Activity in the pre-boot environment (i.e., before a temporary or full operating system is operating) is generally used to prepare a task sequence, prepare a powered-on target device, and then download the temporary operating system to the target device, for example as described in Prabu. Likewise activity relating to the temporary operating system environment includes downloading and executing the SCCM Client or the like, delivering the task sequence to the target device using the first communication channel, that is the channel defined and used by the deployment solution, here SCCM for example. The UIUPrep preparatory processing is performed in the target device in the temporary operating system and utilizes the second communication channel 213 as described below, and is generally described with regard to steps 314 to 326 in FIG. 5B. Finally, activity relating to the full operating system, including post-deploy processing (UIUPD) is described generally with regard to steps 328 to 332 in FIG. 5C.

Figure 5A:
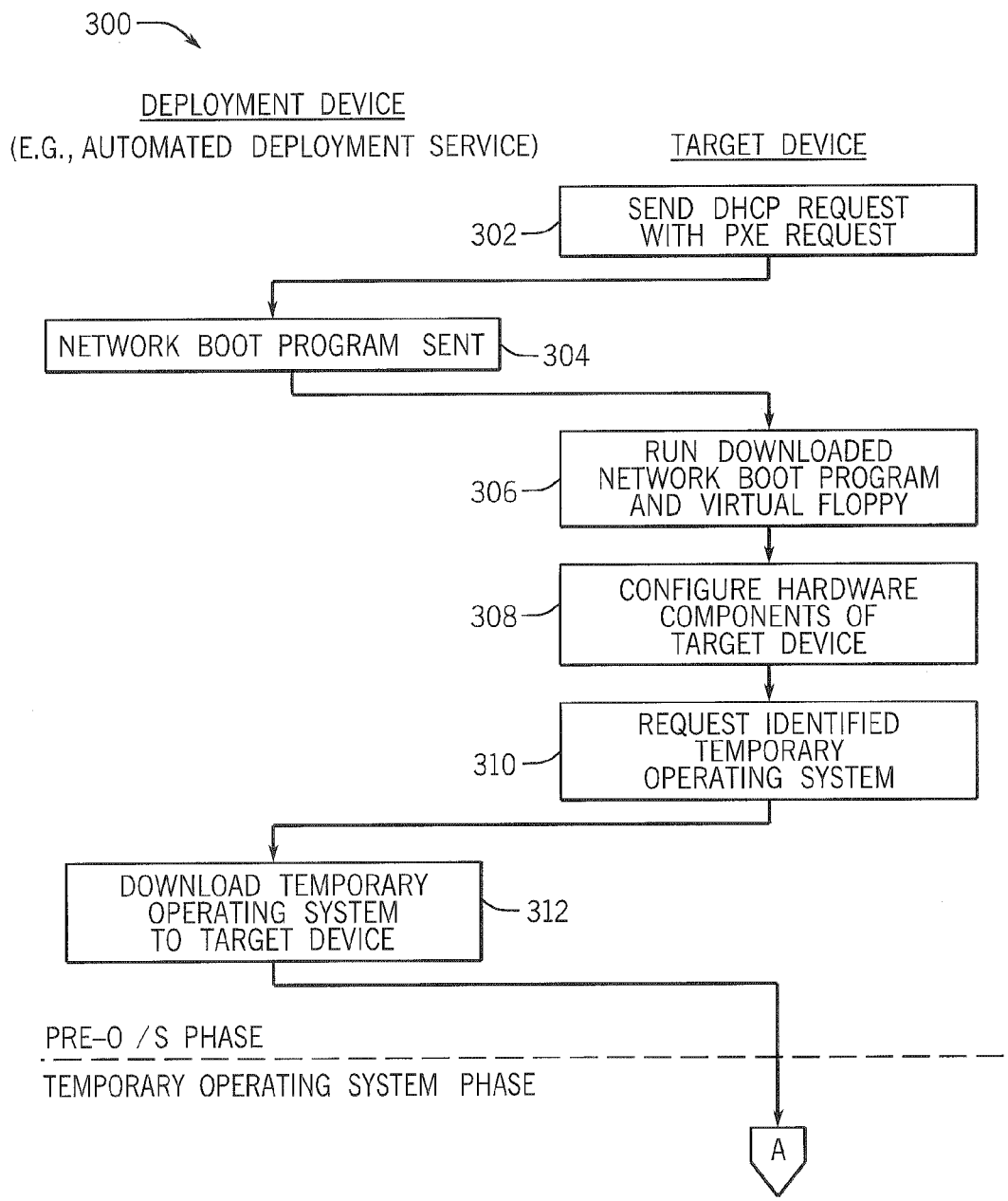
FIGS. 5A, 5B and 5C are a flow diagram illustrating an exemplary process deploying a full operating system to a target device.
Figure 5B:
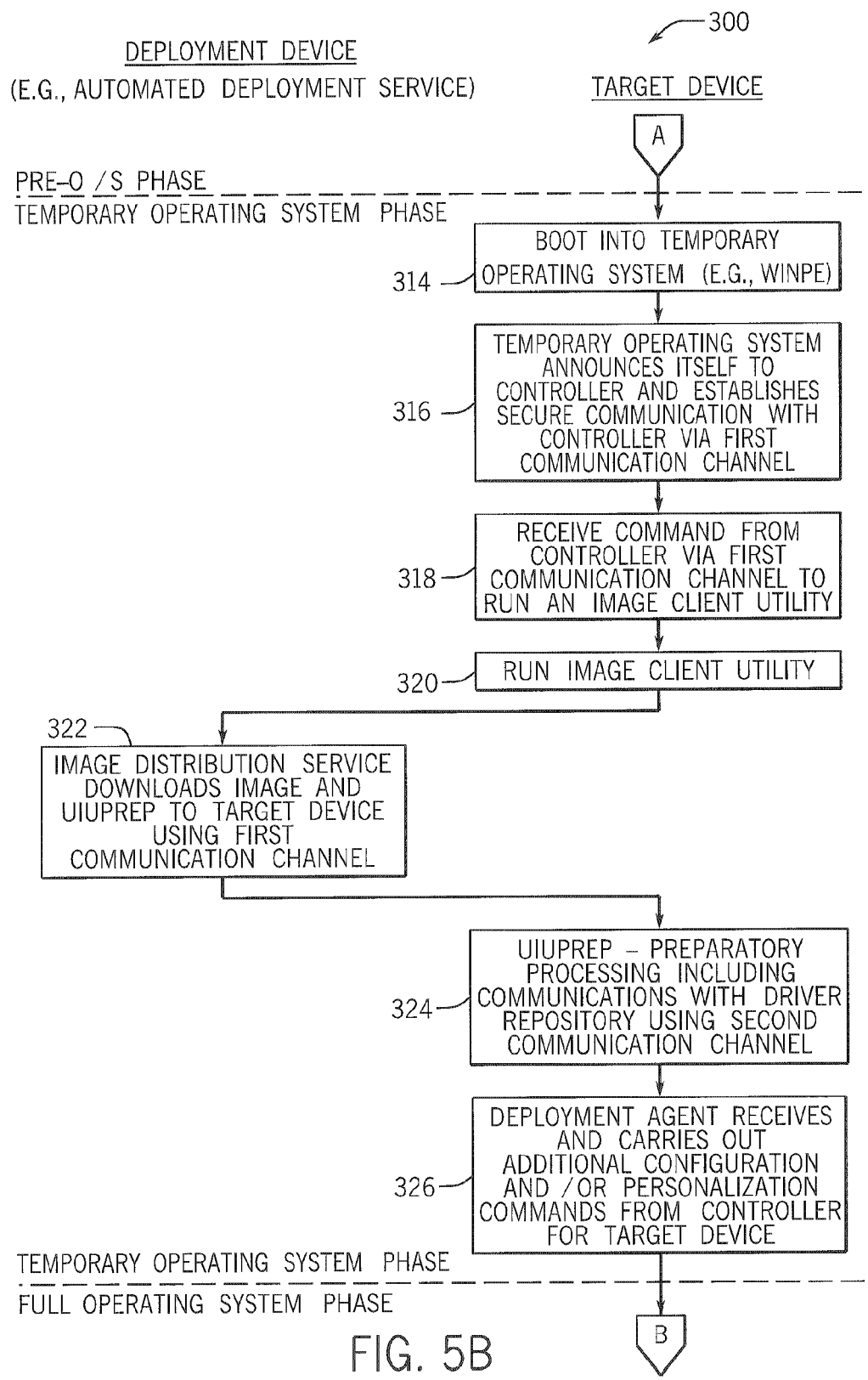
Figure 5C:
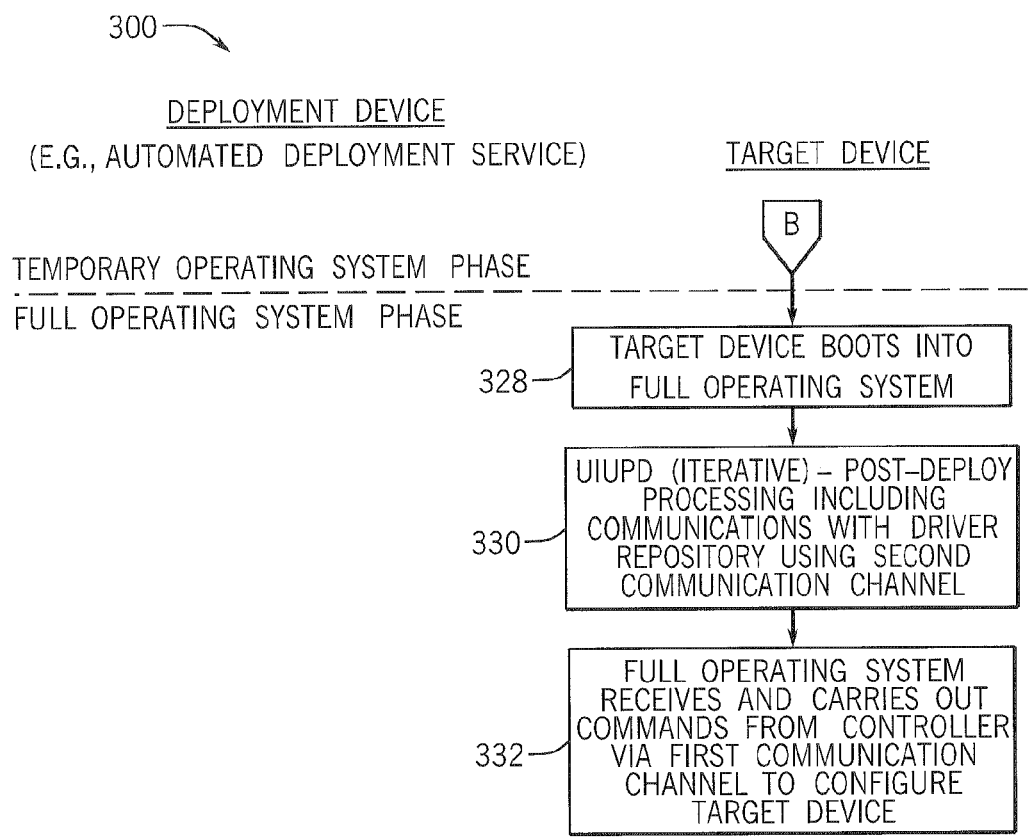

FIGS. 5A, 5B and 5C are a flowchart showing an exemplary process for deploying a full operating system on a target device 102, which can be performed by a deployment device 200 and a target device set containing one or more target devices 102 of FIG. 4. As will be noted below, the entire deployment process can be divided into a pre-operating-system phase (pre-O/S phase), a temporary operating system phase and a full operating system phase. Acts performed by the deployment device 200 are shown on the left-hand side of FIGS. 5A, 5B and 5C, while acts performed by each target device are shown on the right-hand side of FIGS. 5A, 5B and 5C.

Initially, the pre-O/S phase begins when each target device sends at 302 a DHCP request that includes a PXE request each time the target device 102 is powered on or re-booted. The PXE service 220 detects the request and responds to the target device with an identifier of a network boot program at 304. The network boot program can be downloaded to and executed on the target device and allows the target device to configure and use RAM disks. The network boot program is typically a small program (relative to the operating system being deployed on the target device), and usually does not provide the same operation as the full operating system being deployed on the target device. The same network boot program can be used for multiple computing devices 102, or alternatively different network boot programs can be used for different devices 102. The target device receives the network boot program and runs the program and eventually boots into a virtual floppy at 306. One or more utility programs on the virtual floppy disk are executed to configure the hardware components of the target device at 308), which can be carried out as identified in a batch file on the virtual floppy disk (e.g., an "autoexec.bat" file on the virtual floppy disk that identifies a list of programs to be executed). The specific hardware settings for the device 102 can be determined in a variety of different manners, and in one implementation are input by a system administrator. After some additional communications between the deployment device 200 and the target device 102, the target device 102 requests an identified temporary operating system at 310. In response to the request, the temporary operating system is downloaded to the target device at 312. As part of this download, the target device copies the temporary operating system to a target device RAM disk. The target device then boots into the temporary operating system at 314, thus ending the pre-O/S phase of deployment and initiating the temporary operating system phase. All of the communications and exchanges between the deployment device 200 and the target devices 102 are conducted using a standard communication channel defined and established by SCCM for this pre-O/S phase of deployment (referred to as the first communication channel 211 in FIG. 4).

When the temporary operating system runs, it announces itself to an auto-discovery component in the deployment device 200 and may establish secure communication using the first communication channel 211 with controller 202. Secure communication between controller 202 and the target device 102 can be achieved in any of a variety of manners (e.g., using cryptography and symmetric keys and/or public/private key pairs).

The temporary operating system also receives a command via first communication channel 211 from controller 202 to run an image client utility at 318. The image client utility is a program that facilitates copying of an image from IDS 206 to a target device storage location on which the operating system is to be deployed. In one implementation, the image client utility is part of the temporary operating system on the target device. The image client utility runs and listens on a network address (e.g., an IP address) identified by controller 202 for an operating system image from image distribution service 206 at 320.

Because of the instruction provided in the task sequence described herein, IDS 206 downloads the desired image as well as the UIUPrep preparatory process to the target device 102 at 322. The image and UIUPrep are copied to the storage device of the target device. The image for the full operating system that is stored by IDS 206 is one or more files containing a functionally identical replica of a disk. The image thus contains all of the files, with many settings and data properly configured, that constitute the full operating system that can be loaded and executed on a device. UIUPrep processing, as described in more detail herein, is executed at 324 using the second communication channel 213 of FIG. 4 for communications between the target device and the driver repository 215. The temporary operating system then receives and carries out additional configuration or personalization commands from controller 202 at 326. Such configuration or personalization commands at 326 may include, for example, setting a unique hostname on the downloaded image (e.g., a name for the target device), setting the time zone, setting an administrator password, setting a static IP address, and so forth. Once the full operating system image is downloaded and any additional configuration or personalization commands are received from controller 202, the temporary operating system phase of deployment ends and the full operating system phase of deployment begins when the target device 102 is re-booted again at 328 (e.g., when controller 202 sends a command to the target device to re-boot), the target device booting into its full operating system at 328, which is the full operating system that has been deployed to the hard disk or other storage device on the target device. The target device then implements the post-deploy processing (UIUPD) described in more detail herein, typically in an iterative manner until all hardware devices on the target device have been found and corresponding drivers downloaded from the driver repository 215 using the second communication channel 213. Once the UIUPD processing is completed, the full operating system can receive (via the first communication channel 211) and carry out commands from the controller to configure the target device as desired by the controller at 332.

Installation

Figure 6:
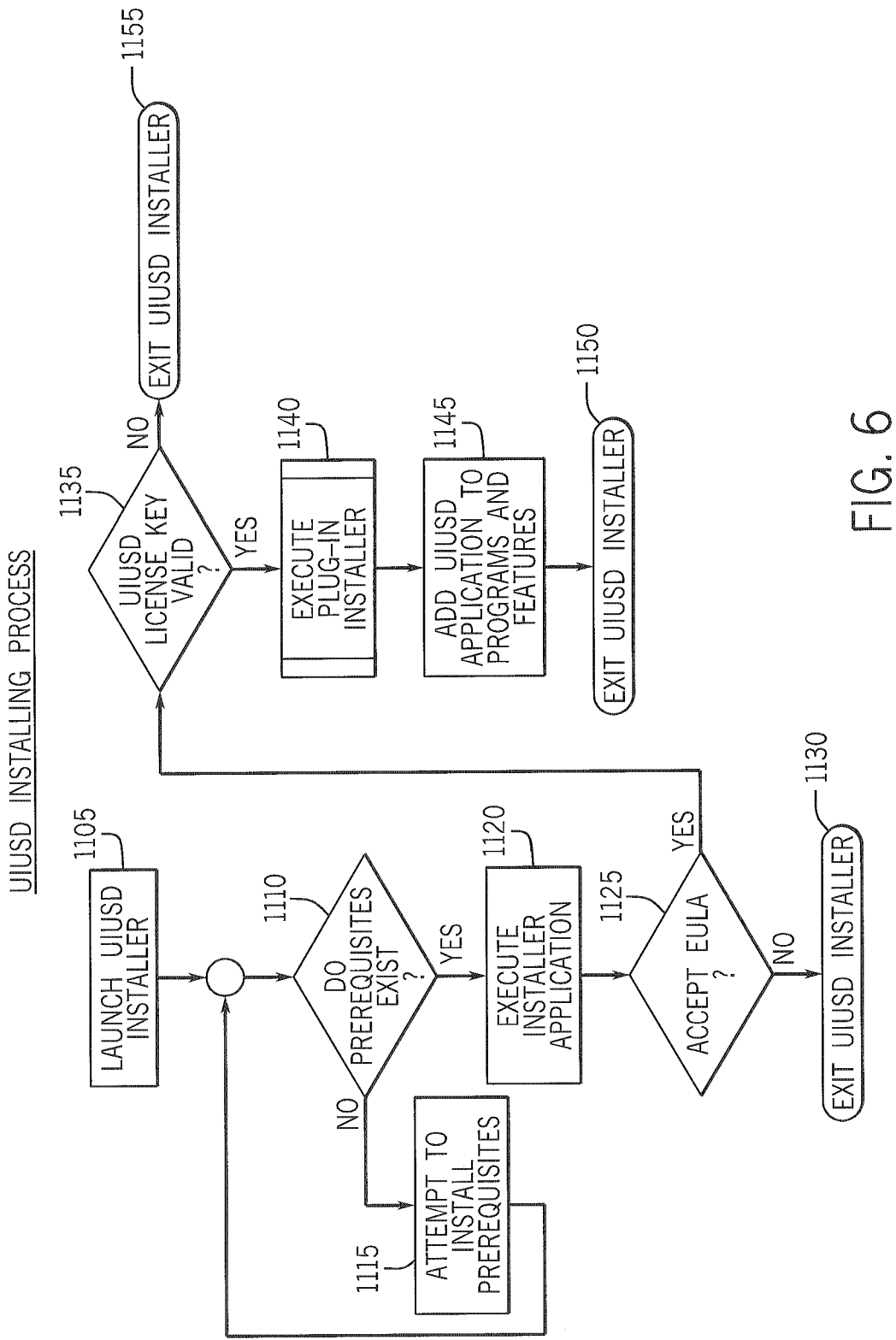
FIGS. 6, 7 and 8 illustrate one or more embodiments for installing an exemplary universal imaging utility system deployment.

FIG. 6 illustrates one or more embodiments of an installation process 1100. In process 1100, a UIUSD installer is launched at 1105. Process 1100 checks for prerequisites at 1110 (e.g., .NET 3.5 runtime and SQL Server Compact Edition 4.0, or the like, which are required for installation, and which can be installed by setup if they are not detected). If they do not exist, then an attempt may be made at 1115 to install them. If such prerequisites do exist, then the installer application is executed at 1120. If the end-user license agreement (EULA) or the like is not accepted at 1125, then the installer is exited at 1130. If the EULA is accepted, then the UIUSD license key is checked and/or validated at 1135 (again exiting the installer process at 1155 if the key is not valid). At 1140 the plug-in installer is executed after which the UIUSD application is added to the programs and features at 1145. The installation process 1100 is then exited at 1150.

During installation, the UIUSD files get copied to a location (e.g., any storage location that SCCM knows). A UIUSD Package 209 is then created using instrumentation available from SCCM-SCCM thus knows what that UIUSD Package 209 is and how to access it. If the UIUSD Package is distributed to multiple SCCM distribution points, these UIUSD Packages are basically mirror images. The UIUSD Packages exist so that SCCM can manage all UIUSD Packages based on the contents of the storage (e.g., to facilitate updating and other changes when those storage location files are updated or changed). In applications like GhostCast and the like, an administrator controls the original storage location and changes to the UIUSD Package.

Figure 7:
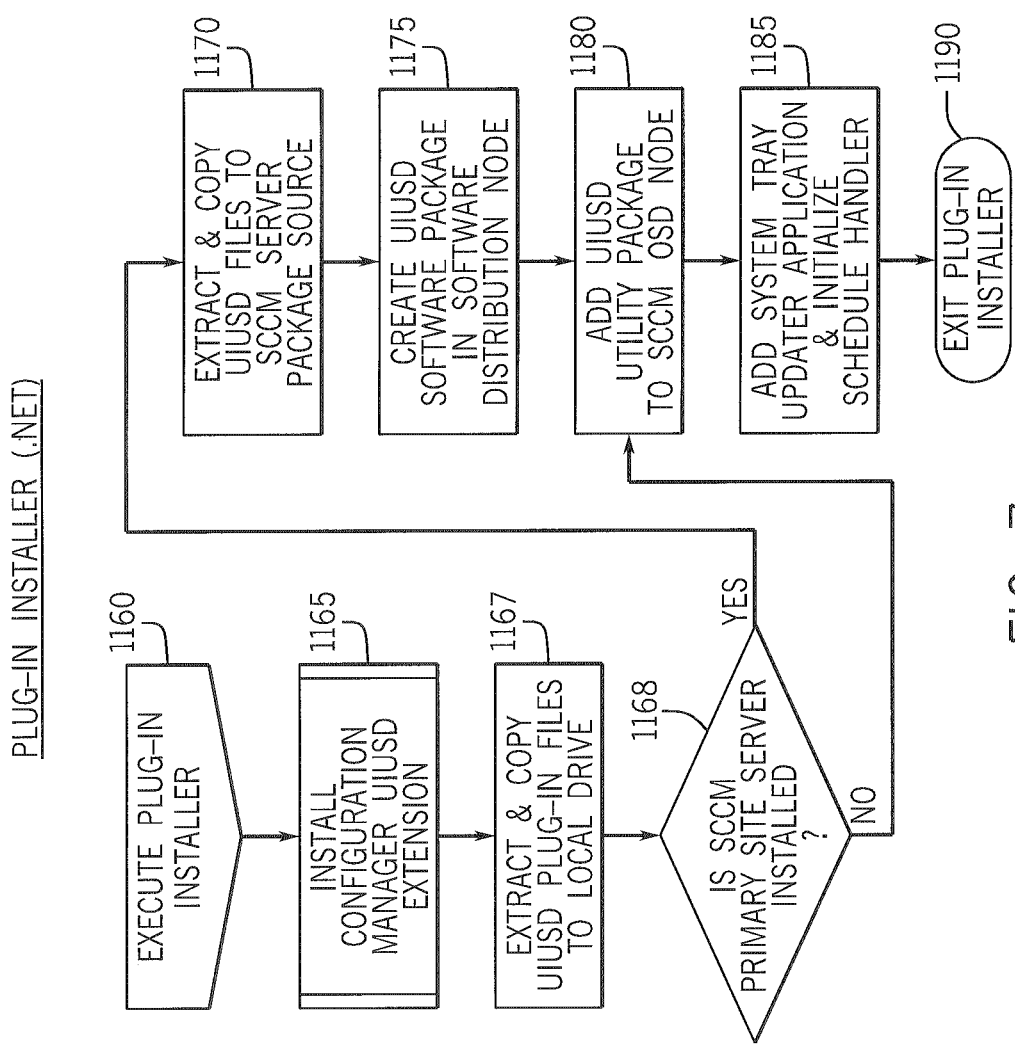

Execution of the plug-in installer at 1140 of FIG. 6 can be implemented as shown in FIG. 7 beginning at 1160. A Configuration Manager UIUSD Extension can be installed at 1165, one or more embodiments of which are described below, wherein a Windows Management Instrumentation (WMI) class is created within the context of SCCM or the like so that the associated console can manipulate instructions related to UIUSD management and so that a DLL or Dynamic Link Library is copied to a specific location within the context of SCCM or the like to be called later by UIUSD processes or binaries (executables). Plug-in related files are then copied at 1167 to a local disk drive on the machine where the installer is executed. The Programs & Features (Control Panel) can then be analyzed to determine if the "Microsoft SCCM Primary Site" software has been registered and therefore installed on the machine (e.g., a server, an administrator computer, or other deployment device) on which the installer is executed. This segregates steps required to install the full plug-in for a Primary Site Server (PSS) from steps that are not required for a "Remote Console" (defined as an SCCM Administration Console that is installed on a network machine other than a PSS).

UIUSD files are then extracted and copied to an SCCM server package source at 1170 in some embodiments. A UIUSD Software Package can be created in a software distribution node at 1175 and a UIUSD Package Utility added to an SCCM OSD (operating system deployment) Node at 1180 (e.g., in IDS 206). Finally, a system tray updater application can be added and a schedule handler initialized at 1185 before exiting the plug-in installer at 1190.

Figure 8:
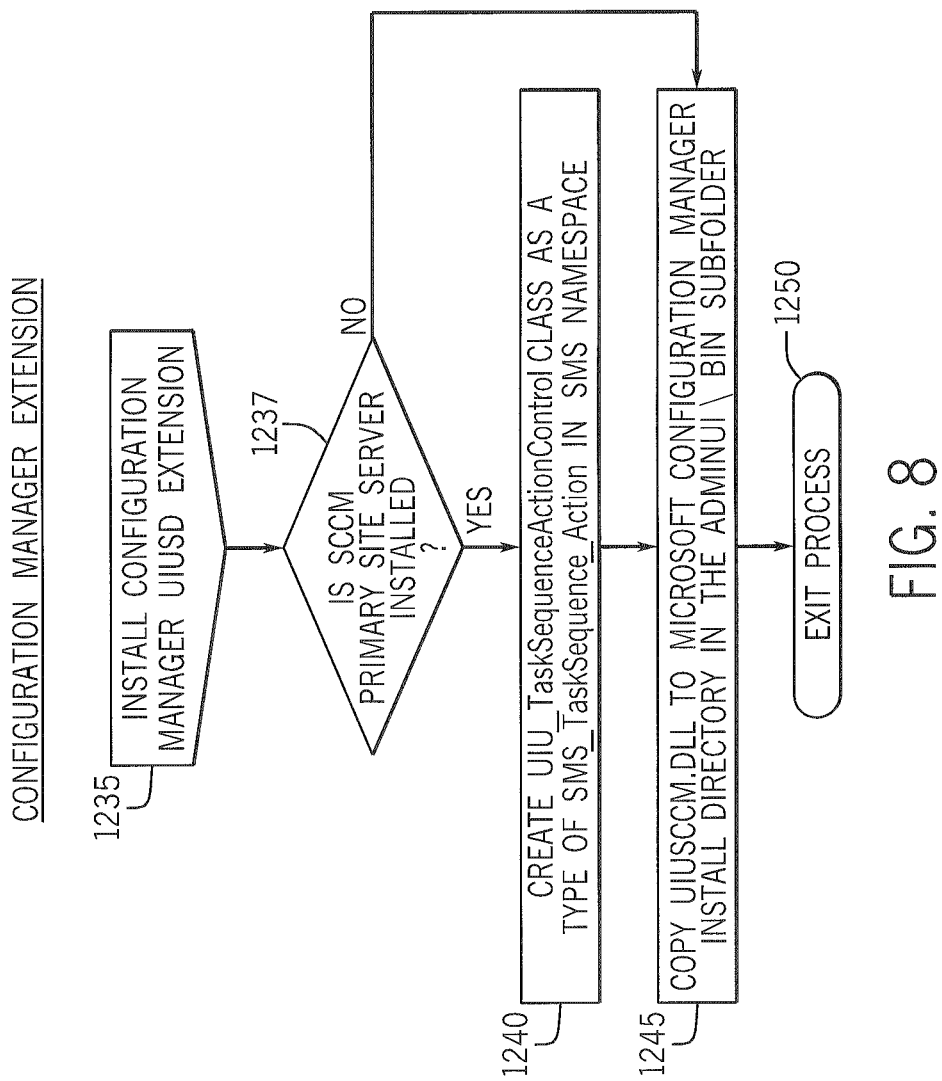

The Configuration Manager UIUSD Extension installation at 1165 in FIG. 7 can be performed as shown in FIG. 8 (e.g., to create a Windows Management Instrumentation (WMI) class followed by copying a DLL), where the Configuration Manager UIUSD Extension is installed at 1235 followed by the PSS analysis at 1237 (as described above), after which the WMI class is created at 1240, followed by copying of a dynamic-link library at 1245, before exiting the process at 1250. This adds a menu item to a GUI so that the UIUSD Machine Configuration step is available to users (e.g., administrators) as an option in generating a task sequence.

Once installed, the UIUSD service provides one or more of the functions and/or capabilities noted below. As seen in FIG. 4, the UIUSD Package 209 can reside within the IDS 206 (e.g., an SCCM Distribution Point) in some embodiments and can be accessed by a target device 102 via a first communication capability that is standard in SCCM, referred to in the Figures as the first communication channel 211, for communications such as those disclosed by and used in Prabu for secure PXE and other standard SCCM communications during downloading of the deployment agent (temporary operating system) obtained from NBS 204 and/or a secure WinPE communications channel for downloading a full O/S image from IDS 206 (see, e.g., channel 211 in FIG. 4).

In some instances, communication between each target device 102 and the UIUSD Package is performed using a communication capability that is not part of SCCM, this alternate communication function be designated a second communications channel 213. Channel 213, which is not disclosed, taught or suggested by earlier systems, can be used by a target device 102 to access the UIUSD Package 209 in the IDS 206, as described in more detail below. In SCCM, the second communication channel can be defined by using the known structure of an accessible SCCM Distribution Point and providing the target device with an address or location within that SCCM Distribution Point for accessing a given file or files using, for example, TCP/IP or any other appropriate protocol.

Task Sequence Creation and Modification

Deployment of an operating system to multiple target devices according to some embodiments herein uses a task sequence to manage devices such as computers. Baron describes use of such task sequences across multiple O/S environments. In earlier systems using task sequences, as is well known to those skilled in the art, a user-defined or user-selected task sequence is created or received. The task sequence can be converted into an ordered series of steps, and the series of steps performed in accordance with their order to manage a device over a network (e.g., for automatically deploying an operating system on a target device). The task sequence must be created/modified prior to being implemented before a deployment agent (WinPE) booting step 314 in FIG. 5B and typically prior to the process of FIGS. 5A, 5B and 5C commencing. The task sequence controlled by controller 202 or the like can command the deployment agent receiving and carrying out commands it receives from controller 202. These commands are implemented to configure the target device as desired by controller 202. Any of a variety of commands can be issued by controller 202, and these commands typically are used to prepare the target device for deployment of the full operating system. Examples of such commands include partitioning a hard disk(s) of the target device, formatting a volume(s) of a mass storage device of the target device, and so forth.

Figure 10A:

The task sequence used in embodiments of the present invention can be created or modified using one or more embodiments shown in FIG. 9 (and in some cases using a wizard or GUI, examples of which are shown in FIGS. 10A-10N), wherein the automatic deployment service is opened at 2205 and the existence of an operating system deployment (OSD) task sequence is checked at 2210. If no OSD task sequence exists, then the task sequence is created at 2215, otherwise an existing task sequence can be modified at 2220 A task sequence can be created at 2215, for example in accordance with Baron's disclosure and computer management embodiments herein. In some embodiments the task sequence is administrator-configurable and its creation and/or modification can be implemented using a task sequence wizard as shown in FIGS. 10A-10N.

Figure 10C:
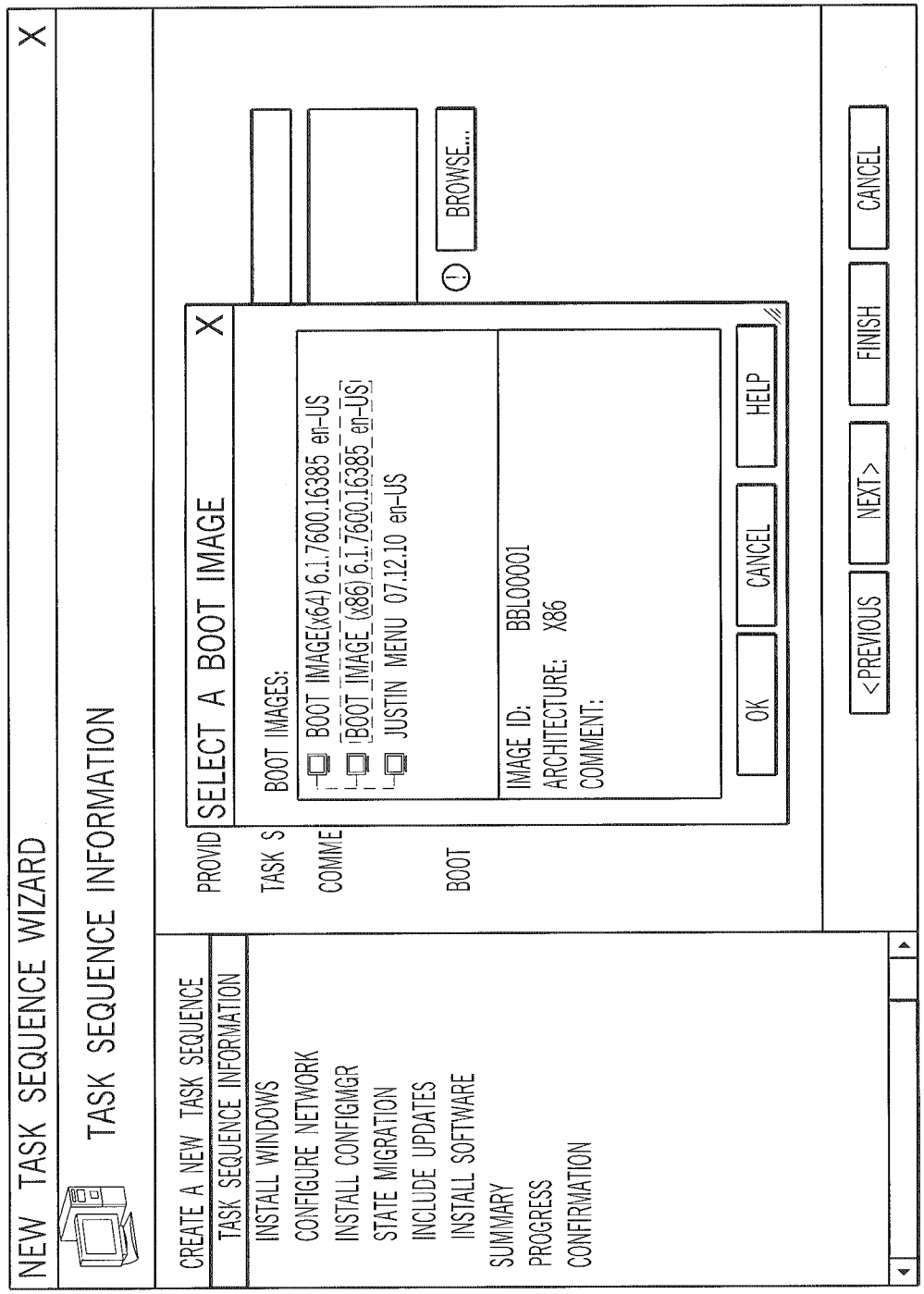
Figure 10D:
Figure 10E:
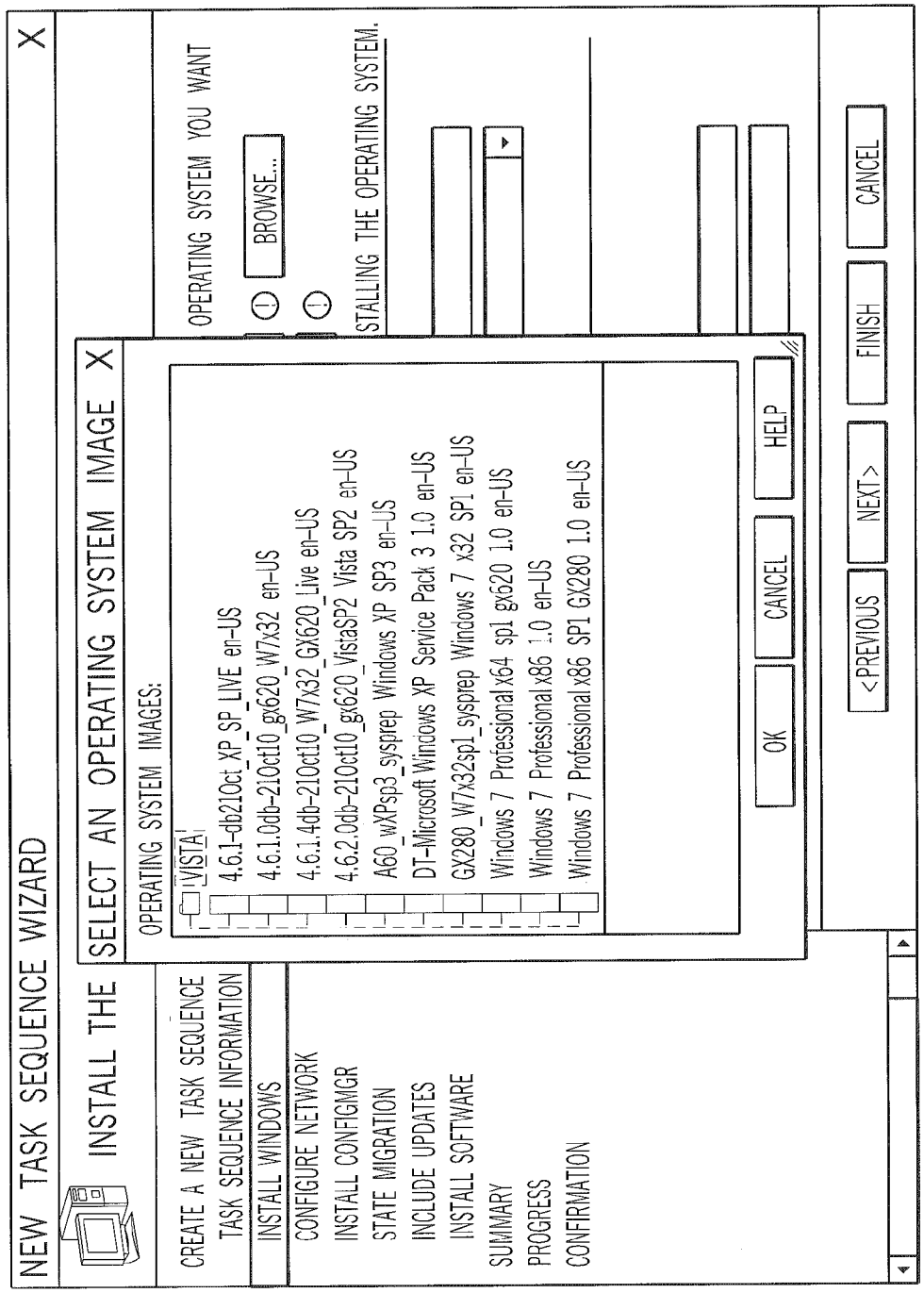
Figure 10G:
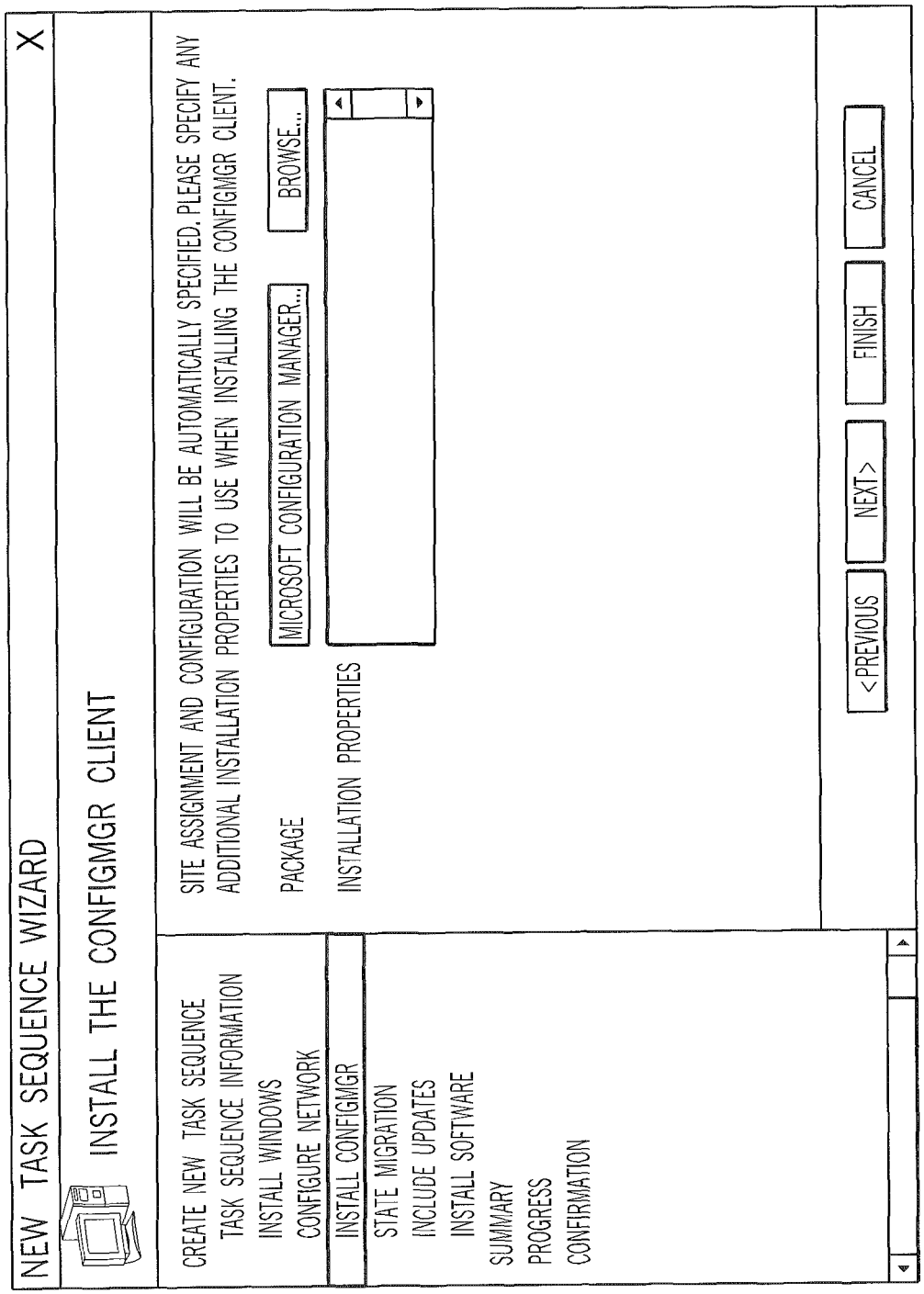
Figure 10H:
Figure 10I:
Figure 10J:
Figure 10K:
Figure 10L:
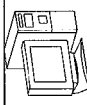

An exemplary administrator-configurable process for creating or modifying a task sequence is shown in FIGS. 10A-10N and includes choosing whether to create a new task sequence or to modify an existing task sequence (FIG. 10A), naming the task sequence (FIG. 10B), and then selecting a boot image (FIG. 10C), an O/S image package (FIG. 10D), and an image file (FIG. 10E). A network configuration is then selected (FIG. 10F) and, for SCCM, the Microsoft Configuration Manager Client is then installed (FIG. 10G). Settings or state to migrate is then chosen (FIG. 10H) and any updates that are to be installed can be selected (FIG. 10I) along with any software to be installed (FIG. 10J). The task sequence can be summarized for a user (FIGS. 10K and 10L).

Figure 10M:
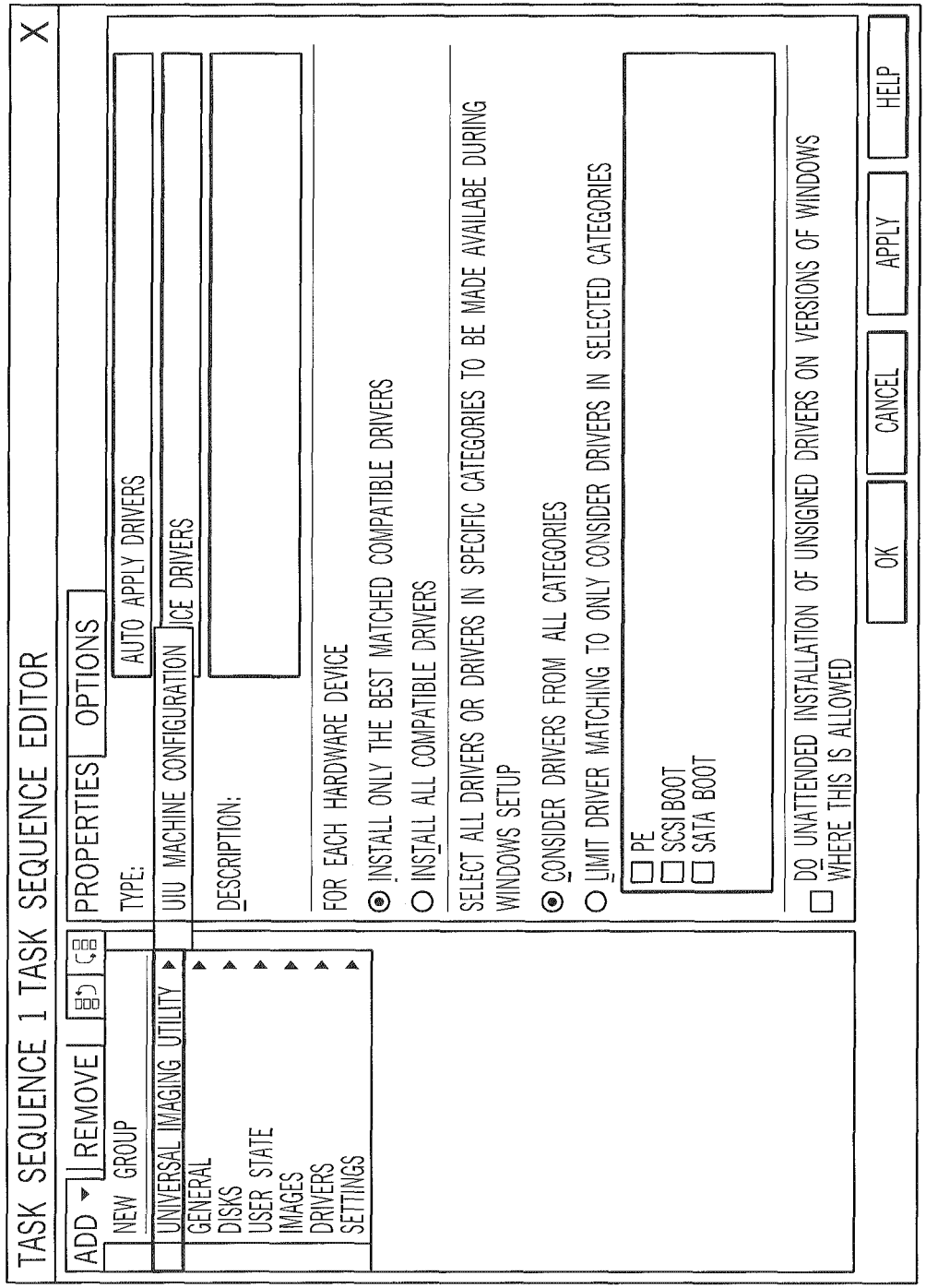
Figure 10N:
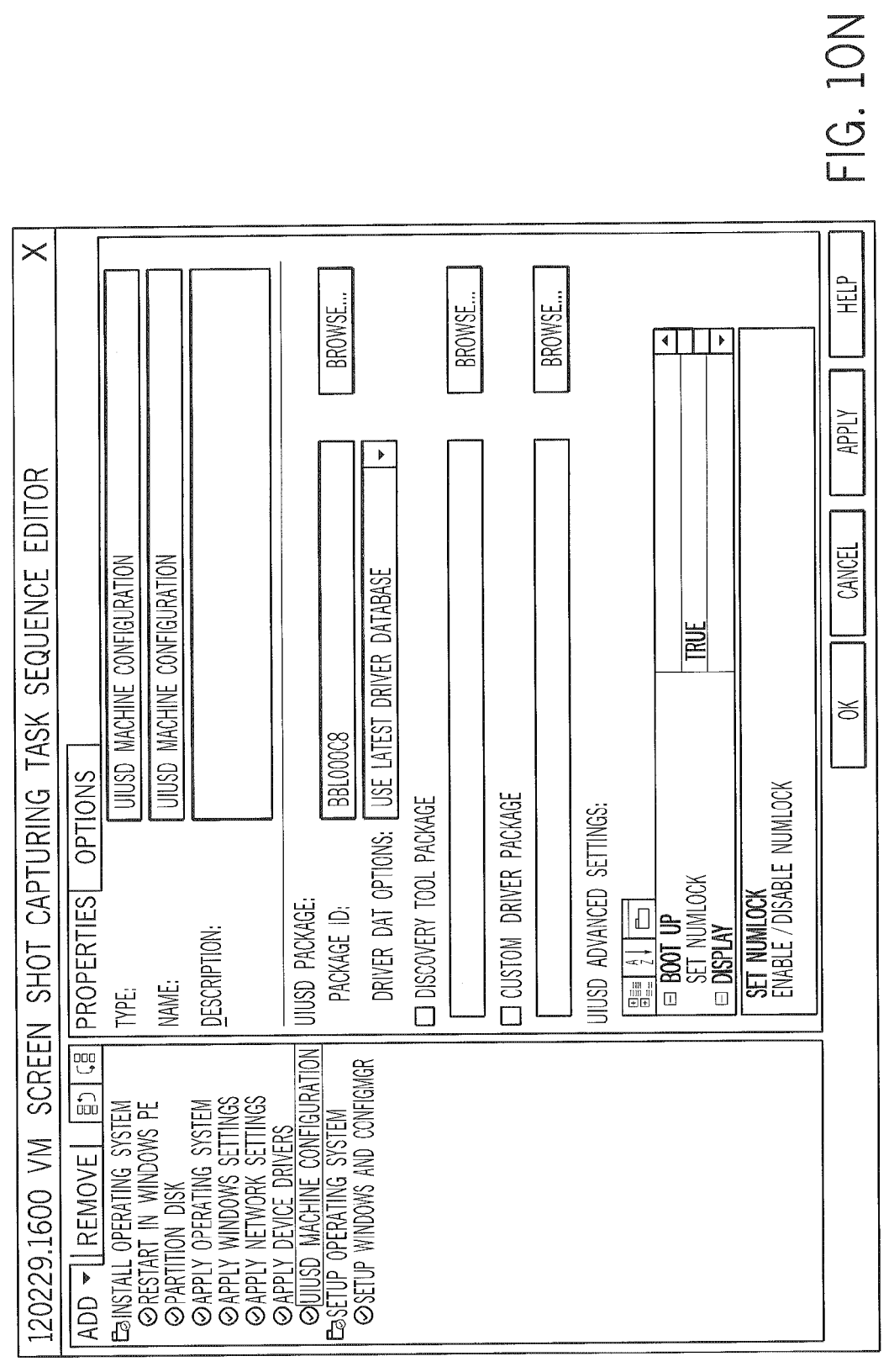

The install task sequence created/modified as desired can then have a UIUSD Machine Configuration added to it at 2225 (see also FIG. 10M). Because the class was created and the DLL copied during installation, a drop-down menu of the task sequence menu tab is appended to include a task such as the "UIUSD Machine Configuration" task. Step 2225 is where an SCCM Administrator or the like can add the UIUSD Machine Configuration task to their Install Task Sequence to invoke UIUSD to operate in the WinPE environment during the course of that task sequence's execution. The UIUSD Machine Configuration can be the one installed above at 1165 in some embodiments. Once the UIUSD Machine Configuration is added, the UIUSD options can be configured at 2230 (one or more embodiments of which are shown in FIGS. 11A-11C, as described in more detail below, and which can be implemented using a GUI and/or wizard as shown in FIG. 10N), before the UIUSD configuration process ends at 2245.

Figure 11A:
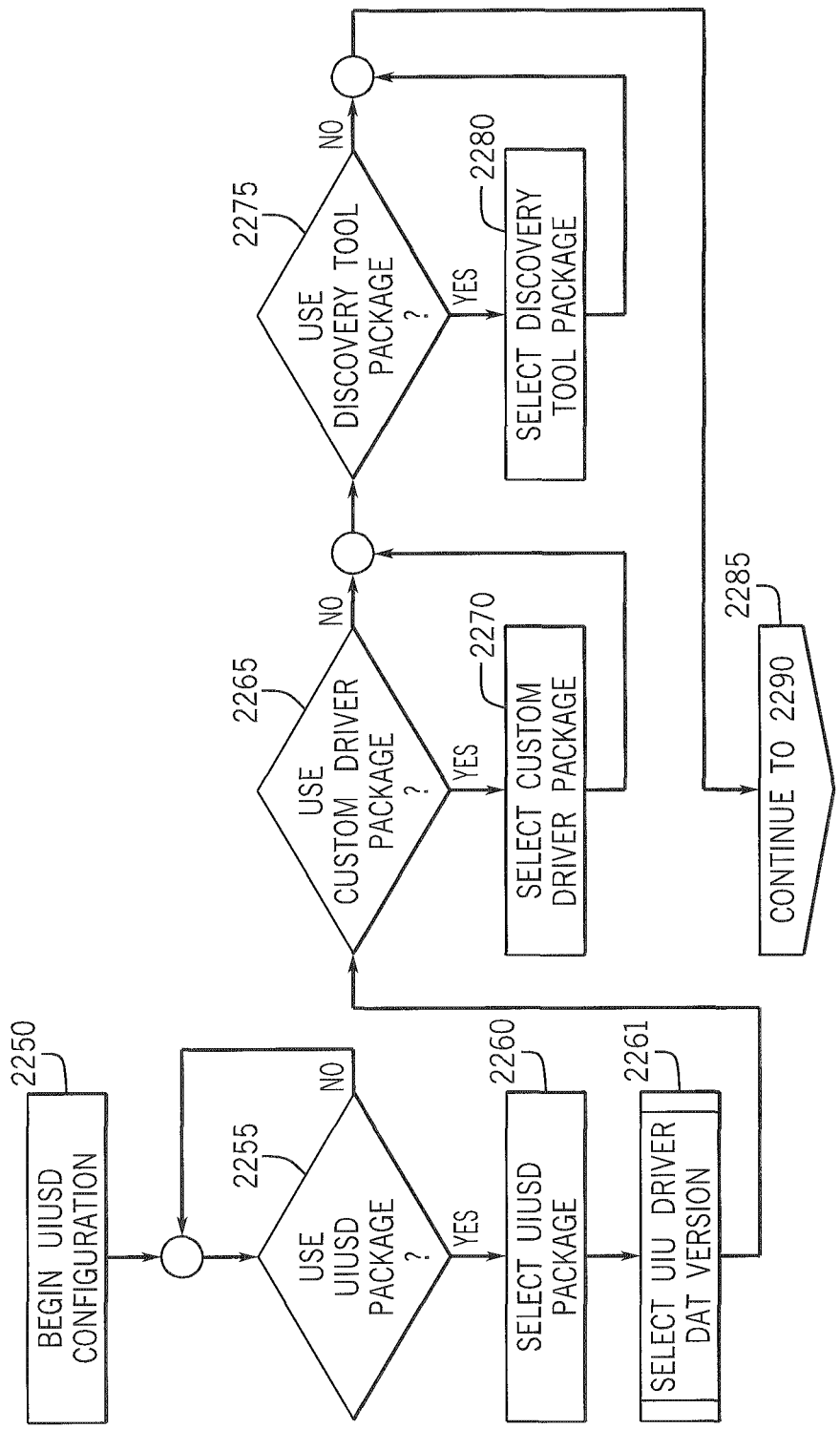
Figure 11B:
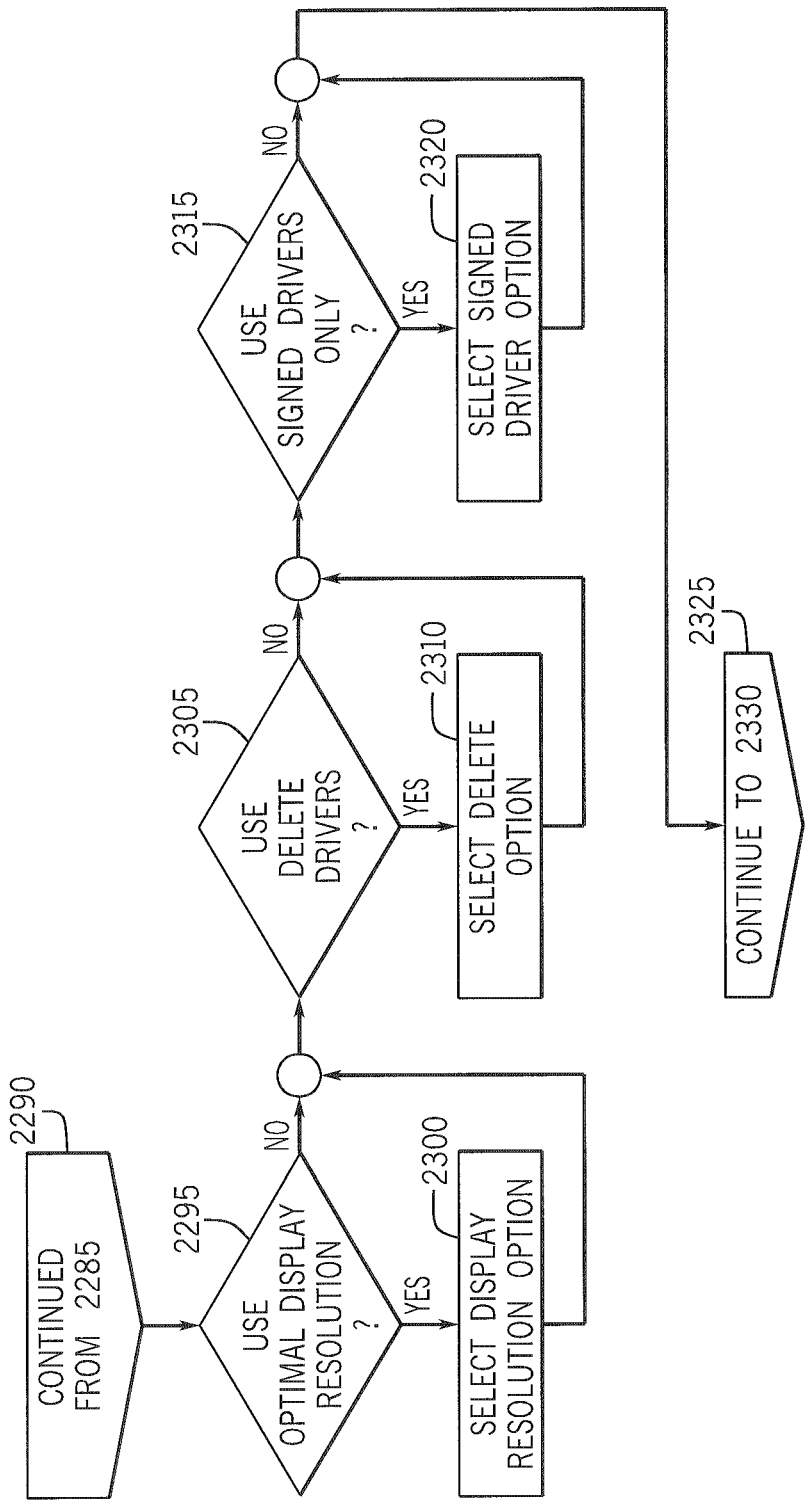
Figure 12:
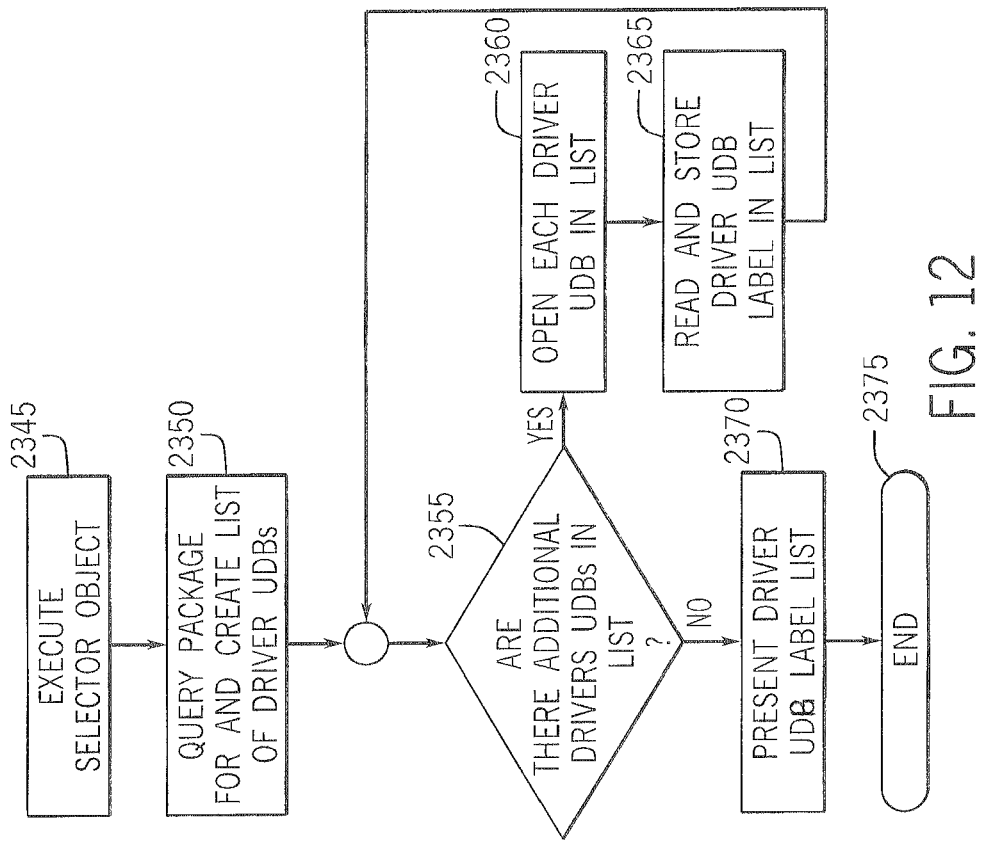

As seen in FIGS. 11A-11C, the UIUSD options configuration begins at 2250 by deciding at 2255 whether or not to use the UIUSD Package contained, for example, in the Image Distribution Service 206 (the options described here are exemplary and, as will be appreciated by those skilled in the art, a variety of options can be provided to a user in the UIUSD Machine Configuration options configuration). When the UIUSD Package is selected at 2260, an SCCM administrator or other user selects a UIU Driver DAT version at 2261 (one or more embodiments of which are shown in FIG. 12, as described in more detail below), for example as provided by the UIUSD and stored in the UIUSD Package in Image Distribution Service (IDS) 206. This selection designates the UIU Driver DAT version that the UIUPrep application (a preparatory process run in the temporary operating system (such as WinPE) prior to the target device being booted into the full operating system) will access via the second communication channel 213 when UIUPrep performs determination and retrieval of drivers required for a given target device 102, to be copied to the target device by UIUPrep in WinPE. Selection of the UIU Driver DAT version can be performed as shown in steps 2345-2375 of FIG. 12, which allows a specific driver database available in the UIUSD Package (e.g., the most current or latest driver database) to be chosen automatically in some embodiments.

A selection is made at 2265 whether or not to use a custom driver package (if a custom driver package is used, then it is selected at 2270; this can be the same process as step 2260, though in some embodiments it is optional and may access a package other than the UIUSD Package). Also, a selection can be made at 2275 whether or not to use a Discovery Tool Package that includes driver files and/or information obtained previously from sources other than the real-time hardware scan of the target device (if the Discovery Tool Package is used, then it can be selected at 2280). Optimal display resolution can be selected or not at 2295 (selected at 2300) to optimize target device output resolution, driver deletion is chosen or not at 2305 (selected at 2310) to delete drivers copied by the UIUSD plug-in after staging, and a "signed drivers only" option provided at 2315 (selected at 2320) to limit driver installation on a target device to OEM signed drivers only. Any selected options are then applied at 2335 and the UIUSD options configuration process ends at 2340. These represent options selectable in the UIUSD Machine Configuration task as features of the UIUSD. They are available because the WMI class and DLL were established during installation and following the addition of the UIUSD Machine Configuration task into the Install Task Sequence (task sequence created in SCCM specifically for installing operating systems). This can be implemented in some embodiments using the following:

1—Select Add>Universal Imaging Utility>UIUSD Machine Configuration. Drag the new item to the end of the "Install Operating System" sequence.
2—Click on the "UIU Package" checkbox and browse for the UIUSD Package (Software Distribution>Packages). Select Discovery Tool packages if applicable. Select Custom Driver Package if available.

3—Select desired Advanced Settings as required.

At 2261 in FIG. 11A, an administrator or other user can select the UIUSD Driver DAT version(s) desired for use during deployment to the selected set of target devices. As seen in FIG. 12, a selector object can be executed at 2345 to have the latest driver user database (UDB) or other selected criteria to be chosen automatically (this can be a code instruction, initiated by selecting a drop-down box that enumerates all of driver databases available in the UIUSD Package and presents them for the SCCM Administrator or the like to choose from in that drop-down list), which at 2350 queries the UIUSD Package, for example in the IDS 206, and creates a list of Driver UDBs that can be shown to the administrator in a GUI or wizard window. Steps 2355-2375 can be used to automatically update and present an appropriate Driver UDB list showing all the driver UDBs in the UIUSD Package stored on the Image Distribution Service (IDS) 206, if desired.

Deployment

One or more examples of deployment using computer management embodiments herein are shown in FIGS. 13-23, including deployment that can be integrated into deployment disclosed in SCCM, Prabu and the like. Creation of a task sequence must take place before an advertisement of that task sequence is established or transmitted (e.g., typically referred to as selecting "Advertisements" or the like in Microsoft SCCM). In most cases, a task sequence will be created and the advertisement made before anything in FIGS. 5A, 5B and 5C takes place.

Deployment is performed by deploying a full operating system to a target device set on a network that includes each target device in the target device set and any deployment device. The target device set can have one or more target devices and typically includes multiple target devices having different hardware configurations. Each target device receives and executes a task sequence, which includes performing a preparatory process (UIUPrep) in the temporary operating system and performing a post-deploy process (UIUPD) in the full operating system.

Embodiments of operating system deployment and computer management herein include performing a real-time hardware scan during preparatory (UIUPrep) preinstallation processing in a temporary operating system such as WinPE to identify target device hardware devices requiring drivers. One or more hardware scans also are performed during post-deployment (UIUPD) processing to determine whether any other hardware devices requiring drivers are present on the target device. The hardware device identifications are correlated with driver information in a driver repository in a memory that is part of the UIUSD Package 209 or the like using the second communication channel so that a target-device-specific set of drivers is assembled and delivered to the target device (e.g., as shown in one or more embodiments in FIG. 19).

As noted above, SCCM and Prabu utilize limited communication between the ADS 200 and each target device 102 (using what is referred to herein as the "first communication channel 211). Embodiments of computer management herein provide for additional communication between the target device 102 and the UIUSD Package 209, as described herein, using what is referred to as the second communication channel 213. The second communication channel 213 essentially allows the target device 102 to communicate with the UIUSD Package 209 during UIUPrep and UIUPD to access the driver repository 215 (which can be one or more databases or the like) and the UIUPD module 217 for purposes and in a manner not contemplated by SCCM, Prabu or the like.

Figure 13:
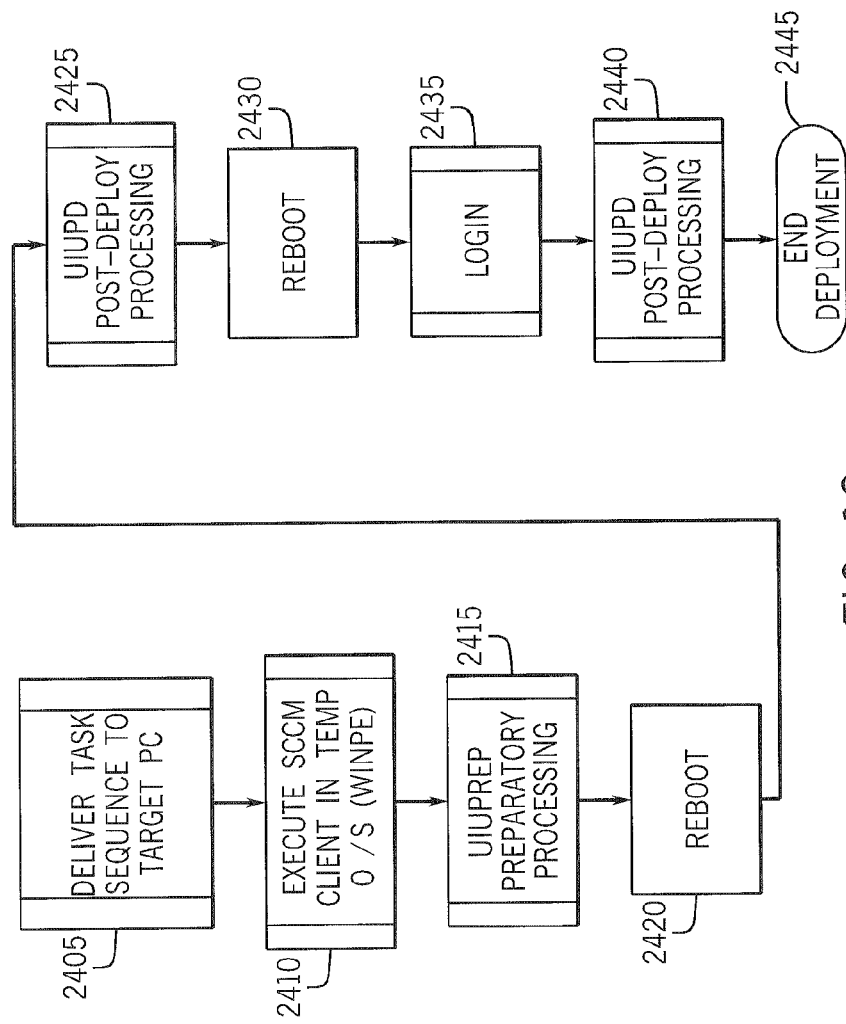

Process 2400 in FIG. 13 begins with a task sequence being delivered to a target device at 2405, for example via an SCCM management system or the like. Delivery of the task sequence at 2405 and initial operation of SCCM in the temporary operating system at 2410 are done exclusively using the first communication channel 211 (i.e., the communication channel typically used by SCCM). Instructions regarding how to use the second communications channel 213 are provided to the target device when UIUPrep is downloaded to the target device during SCCM Client communications or the like. Various implementations of the second communication channel and the manner of establishing it can be used. The second communication channel provides the target device with a storage location and the information and/or instructions required to access and use that storage location. Therefore, the second channel includes:

1—a storage location accessible to the target device 102 (e.g., network storage location, local media in target device, cloud storage location or other storage location external to the network that is accessible by each target device); and 2—instructions regarding how the target device finds and communicates with the storage location (e.g., using TCP/IP), including communication formats that can be used, etc.

Examples of an accessible storage location can be a location created or designated by a deployment solution such as an SCCM distribution point, or can be a UNC location prompted by UIUSD.

The task sequence can be one created or modified using SCCM or the like and includes UIUSD-related commands and operations. Typically the task sequence is finalized in advance of deployment commencing, but it can occur any time prior to the task sequence being used by the deployment device. In SCCM and Prabu, the deployment agent (temporary operating system or SCCM Client, for example) is basically delivered to each target device 102 during steps 302-312, after which the target device boots into a temporary operating system that allows implementation or execution of the task sequence(s) downloaded from the controller 202. In FIG. 13 the deployment agent (WinPE) is executed at 2410, corresponding to steps beginning at 314 and thereafter in FIGS. 5A, 5B and 5C. Using the exemplary process 300 of FIGS. 5A, 5B and 5C, an image file is downloaded to the target device at 322 (e.g., an operating system image file containing files that constitute the full operating system that can be executed on the target device after execution of the temporary operating system). At 324 in FIG. 5B and step 2415 of FIG. 13, an executable (e.g., the preparatory process referred to as "UIUPrep") is performed in the target device to, inter alia, facilitate preparation of the target machine (e.g., during WinPE or another temporary operating system) for execution of post-deployment code or post-deployment processing (e.g., "UIUPD" and/or "UIU Post Deploy" referred to in connection with some embodiments illustrated herein) and for use by a full O/S. These preparations include copying required files (e.g., executables and drivers) as well as setting parameters in the O/S instructions (e.g., files in the O/S file storage) and in the registry. Embodiments of this UIUPrep operation are shown in FIGS. 14A, 14B, 15, 16, 18, 19, 20A, 20B, and 21-23 and are explained in more detail below. The UIUPrep operation essentially prepares the target device 102 to run the UIUPD process when the target device boots into the full operating system. At 2420 of FIG. 13 the target device boots into the full operating system (see also, step 328 of FIG.

Figure 17A:
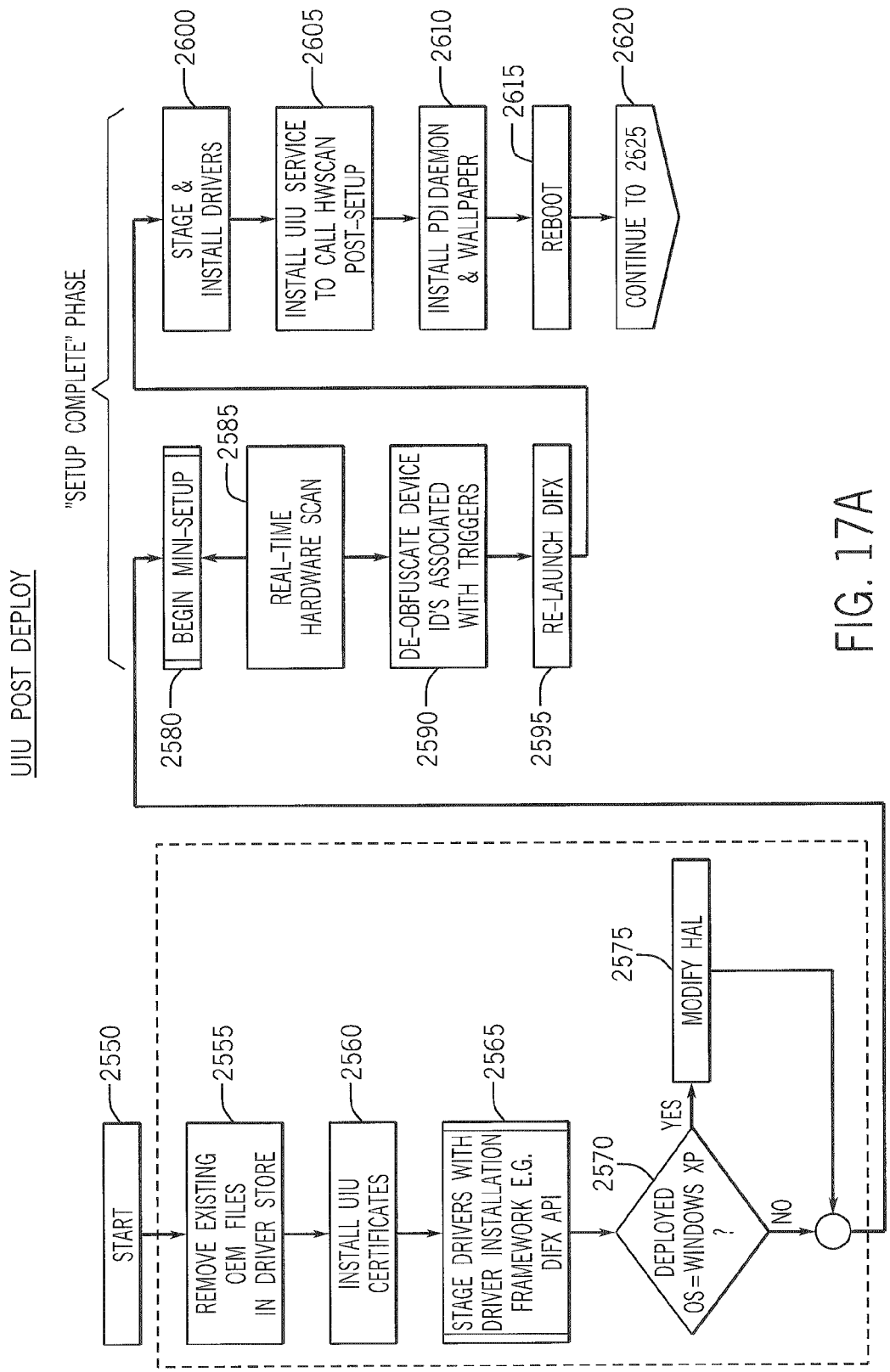
Figure 17B:
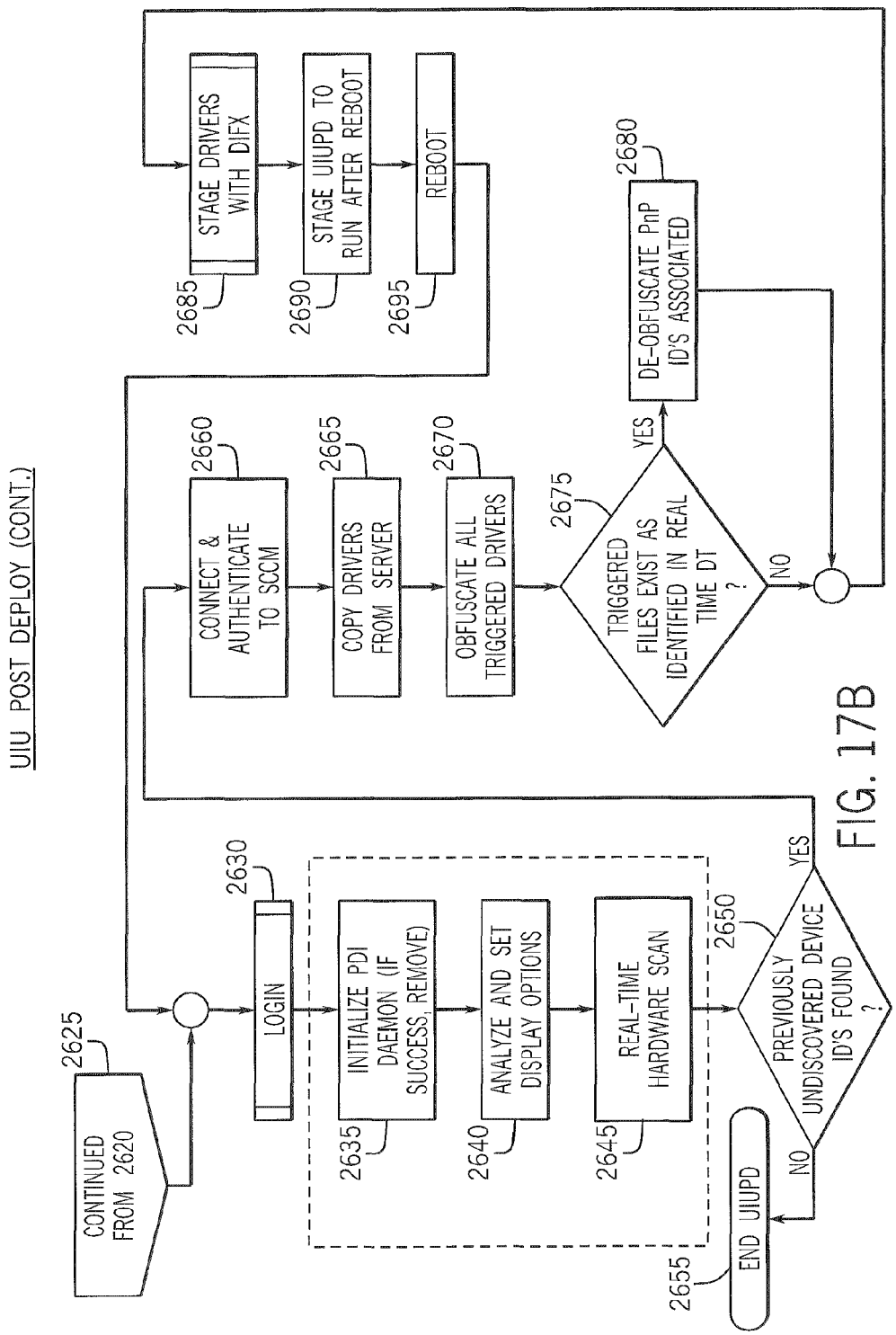
Figure 18:
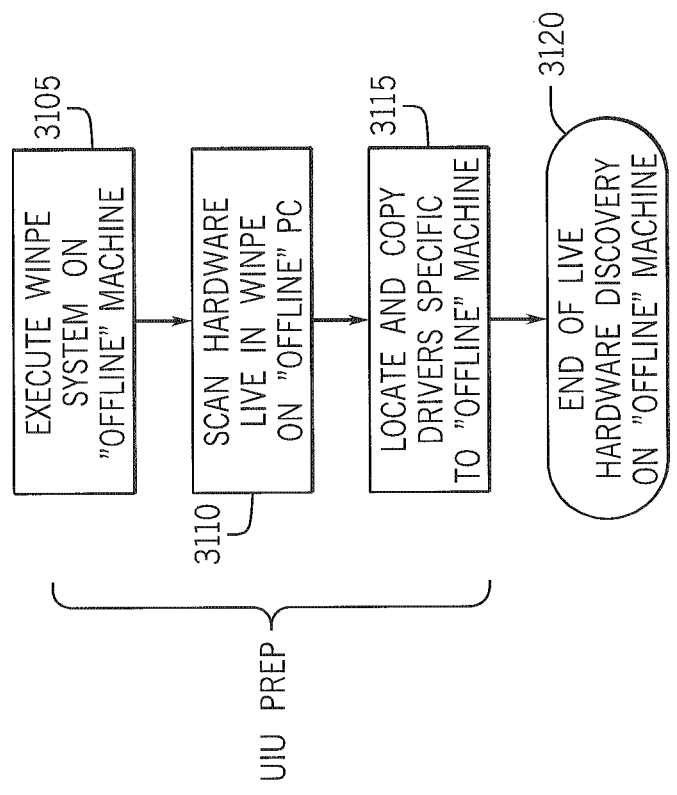

5C) and UIUPD post-deploy processing, embodiments of which are discussed in connection with FIGS. 17A and 17B, are implemented—this corresponds to step 330 in FIG. 5C.

After the UIUPD performs one or more functions in a first post-deployment stage at 2425 (which also invokes Minisetup as shown in FIG. 17A and as explained in more detail below), the target device is rebooted again at 2430 into the full operating system, after which a user performs a login at 2435. A second stage of the UIUPD then performs one or more functions in a second post-deployment stage at 2440 (shown in FIG. 17B and as explained in more detail below) prior to ending deployment at 2445.

Preparatory Preinstallation Processing

Figure 14A:
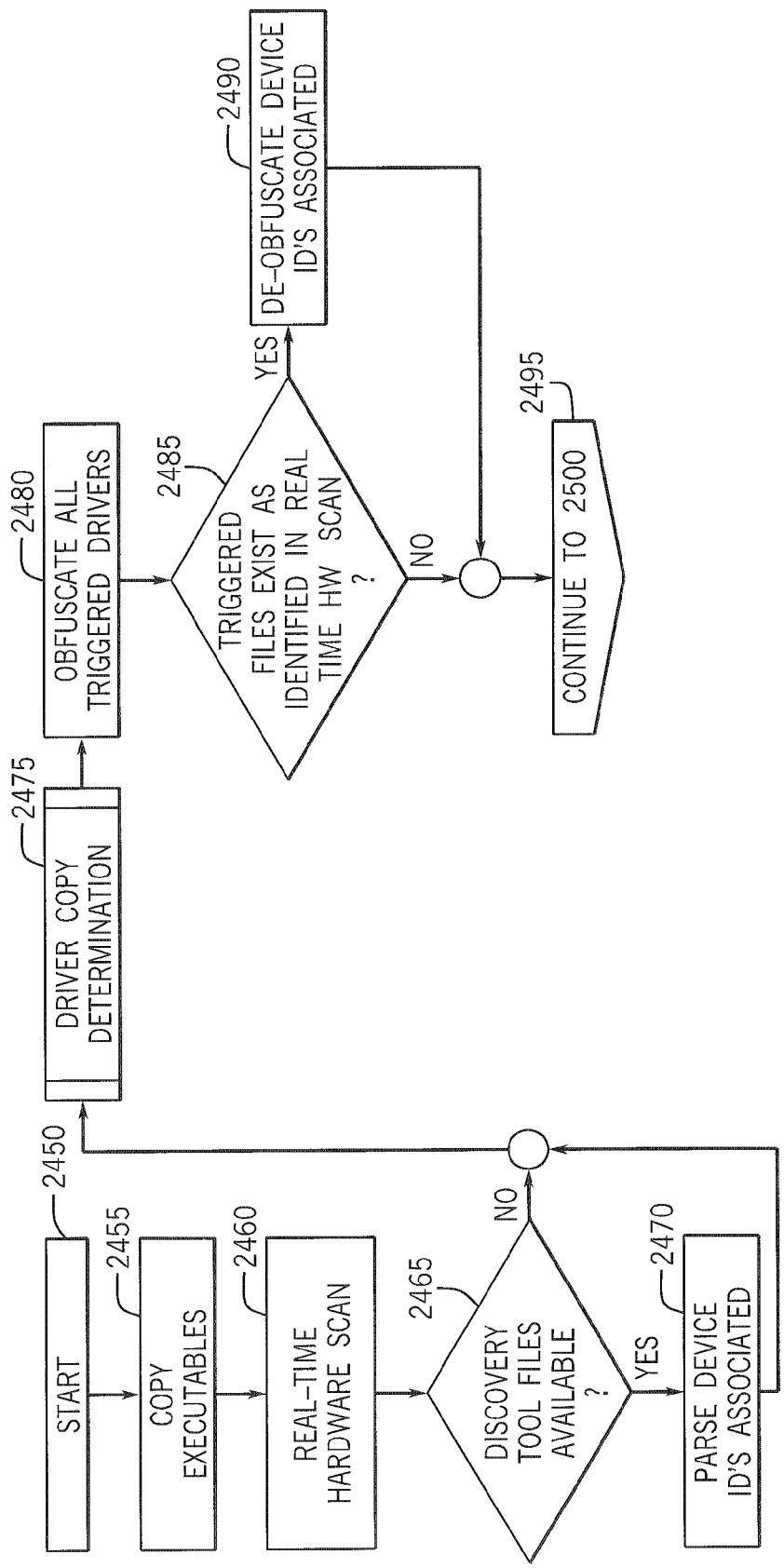
Figure 14B:
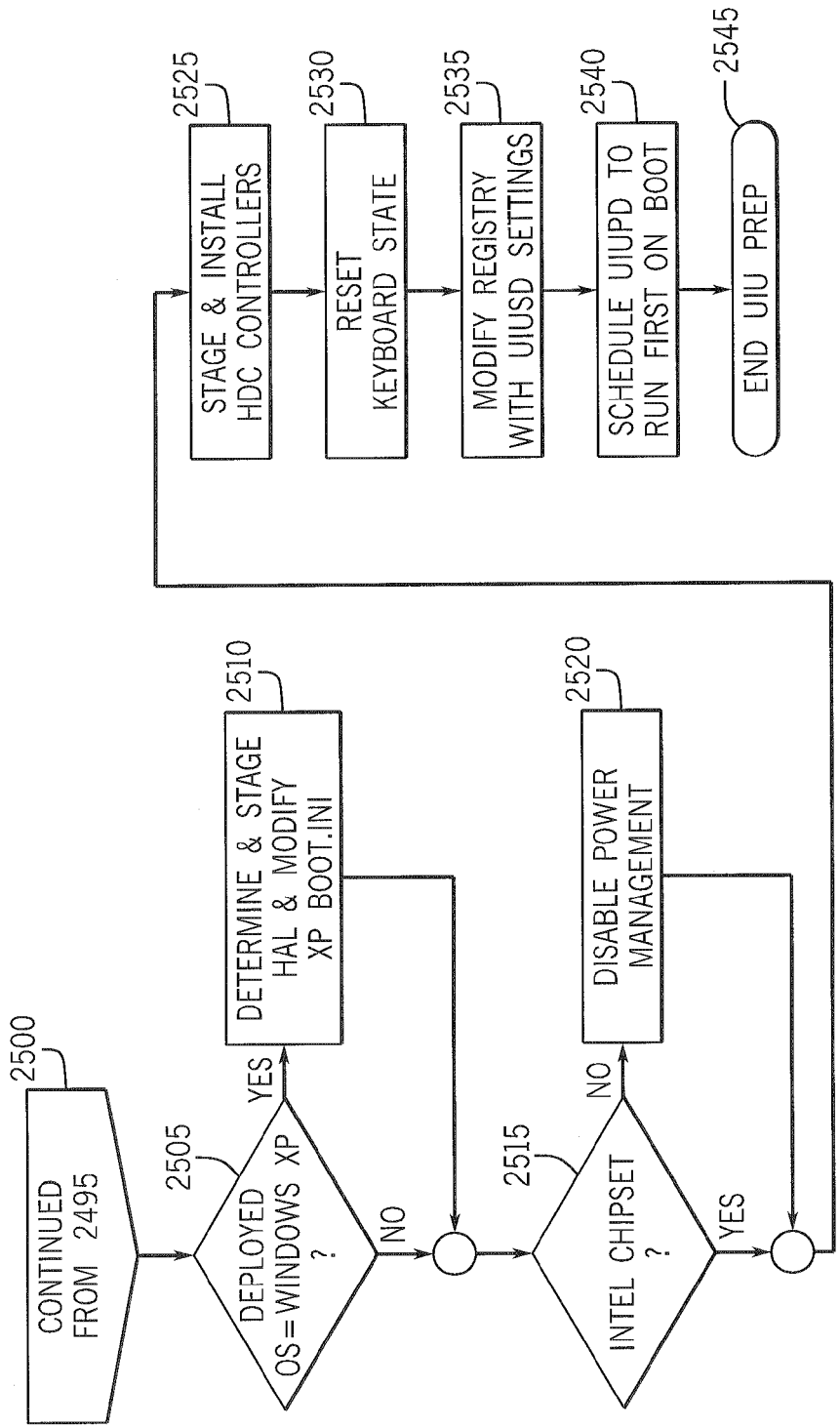

One or more embodiments of the UIUPrep executable that is run at step 324 of FIG. 5B are shown in FIGS. 14A and 14B, starting at 2450 with the copying of executables at 2455. A real-time hardware scan (a preinstallation scan and analysis) can be performed at 2460, as discussed in more detail below. A real-time hardware scan can be implemented as a Windows application programming interface (API) query. In some embodiments, Windows API is used to query the WinPE O/S itself for hardware device IDs (e.g., a list of installed hardware devices can be obtained using the SetupDI class of API functions). Other types of hardware scans can be performed, for example using the UIU Discovery Tool available from Big Bang LLC. Also, hardware scanning is discussed in U.S. Pat. No. 8,132,186, issued to Okcu et al. on 6 Mar. 2012, entitled "Automatic Detection of Hardware and Device Drivers During Restore Operations" (which is incorporated by reference in its entirety for all purposes). Each hardware scan in UIUPrep (and in UIUPD discussed below) generates a list of hardware device IDs based on the UIUPrep hardware scan. The device IDs on each list are compared to drivers in the driver repository 215 that is accessible to each target device in the target device set. The driver repository 215 sends each target device 102 a driver set made up of drivers that are correlated to one or more hardware device identifications in the list generated by the real-time hardware scan (in both UIUPrep and UIUPD). Appropriate staging and installation of the downloaded preinstallation driver set(s) takes place thereafter. The comparison of a hardware device ID list to the driver repository contents and the delivery of drivers by the driver repository 215 to each target device 102 is performed using the second channel 213, both for UIUPrep in the temporary operating system as well as for UIUPD scanning and driver downloads below. Thus hardware device identification, driver correlation and installation is automated.

Using such a real-time hardware analysis tool, if available at 2465, device identifications are parsed at 2470, so that a list of hardware device IDs can be stored in the files associated with the real-time hardware analysis tool. At 2475 a determination is made as to which set(s) of drivers as defined by any UDBs in the driver repository 215 (a memory that is part of the deployment device on which the UIUSD Package 209 is located) are made available to be copied and delivered to each target device via the second communication channel 213 in step 2720 (either automatically or by user selection of a specified UDB), as shown in more detail in one or more embodiments in FIG. 15, illustrating how drivers are found and copied from a specific driver database (UDB). If no specific driver database is called out during the UIUSD Machine Configuration task, then step 2715 of FIG. 15 determines the latest one; if a specific driver database called out, that name was sent to UIUPrep and is accessible in step 2710, making step 2715 and its evaluation flow of FIG. 16 irrelevant. The existence of triggered files is determined by the comparison of the discovered device IDs with the selected UDB. The UDB can be a flat reference file or "database" which relates the location of files stored within the driver database to device IDs. In some embodiments disclosed herein, "triggered" files mean that the device driver files will be included in the driver database, referenced through the UDB, however the information (INF) file or Setup Information File will be obfuscated by renaming the file to something other than *.INF, such as *.2NF until such time that it is determined (e.g., by UIUPrep) that it is required for a target machine, after which that file is renamed to *.INF on the target machine. This allows some embodiments to handle situations where driver files are not specific enough to be correctly identified solely by the device ID references in their INF files.

The UIUPrep executable continues at 2505 in FIG. 14B by determining whether Windows XP is the deployed operating system. If so, then the HAL can be determined and staged appropriately, also the Windows XP BOOT.INI can be modified as necessary or appropriate at 2510. A determination as to use of an Intel chipset can be made at 2515 and power management disabled if desired at 2520. Thereafter at 2525 hard disk controllers (HDC controllers) can be staged and installed (forced installation of the HDC Controllers ensures bootability of the target device when it subsequently boots into the full operating system); the keyboard state can be reset at 2530; the registry can be modified with UIUSD settings at 2535 (e.g., relating to HDC on XP, local Device Path, Run Once, GINA & credential providers, local driver store cleansing, etc.); finally, UIUSD Post Deployment can be scheduled to run on the first boot in the full O/S at 2540. The UIUPrep preparatory processing is run at step 324 of FIG. 5B ends at 2545.

The driver copy determination at 2475 can be performed in some embodiments as shown in FIG. 15, which starts at 2700 and determines at 2705 whether or not a given driver's UDB name argument has been received. If the UDB name argument has been received, then the driver UDB is recorded as a target at 2710. If not, then one or more (or all) of the driver UDBs in the UIUSD Package path can be evaluated at 2715 (as discussed in more detail in connection with FIG. 16, below) and the drivers from the target UDB can be copied at 2720, as explained and shown in more detail in connection one or more embodiments of a Hardware Correlation shown in FIGS. 18, 19, 20A, 20B and 21-23, below. Device drivers identified are copied from the driver database associated with the Target UDB directly as a driver package to the target machine's file folder structure. The driver copy determination ends at 2725.

Figure 16:
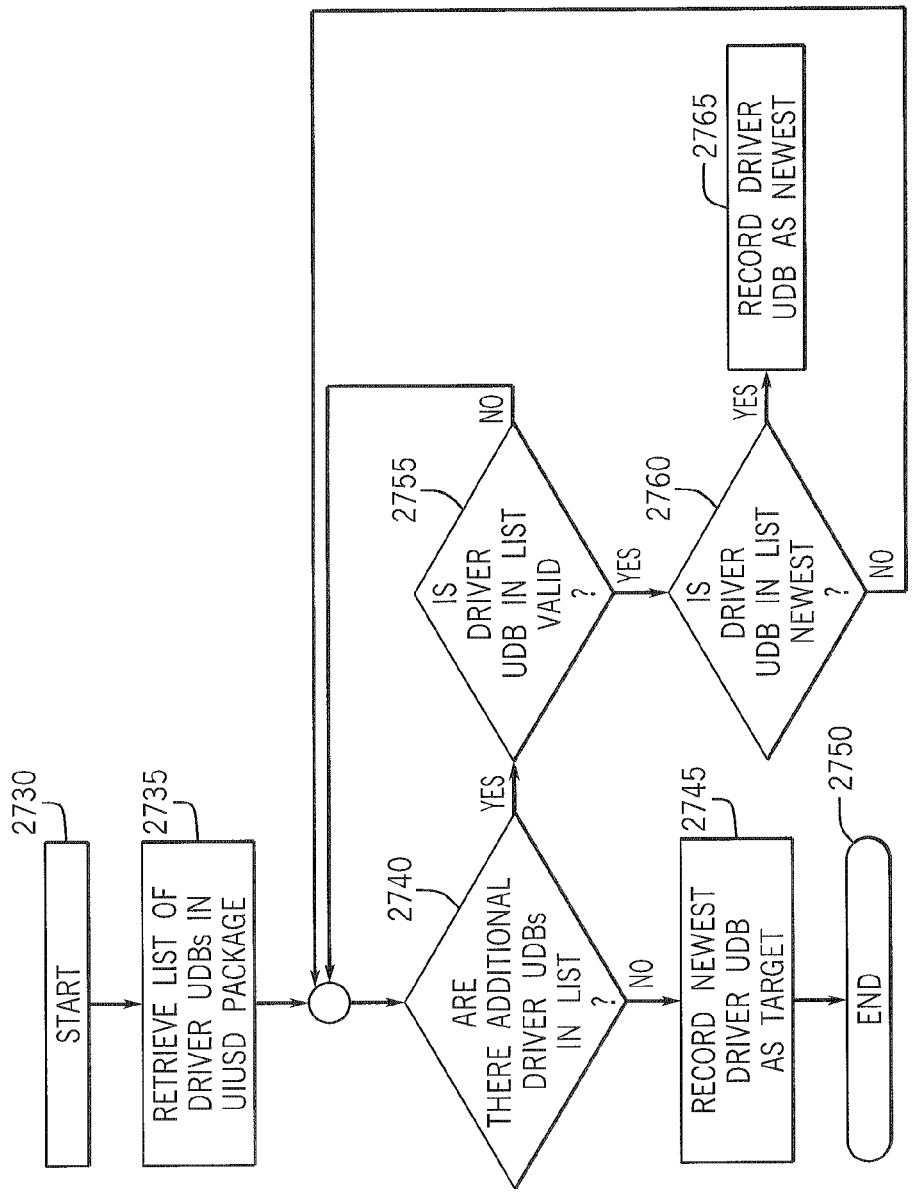

Some embodiments involving the evaluation of driver UDBs in the UIUSD Package 209 can be performed as shown in FIG. 16, starting at 2730 and including retrieval of a list of driver UDBs in the driver repository 215 in the distributed UIUSD Package at 2735.

If there are no additional driver UDBs in the list as determined at 2740, then the newest (most recent) driver UDB is recorded as the target at 2745. If there are additional driver UDBs in the list, then an additional driver UDB in the list has its validity checked at 2755 as well as its status as the newest driver UDB in the list at 2760. If the additional driver UDB in the list is both valid and the newest, then it is recorded as the newest UDB in the list at 2765.

WinPE is closed/terminated by the deployment solution or by the UIUSD, depending on the specific implementation. In the SCCM setting shown in FIG. 13, WinPE is closed by the SCCM Client at 2420.

Post-Deployment Processing

Post-deployment processing (UIUPD) is performed at step 330 of FIG. 5C, one or more embodiments of which are shown in FIGS. 17A and 17B. Post deployment starts at 2550 after the target device 102 has been booted into the full operating system (e.g., at step 2420 of FIG. 13 and/or step 328 of FIG. 5C). The first post-deployment stage (also at step 2425 of FIG. 13 and/or step 330 of FIG. 5C) begins with the removal of existing driver references and/or OEM files in the target device's driver store at 2555. Any desired certificates can be installed at 2560, after which drivers can be staged at 2565 with a suitable driver installation framework such as DIFX API. If the deployed O/S is determined at 2570 to be Windows XP, then the HAL is modified at 2575. Mini-setup begins at 2580 with a real-time post-deploy hardware scan at 2585, which can be the same type of hardware scan used during UIUPrep, here used to discover "child devices" not found in the UIUPrep processing above. This occurs when an earlier device scan (e.g., UIUPrep in WinPE, above, or a previous scan performed initiated by UIUPD in the full operating system) fails to find devices that are dependent upon "parent devices" (discovered during the earlier UIUPrep or UIUPD device scan) until the parent device is installed. Device IDs associated with triggers are then de-obfuscated at 2590 and the driver installation framework (e.g., DIFX) is launched again at 2595. A UIUPD hardware device ID list can be generated and compared to the drivers in the driver repository 215 (again using the second communication channel 213), as was done during UIUPrep. Drivers that are correlated to hardware IDs on the UIUPD hardware scan list are received by the target device 102 from the driver repository 215 in a first post-deploy driver set sent via second communication channel 213 are then staged and installed at 2600, after which a post-setup hardware scan service calling function and a PDI daemon and wallpaper can be installed at 2605 and 2610, respectively. The target device 102 is then rebooted into the full O/S at 2615 (also step 2430 of FIG. 13) to begin the second post-deployment stage.

The second post-deployment stage (in some embodiments corresponding to step 2440 of FIG. 13) begins in FIG. 17B with a login at 2630 followed by initialization of the PDI daemon (which is removed if initialization is successful). The PDI daemon might not be deployed in UIUSD management in all embodiments. The PDI daemon can be used as one method of counting in a Per Deployment Instance authorization mode. It is included in the disclosure of some embodiments herein in the event that it is used in such embodiments. Successful initialization means that the target machine has communicated with an appropriate authorizing agent or the like and that the per deployment instance has been counted. The PDI daemon is then removed from the system.

The target device's display options can be analyzed and set at 2640 and a second post-deploy real-time hardware analysis performed at 2645, e.g., using HWSCAN from the UIUSD Package (UIUPD has stopped operating due to the rebooting into the full operating system at 2615 and subsequent login at 2630, so the hardware scanning at this point in some embodiments is done by something other than UIUPD). If no new device IDs are determined to exist at 2650, the second post-deployment stage ends at 2655. However, if device IDs are found for previously undiscovered hardware devices (e.g., child devices for which drivers were not originally copied to the machine through the UIUPrep executable), then UIUPD can reconnect to the UIUSD Package via the second communication channel 213, be authenticated again at 2660, and then locate and download appropriate drivers to be staged in the Driver Store on the target machine for enumeration and installation after a reboot. This is not disclosed, taught or suggested by earlier deployment systems like SCCM and Prabu and represents another use of the second communication channel 213 noted above. Drivers are copied from the driver repository 215 to the target device using the second communication channel 213 at 2665 (again, drivers determined to be needed based on discovered hardware device identifications are specified so that only the drivers needed by the specific target device are downloaded, not an entire driver package that in prior systems would include unnecessary drivers and could represent extensive data transmission slowing deployment of the new operating system to the target device). Any triggered drivers are obfuscated at 2670 and an evaluation of whether any triggered files exist as identified in the real-time hardware analysis is performed at 2675. Any newly discovered plug-and-play IDs associated with the target device 102 can then be de-obfuscated at 2680. Drivers can then be staged (e.g., using DIFX) at 2685 and the UIUSD Post Deployment staged at 2690 to run after rebooting, which occurs at 2695. The second post-deployment stage of FIG. 17B can be run multiple times to seek out and address all hardware/device IDs that might not be found in a first execution.

As noted above, hardware correlation with a driver repository 215 in the UIUSD Package 209 or the like (via the second communications channel 213) can be performed during UIUPrep using the one or more embodiments shown in FIGS. 18-23. In a more generalized review of the hardware correlation process in FIG. 18, a temporary operating system is executed in the target device 102 at 3105 as part of the UIUPrep (the "deployment agent" of Prabu). At 3110 hardware on the target device is scanned "live" (in real time) to determine what hardware is present in/on the target device 102. Embodiments of operating system deployment and computer management herein then locate and copy drivers to the target device using the second communication channel 213 at 3115 (the target device is also referred to in the Figures as an "offline machine" in light of its operation in the temporary operating system rather than a full operating system) and then ends the live hardware discovery process. As noted at step 3115, the drivers located and copied are "specific to the 'offline' machine" in this UIUPrep processing.

Figure 19:
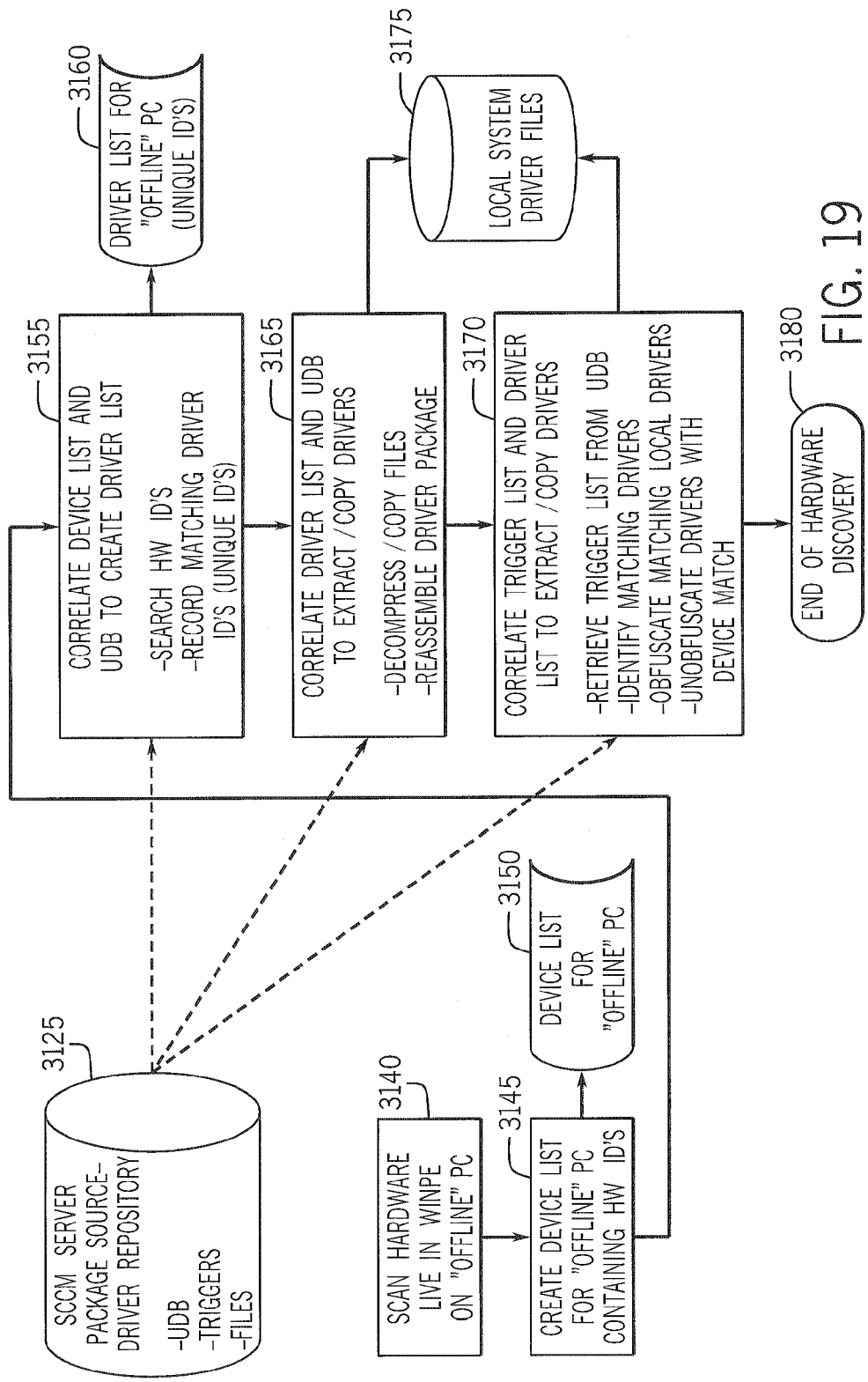

A more detailed process showing one or more embodiments of hardware correlation in the pre-installation environment is found in FIG. 19. An SCCM server package source 3125 (e.g., in IDS 206 of FIG. 4) includes driver repository 215 comprising a memory holding one or more user databases (UDBs), triggers and files. As in the simplified process of FIG. 18, the process of FIG. 19 starts with a hardware scan in a temporary operating system (e.g., WinPE or the like, Prabu's "deployment agent") on the target device 102 at 3140, which at 3145 generates a target machine device list of hardware IDs that is stored in memory/database 3150. At 3155 the stored device list is correlated with (compared to) the selected UDB, supplied by memory 3125, to create a driver list stored in memory/database 3160 for the given target device. This can be done in some embodiments by searching hardware IDs and recording matching driver IDs (e.g., using unique driver IDs in the UDB). At 3165 the driver list and UDB are correlated to extract and copy drivers, for example by decompressing and copying files and reassembling a driver package. At 3170 a trigger list and driver list are correlated to extract and copy drivers by retrieving the trigger list from the UDB, identifying matching drivers, obfuscating matching local drivers and de-obfuscating drivers having a device match, after which hardware discovery ends at 3180.

During both 3165 and 3170, local system driver files stored in memory/physical file storage 3175 can be accessed as needed, as seen in FIG. 19.

Figure 20A:
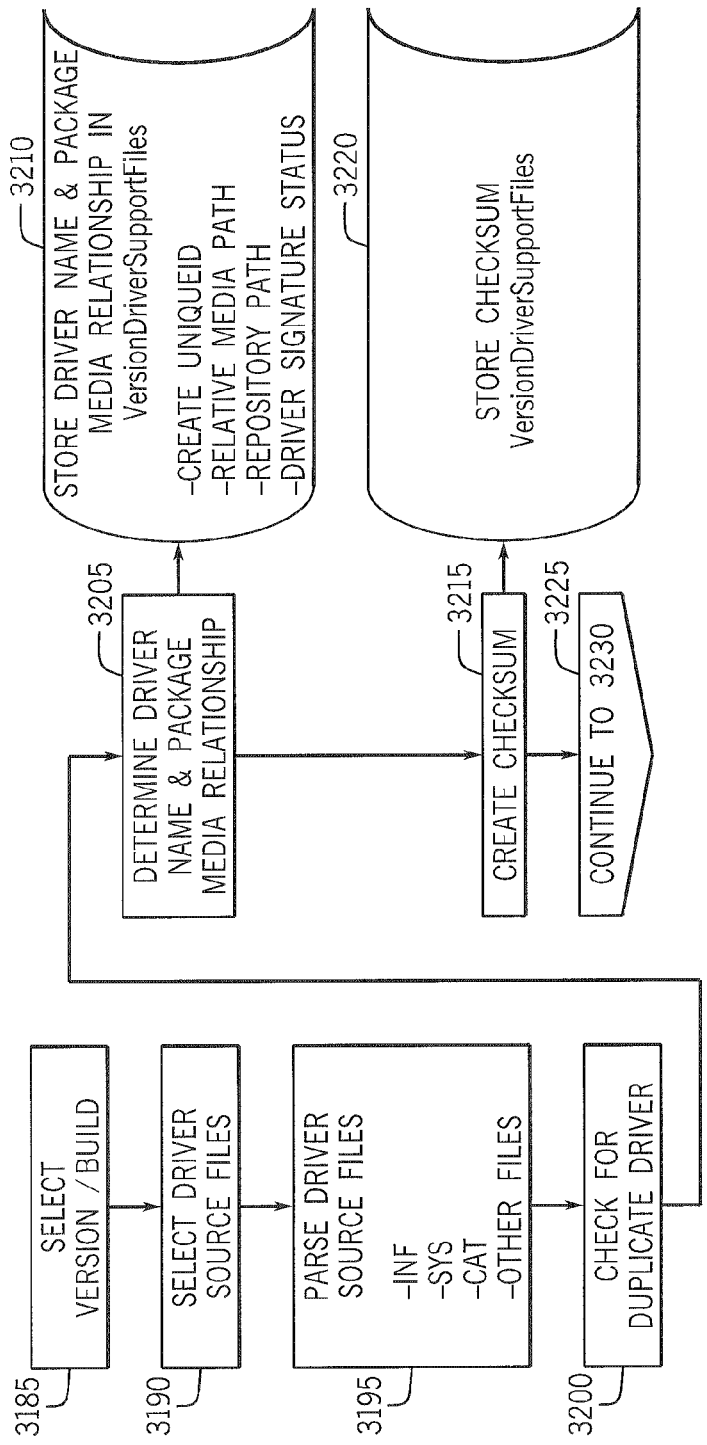
Figure 20B:
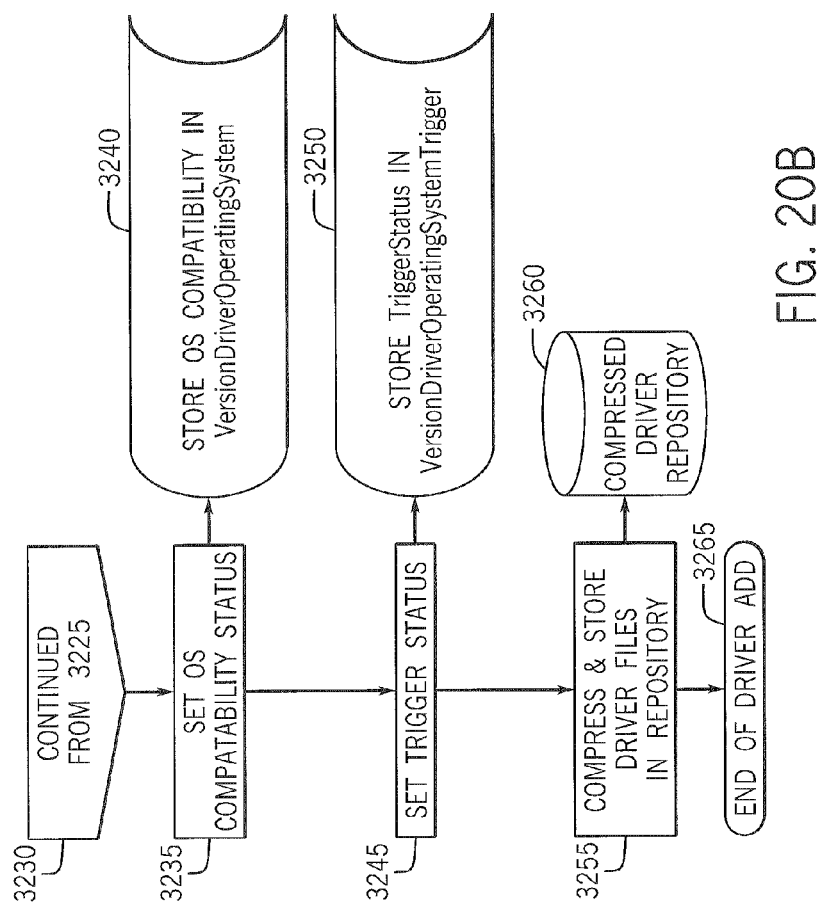

Adding drivers to a UDB or the like in some embodiments is shown in FIGS. 20A and 20B. A driver database version is selected using a build or version number at 3185. Embodiments of the Driver Add Management Process can be used to add a driver database version. Each version can represent a particular build; however, not every build is a released version so not every build has a version number associated with it.

The selected driver's source files are selected at 3190 and are then parsed at 3195 (e.g., using INF, SYS, CAT and/or other file types and/or characteristics). A check is made at 3200 for any duplicate driver(s) before determining the driver name and package media relationship at 3205, after which the driver name and package media relationship can be stored in memory/database 3210 (e.g., in VersionDriverSupportFiles using a created uniqueID, relative media path, repository path and driver signature status). A checksum is then created at 3215 and stored in memory/database 3220. The O/S compatibility status is set at 3235 and stored in memory/database 3240, after which the trigger status is set at 3245 and stored in memory/database 3250. The driver files are then compressed and stored at 3255 in a compressed driver repository 3260 before the driver adding process ends at 3265.

Figure 21:
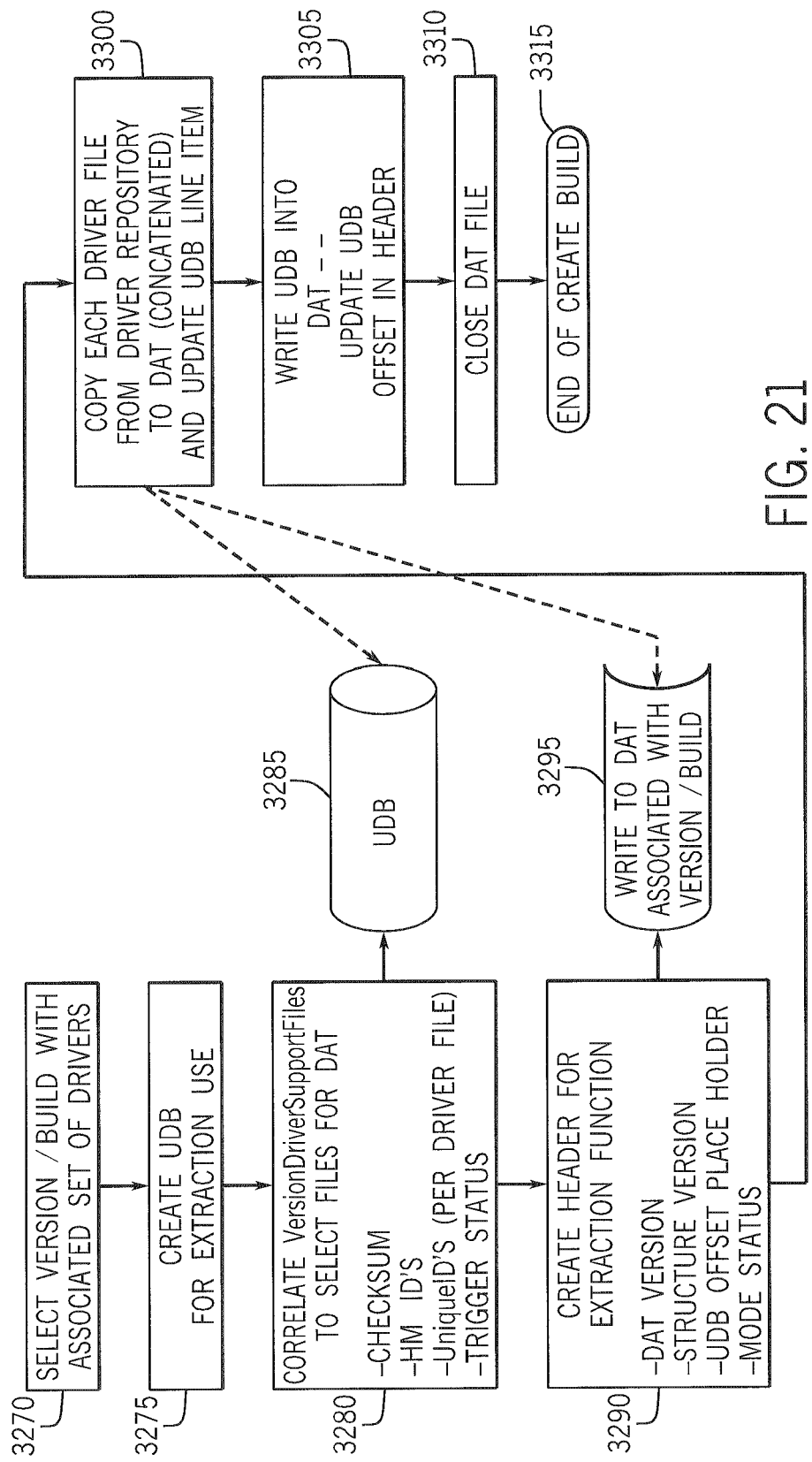
Figure 22:
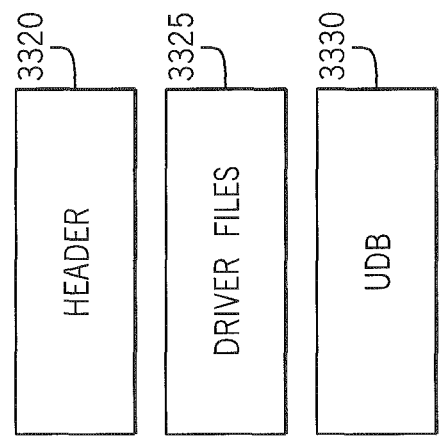

One or more embodiments of a create build management process are shown in FIG. 21, outlining one or more embodiments for creating a driver database build after drivers are added to the driver database version/build. At 3270 a version/build having an associated set of drivers is selected and a UDB created at 3275 for extraction use. The VersionDriverSupportFiles database table is correlated at 3280 with selected files for DAT (e.g., checksums, hardware IDs, uniqueIDs per driver file and trigger status) and the results of that process are provided to UDB 3285. A header for the extraction function is created at 3290 (e.g., including a DAT version, a structure version, a UDB offset placeholder, and a mode status), which is written to a DAT memory/database 3295 associated with the given version/build. At 3300 each driver file from the driver repository is copied to DAT 3295 (e.g., using concatenation) and the line item of UDB 3285 is updated. At 3305 the UDB is written into a DAT and a UDB offset in the header is updated and then the DAT file is then closed at 3310 before the create build process ends at 3315. The DAT file construction is shown in FIG. 22, there is a header 3320, the driver files 3325 and the UDB 3330.

Figure 23:
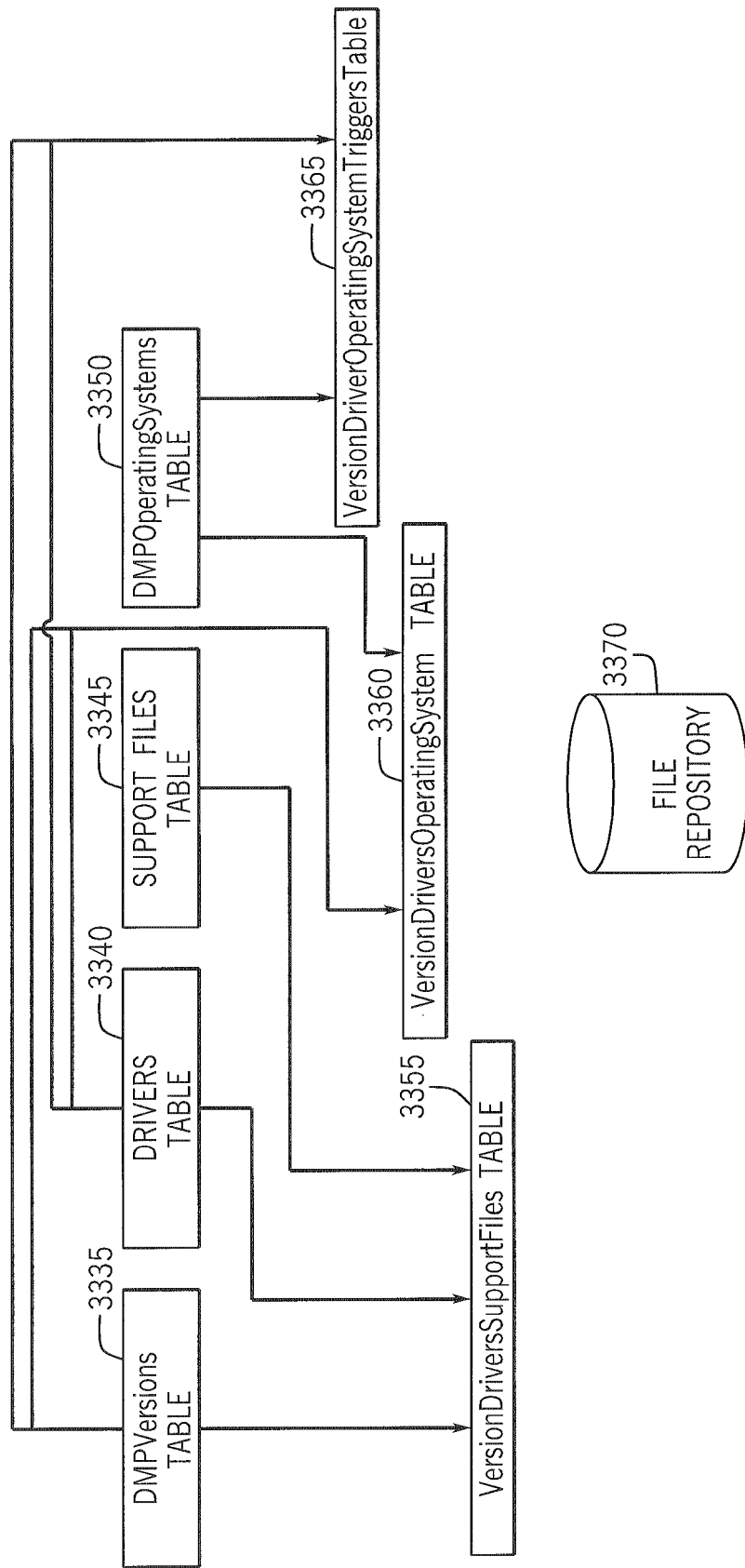

FIG. 23 illustrates embodiments of a driver management database in which a DMPVersions Table 3335 provides data to a VersionDriversSupportFiles Table 3355, a VersionDriversOperatingSystem Table 3360 and a VersionDriversOperatingTriggersSystem Table 3365. Similarly, a Drivers Table 3340 also provides data to Tables 3355, 3360 and 3365. A support files table 3345 provides data to Table 3355, while a DMPOperatingSystems Table 3350 provides data to Tables 3360 and 3365. A file repository 3370 holds actual driver files in a file folder structure, referenced by SQL tables in a Driver Management Database.

Updating

One or more processes are shown in FIGS. 24-39 that can be implemented in some embodiments to update apparatus, software, etc. in UIUSD computer management. For example, the updating processes and apparatus can be used to allow UIUSD management embodiments to talk to an outside party and/or updating service to obtain periodic updates to UIUSD management code or driver databases.

A UIUSD Updater module 219 or the like can be installed in the automated deployment service 200 as shown in FIG. 4. Updater 219 can maintain (or establish from time to time) a connection with a UIUSD Management updating service 221 or the like. The UIUSD Updater is launched at 1405 and uses a timer check loop at 1410 to determine when to run. If it is determined at 1415 that no previous updates have been provided, then a UIUSD License Key can be validated at 1420 (and in accordance with one or more embodiments shown in FIG. 25, as described in more detail below). If the UIUSD License Key is not valid at 1425, then a request for a valid key is sent at 1430 and the validation 1420 performed again. If previous updates are determined to have been provided or a valid UIUSD License Key presented at 1425, then an update check is run at 1440 (e.g., in accordance with one or more embodiments provided in FIGS. 26A, 26B and 27, as described in more detail below). If UIUSD updates are not available at 1445, then a "No updates available" message can be provided at 1450, otherwise UIUSD product updates are downloaded at 1455 (e.g., in accordance with one or more embodiments provided in FIGS. 28A, 28B and 29-34, as described below), and an "Updates complete" message provided at 1460. The UIUSD Updater then goes into idle mode at 1465.

Figure 24:
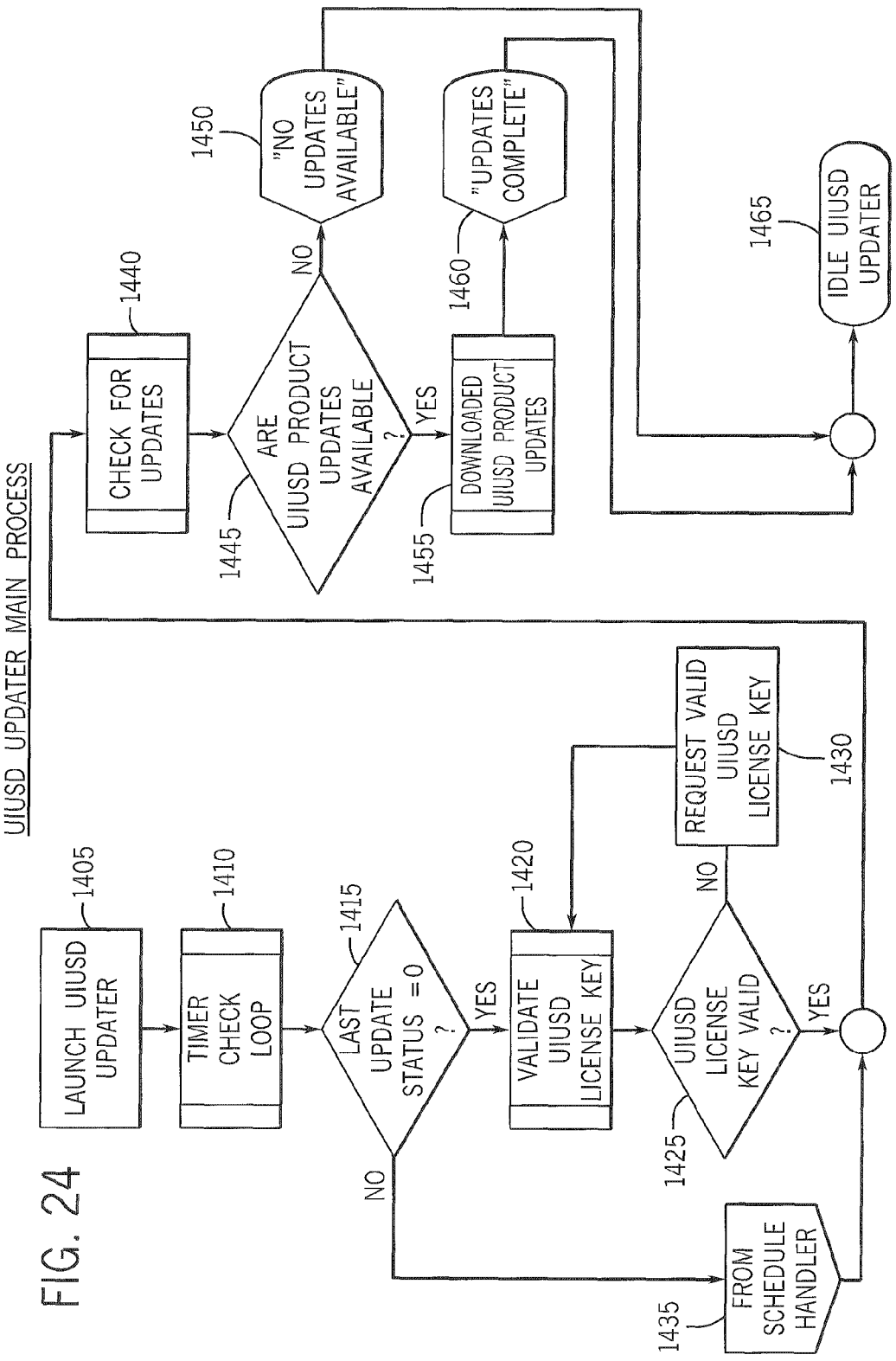
Figure 25:
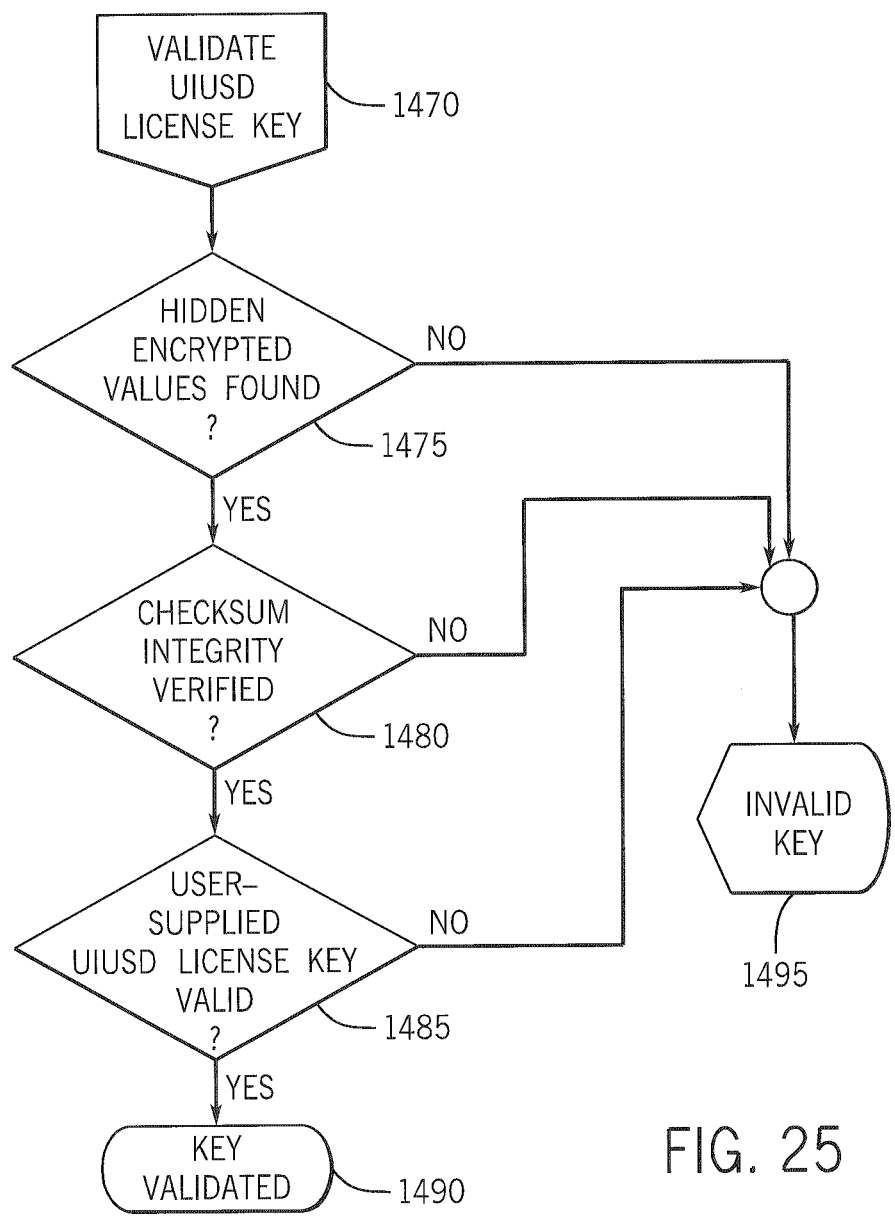

Validation of a UIUSD License Key at step 1420 of FIG. 24 can be performed in accordance with one or more embodiments of the validation process shown in FIG. 25, which starts at 1470 and then seeks hidden encryption values at 1475. If no such values are found, the key is designated as invalid at 1495. If the values sought in 1475 are found, then the integrity of the checksum value is verified at 1480. Again, failure of this test results in a designation as invalid at 1495. Finally, a user-supplied UIUSD License Key is supplied and tested at 1485. Failure here leads to a designation as invalid at 1495. If all three tests 1475, 1480 and 1485 are passed, the UIUSD License Key is validated at 1490.

Figure 26B:
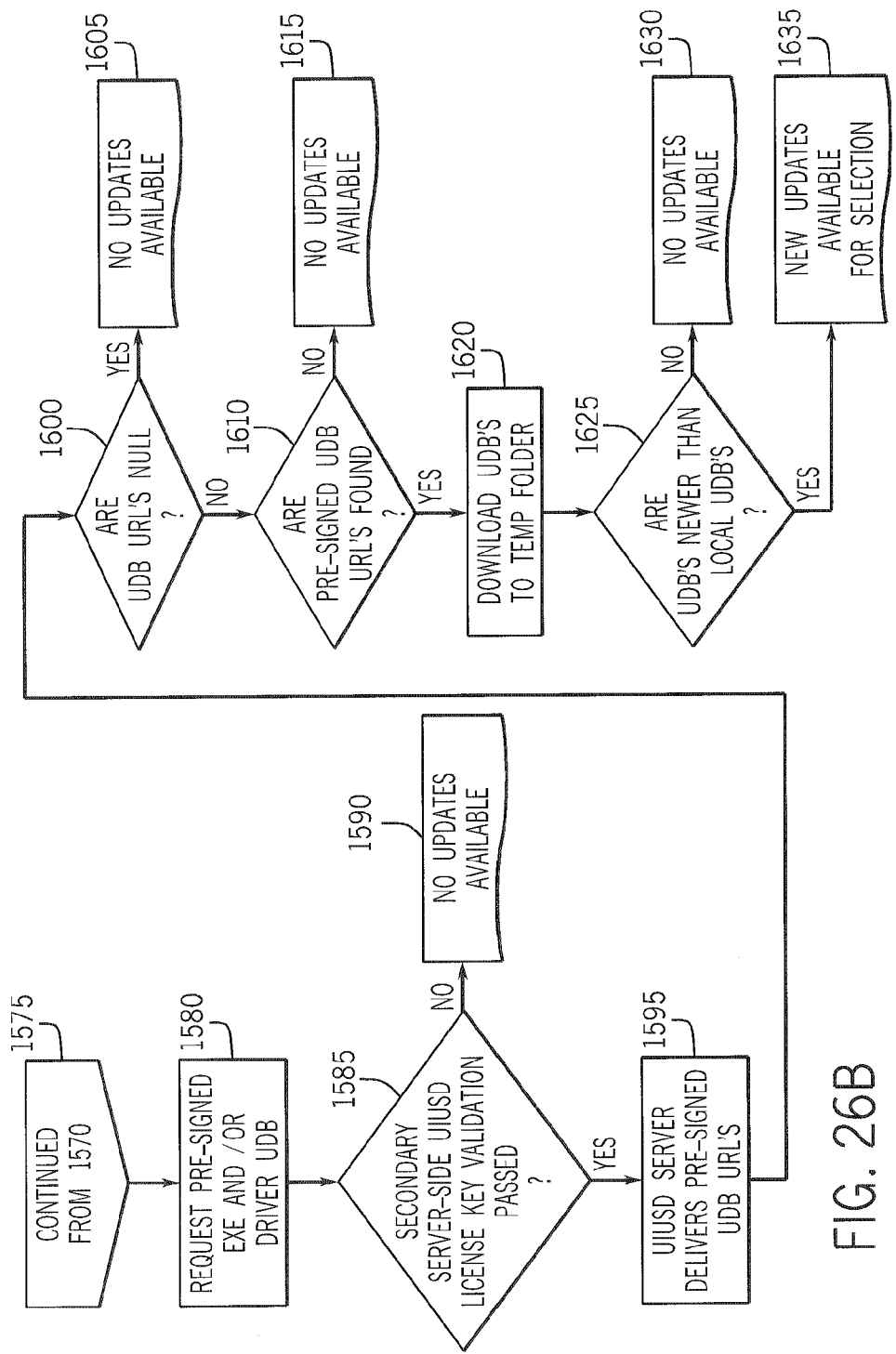
Figure 27:
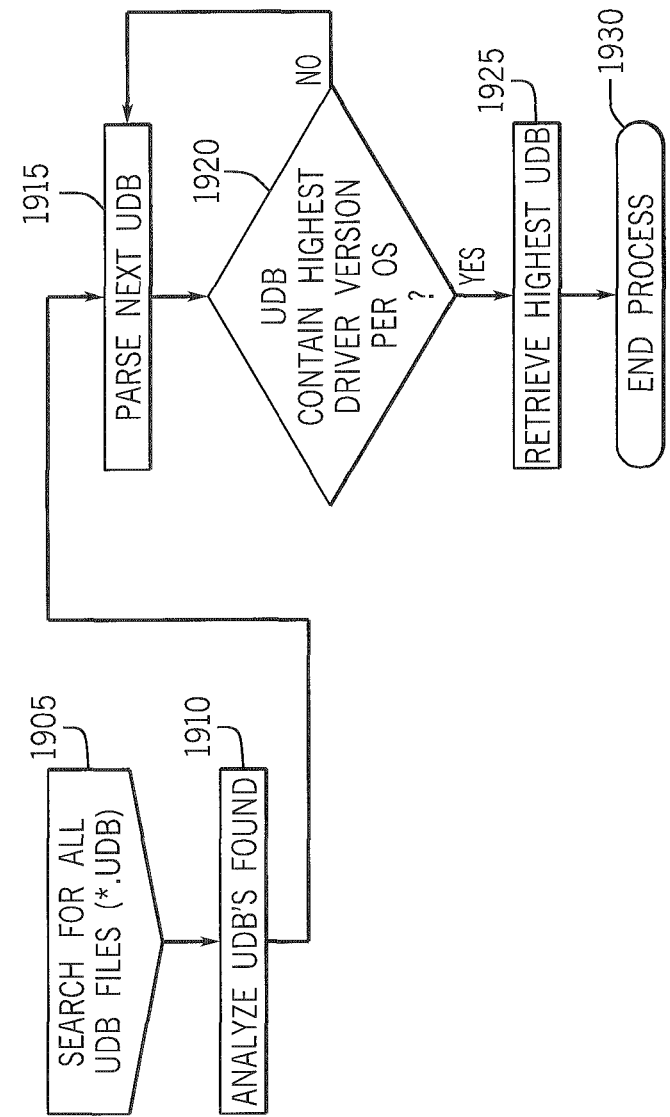
Figure 28A:
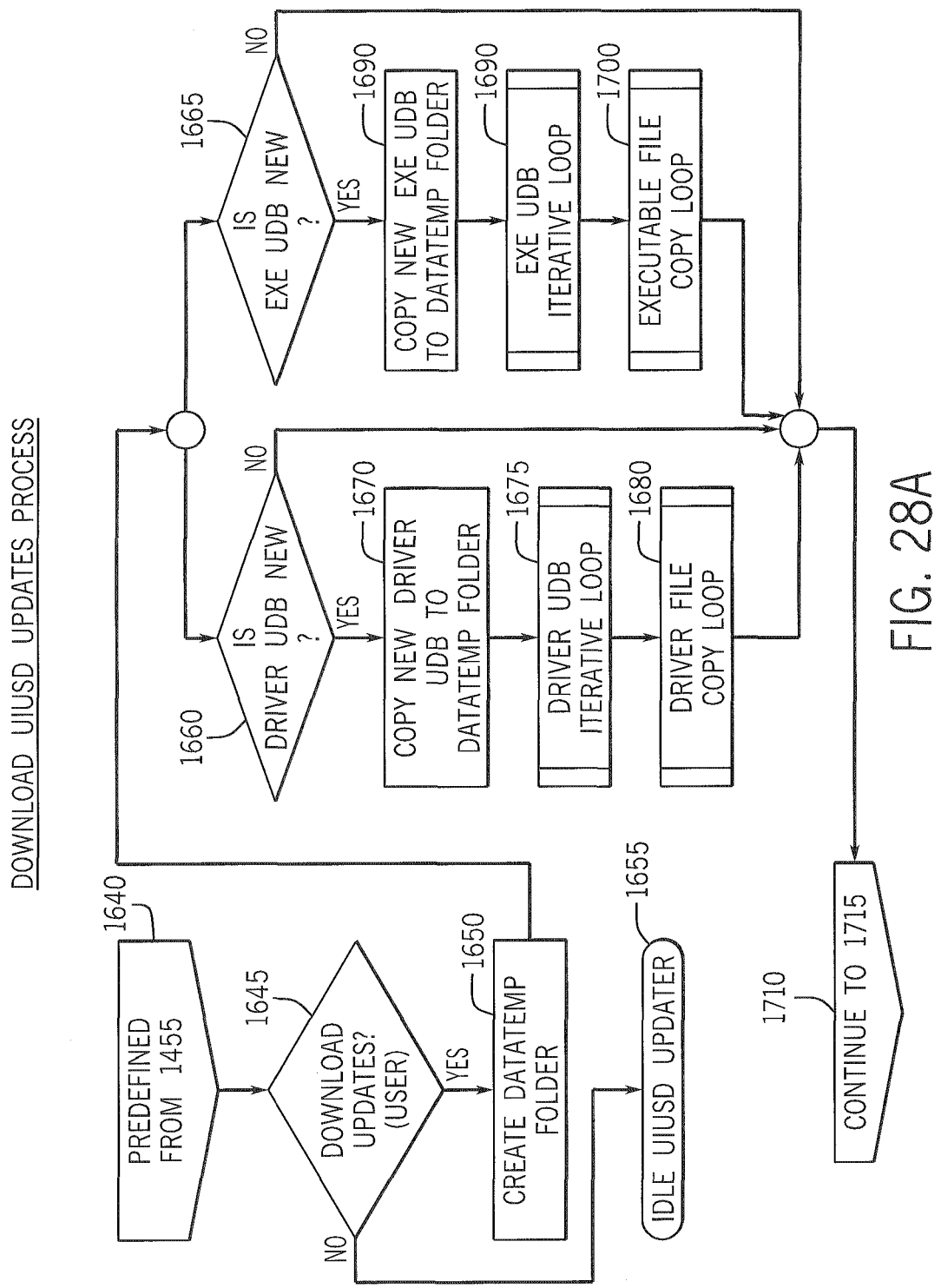
Figure 28B:
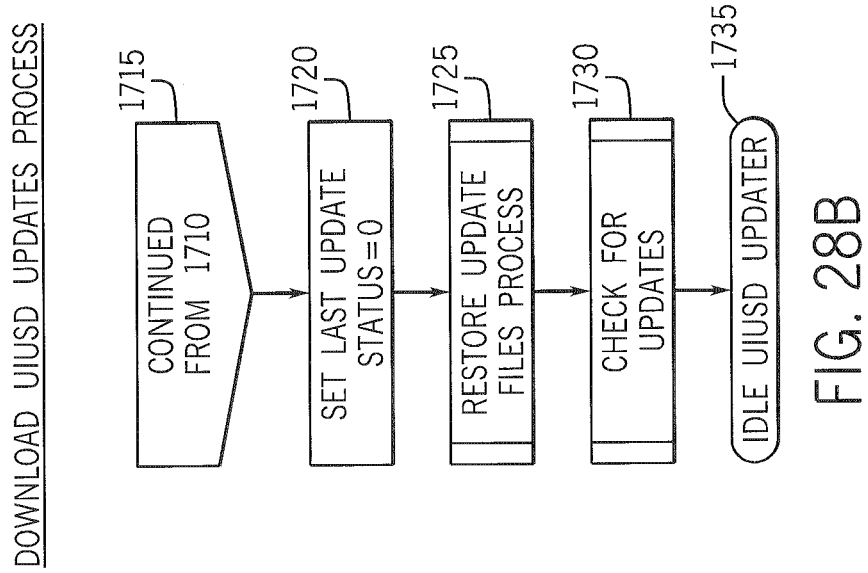

The update check 1440 of FIG. 24 can be performed in accordance with one or more embodiments of the update check process shown in FIGS. 26A and 26B, which starts at 1500 and then determines if a new UIUSD Updater is available. If so, then the new UIUSD Updater is retrieved at 1525, the existing UIUSD Updater is exited at 1530 and deleted at 1535. The new UIUSD Updater is copied at 1540 and executed at 1545. If no new UIUSD Updater is available at 1505, then a determination is made as to find the best UDB available. One or more embodiments of this step are shown in FIG. 27, which begins at 1905 with a search for all UDB files (e.g., having a *.UDB structure or the like). Any UDBs found are analyzed at 1910 and the first/next UDB parsed at 1915. If the UDB being parsed does not contain the highest driver version for a given O/S, then another UDB is parsed at 1915. When the UDB having the highest driver version per O/S is found at 1920, then it is retrieved at 1925 and the process ends at 1930. Once the latest UDB determination is made at 1510 in FIG. 26A, a search is made at 1515 for a new EXE UDB or Driver UDB on the UIUSD Server. This evaluation looks at UDB files in the UIUSD Package (from the server on which the UIUSD Package source is installed, e.g., SCCM Image Distribution Service (IDS) 206) to determine the latest one to compare against the records of an updating service 221 to determine if an update is available.

If no new EXE or Driver UDBs are found, then no updates are available and the update check ends at 1520. If one or more new UDBs are available, then the Last Update Status is set to "1" and a determination is made as to whether or not the update download has started at 1555. If the update download has not started, then the UIUSD Updater is idled at 1560;

otherwise, the Last Update Status is set to "2" and a request is sent at 1580 for a pre-signed EXE and/or Driver UDB. A pre-signed UDB is a UDB with a signature attached (e.g., Public/Private key technology) to the URL that can be verified on a UIUSD server for security purposes. No signature or an incorrect signature should result in an updating service 221 reporting that no updates are available and would mean that something had been tampered with or was otherwise functioning improperly. A determination is then made at 1585 as whether or not a secondary server-side UIUSD License Key Validation has been passed. If not, updating ends at 1590. If so, then the UIUSD Server delivers one or more pre-signed UDB URLs at 1595 (if the UDB URLs are null at 1600, or if the pre-signed UDB URLs are not found at 1610, then updating ends at 1605). Any found UDBs are downloaded to a Temp folder at 1620 and the downloaded UDBs are checked against local UDBs to determine which are newer at 1625. If the local UDBs are newer, then updating ends at 1630. If the downloaded UDBs are newer, then the new updates are made available for selection at 1635.

When UIUSD products are downloaded at 1455 in FIG. 24, one or more embodiments as shown in FIGS. 28A, 28B, and 29-34 can be used. At 1640 the "Download UIUSD Product Updates" is implemented. If the user decides at 1645 to not download updates, then the UIUSD Updater idles at 1655. If the updates are downloaded, then a DataTemp folder can be created at 1650 and, if a Driver UDB is downloaded, then it is evaluated at 1660 and its ensuing process or, if an EXE UDB is downloaded, then it is evaluated at 1665 and its ensuing process. For a downloaded Driver UDB, if the Driver UDB is not new at 1660, then the Last Update Status is set to "0" at 1720. If the downloaded Driver UDB is new, then it is copied to the DataTemp folder at 1670 and the Driver UDB iterative loop is invoked at 1675. This loop can be one of the embodiments shown in FIG. 30, where predefined loop drivers are queued at 1770 (continuing from step 1675). If there is no other file in the Driver UDB sequence at 1775, then the loop ends at 1795; otherwise, a check is made at 1780 to see if the file is stored locally. If it is, the file is verified as being local at 1785; otherwise, the corresponding Queue entry is marked "Remote" and other files are sought at 1775. After the Driver UDB iterative loop at 1675 is done, then a Driver File Copy loop is performed at 1680. This loop can be one of the embodiments shown in FIG. 32, where predefined loop drivers are queued at 1830 (continuing from step 1680). If there is no other file in the Driver Queue sequence, then the loop ends at 1855. Otherwise, the file is checked to see if it is marked "local" at 1840. If not, the file is verified as a local file at 1845. If it is, then a remote copy process (e.g., one or more embodiments shown in FIG. 33) is invoked at 1850.

Figure 29:
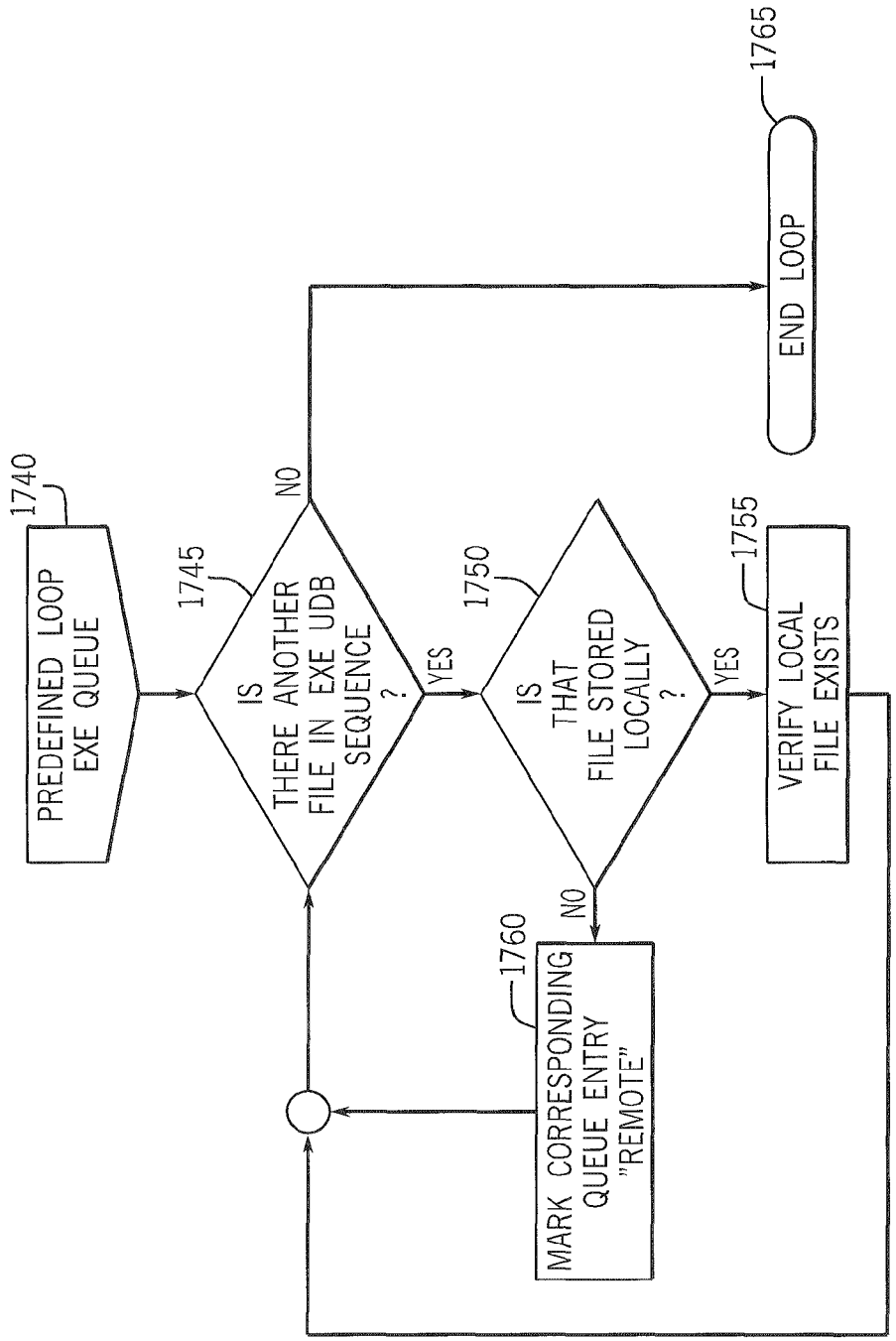
Figure 30:
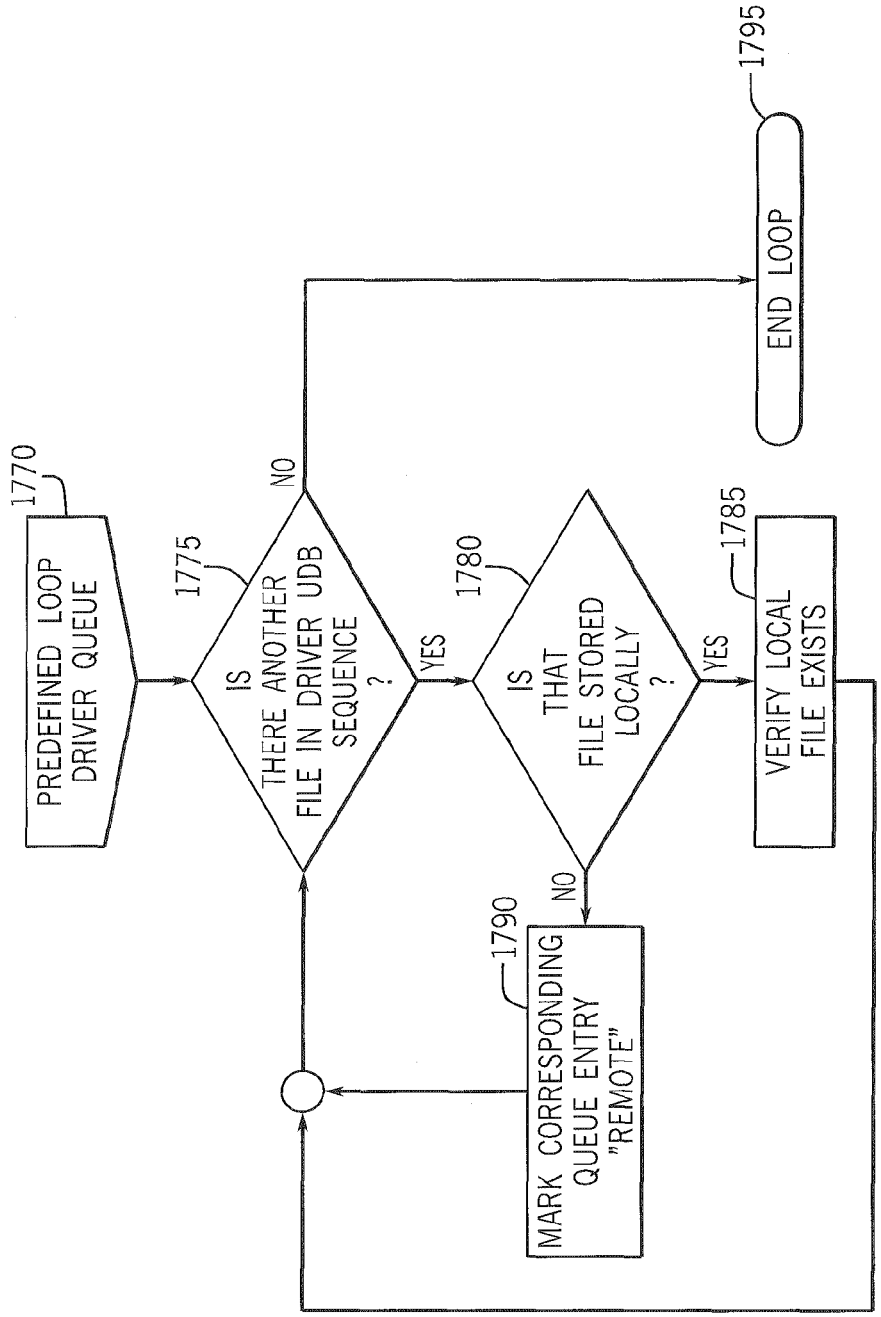
Figure 31:
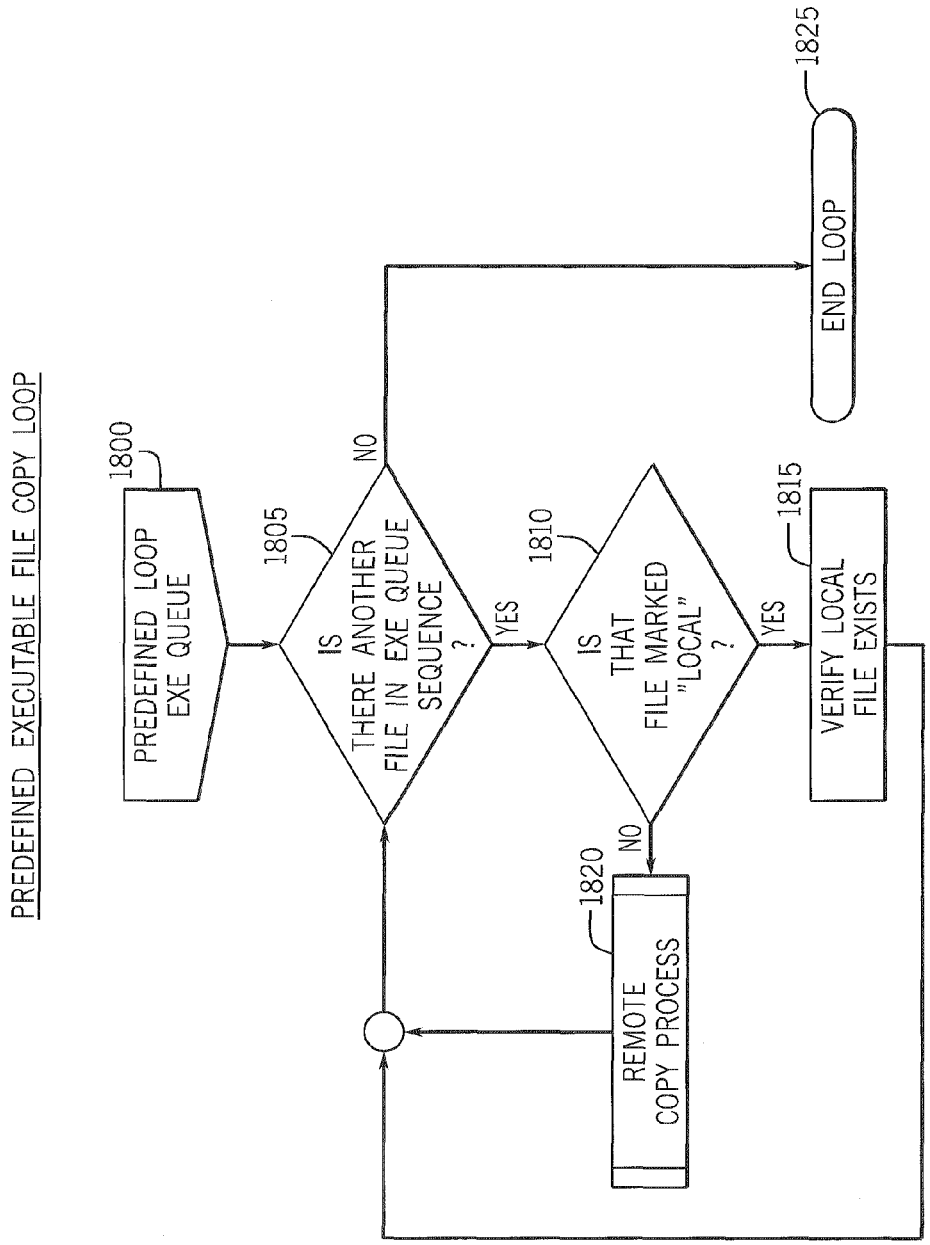
Figure 32:
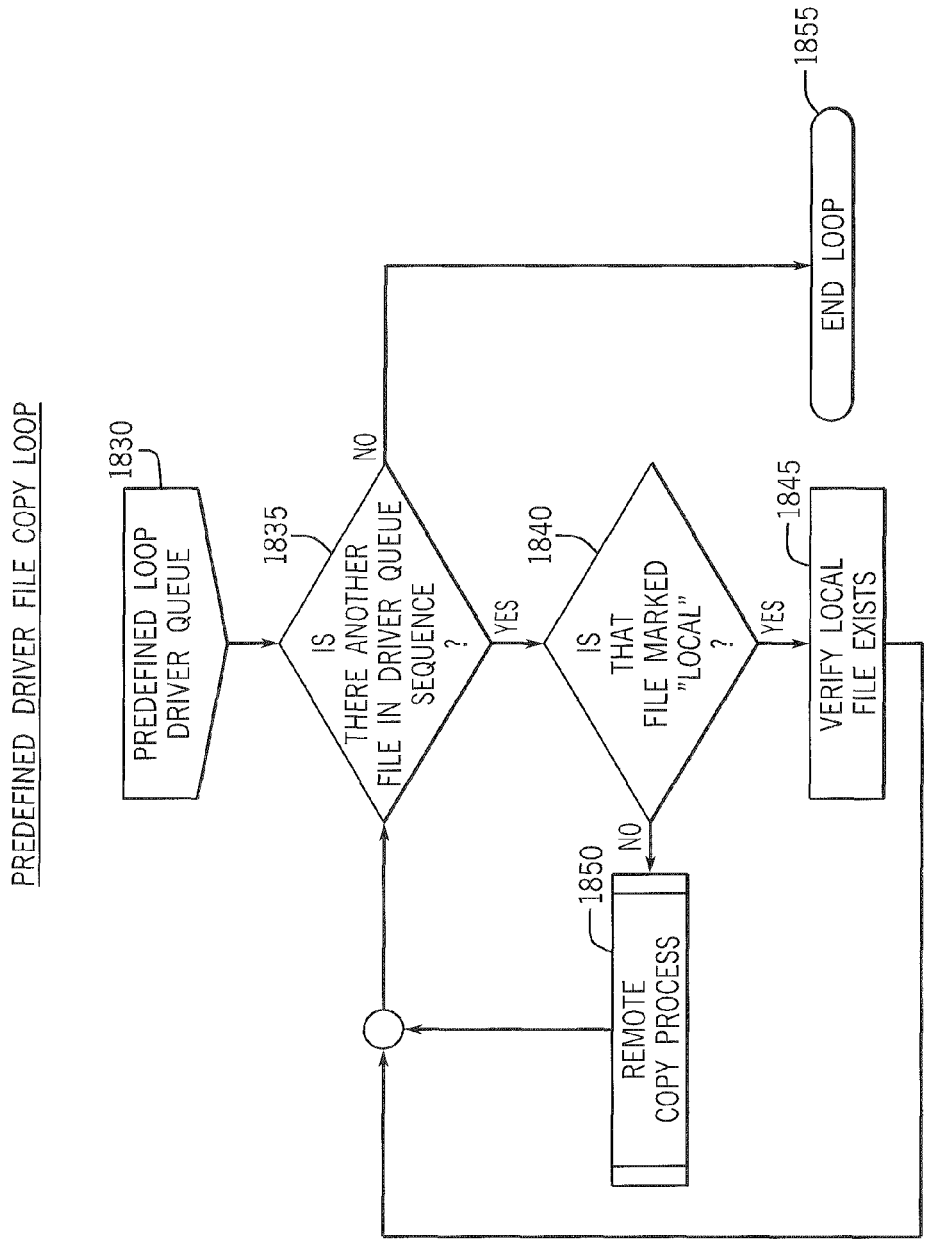
Figure 33:
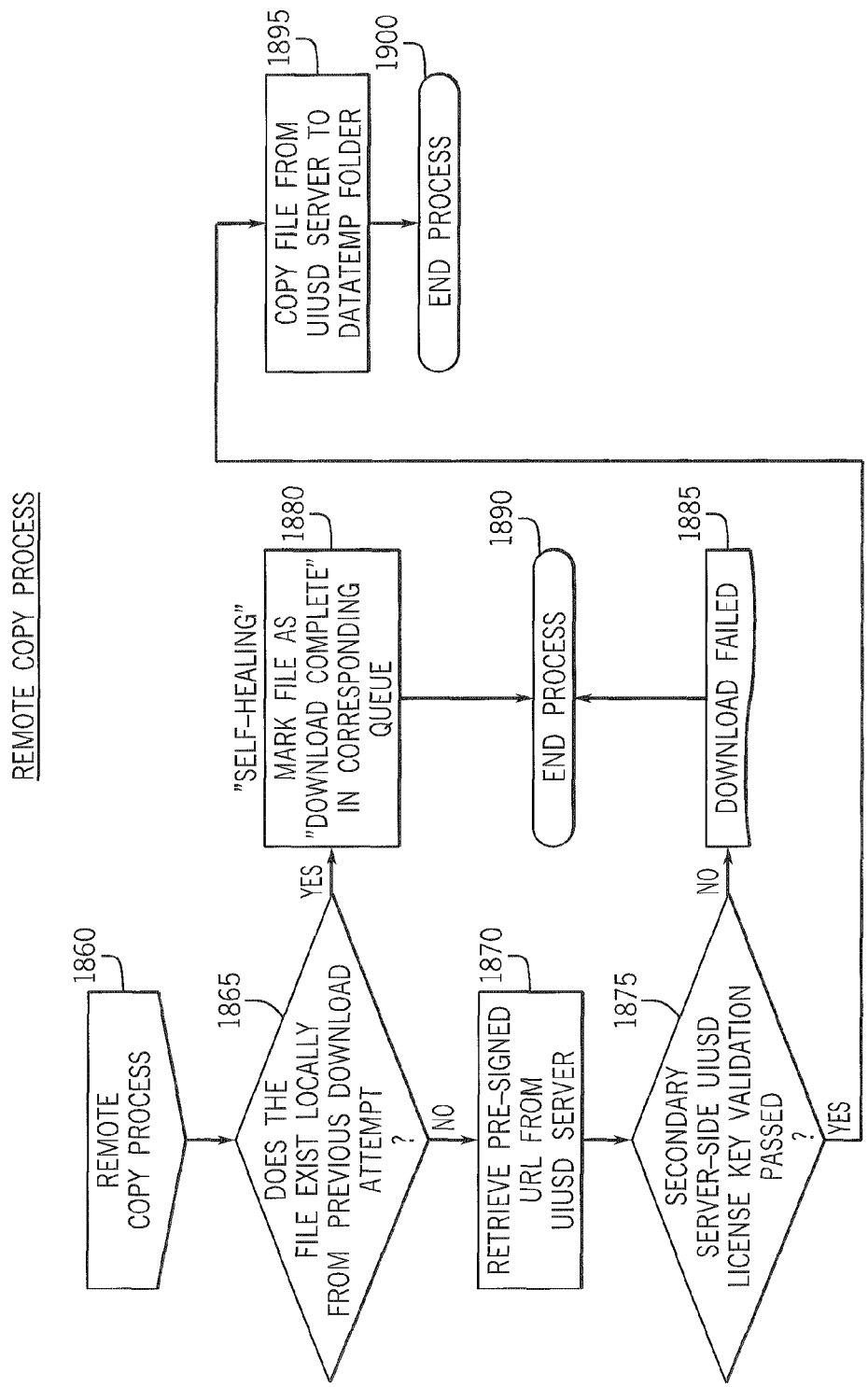
Figure 34:
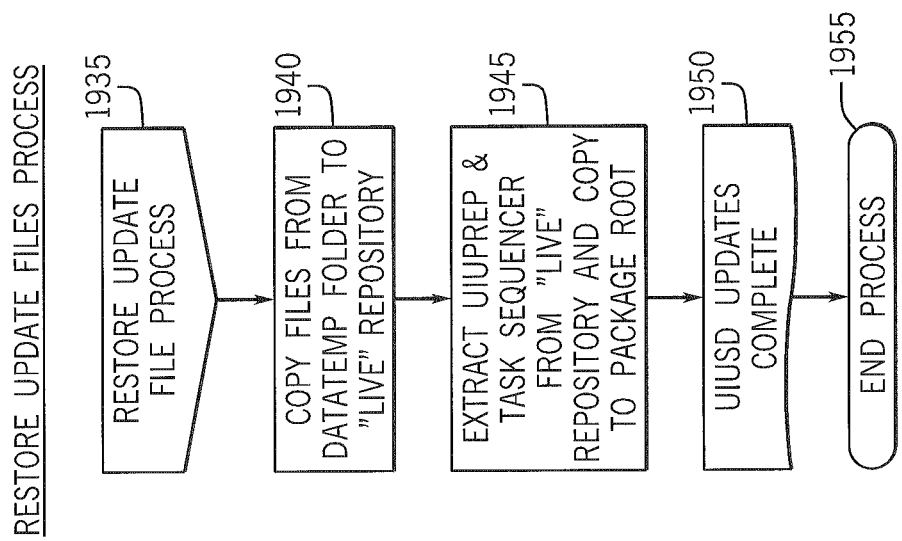
Figure 35:
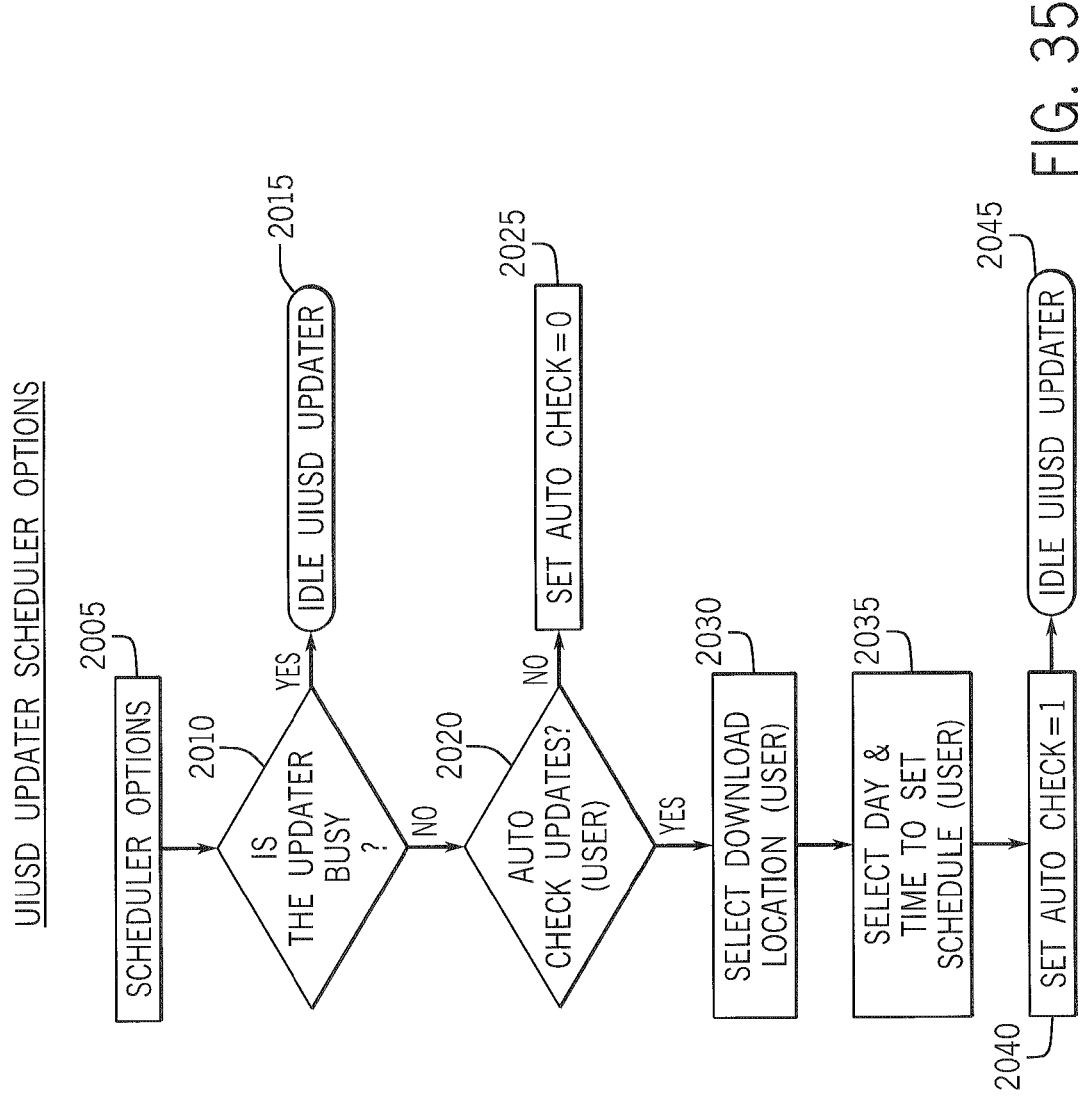
Figure 36:
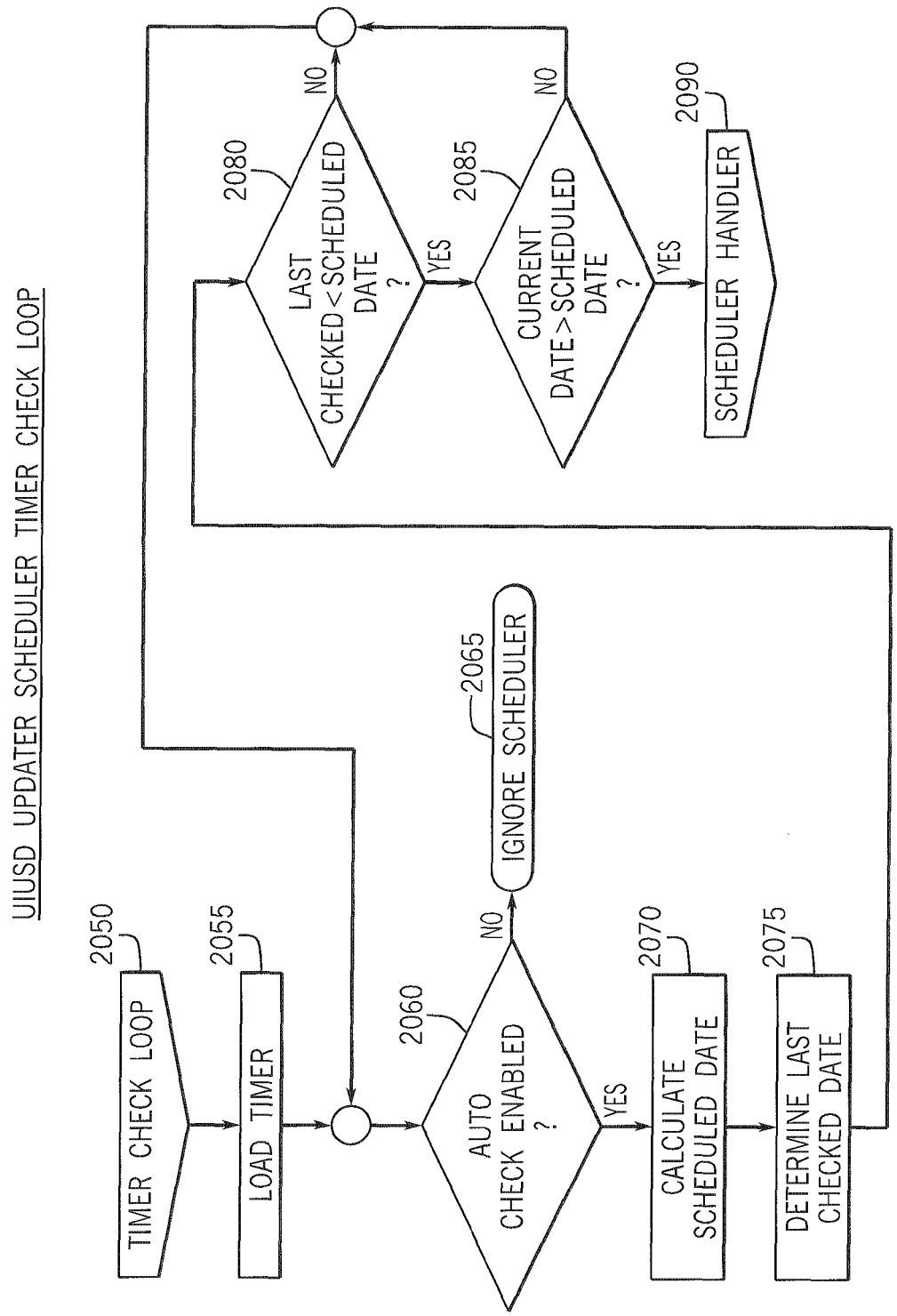
Figure 37:
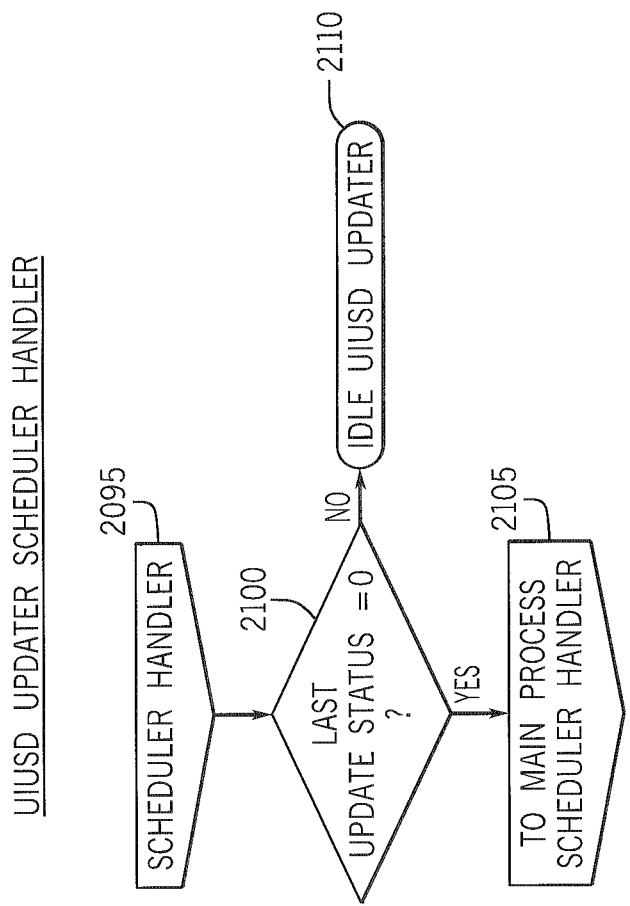
Figure 38:
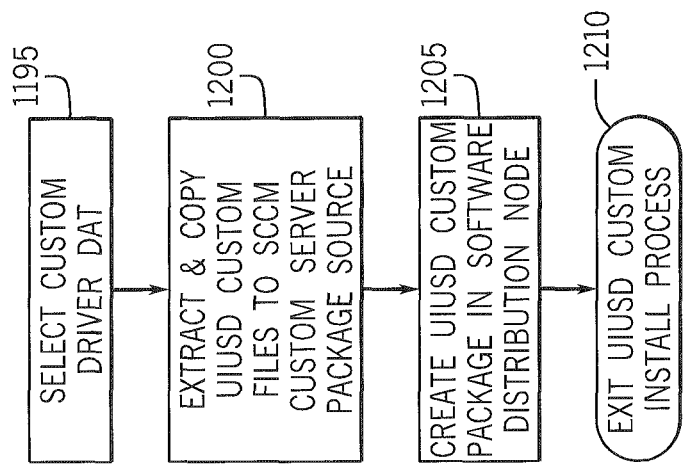
Figure 39:
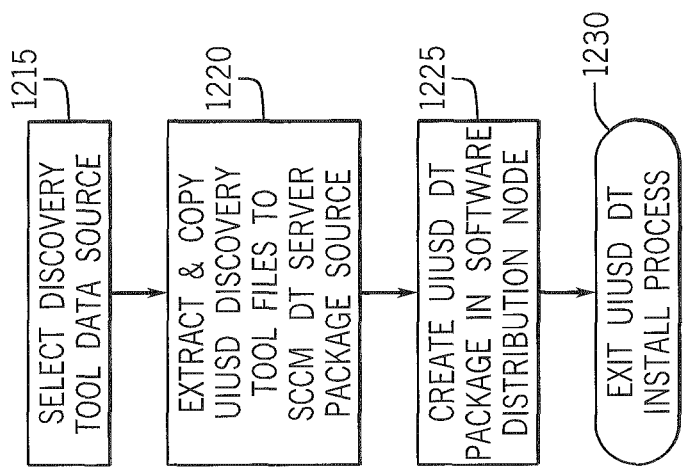

A similar set of processes can be followed in evaluating an EXE UDB after decision 1665 and steps 1690, 1695 and 1700 (which can utilize one or more embodiments shown in FIGS. 29, 31 and/or 33). After setting the Last Update Status to "0" in step 1720, the Update Files Process can be restored at 1725 (e.g., using one or more embodiments shown in FIG. 34). At 1730 updates are checked for again (similar to step 1440 above). The updater then idles at 1735. Scheduling options can be set using one or more embodiments shown in FIG. 35. Moreover, a timer loop or the like can be established for an updater scheduler (e.g. one or more embodiments shown in FIG. 36). FIG. 38 illustrates one or more embodiments of a custom driver package installation process that can be implemented with embodiments herein. FIG. 39 illustrates one or more embodiments of a discovery tool package installation process that also can be implemented with embodiments herein.

Generic Deployment Solution Example

In addition to embodiments used to deploy operating systems in conjunction with SCCM and the like, computer management embodiments of the present invention can be used with various deployment solutions such as Ghost, ImageX, KACE, Acronis and the like. More specifically, in FIG. 40 a UIUSD Toolbox is accessed at 11101 in preparation for use in connection with GhostCast. Unlike SCCM, which includes well-developed structures and processes for constructing a UIUSD Package or the like at SCCM distribution points, applications like GhostCast require the administrator to assist in installing and managing the UIUSD Package and its components. A UIUSD Toolbox can be used, the Toolbox being an application that provides one or more of the following: installing the UIUSD plug-in and all associated components; facilitating the creation of the second communication channel; installing the driver repository and associated components; and facilitating, through one or more automated processes (wizards), the configuration of the UIUSD with respect to specific deployment solutions. For example, in the GhostCast instance, the UIUSD Toolbox application is used to assist an administrator in creating the driver repository (and accompanying second communication channel) as a UNC path to network accessible storage; copying one or more driver databases to the created driver repository; creating a functional WinPE environment; compiling any needed Ghost executable, the WinPE editing utilities and the GhostCast-specific parameters necessary to operate the deployment solution including use of driver repository over the second communication channel. The UIUSD Toolbox then creates the configured WinPE environment as useable media (e.g., bootable DVD, USB, etc.). In the SCCM instance, the UIUSD Toolbox application is used to initiate the installation of the UIUSD plug-in for SCCM, which will, in accordance with Microsoft and SCCM-specific standards, integrate the UIUSD Task into the SCCM framework and prepare the UIUSD driver database as an SCCM package for use within the SCCM distribution network.

At 11102 the Toolbox components (which include the UIUSD Package components including a driver repository) are installed in a storage location 12000 (e.g., the cloud, a network, a disk or storage media of some type), which is analogous to the installation of the UIUSD Package on the automated deployment service of SCCM. In the SCCM setting, SCCM dictates where and how the Toolbox (i.e., the UIUSD Package) is installed. In embodiments pertaining to GhostCast (and other deployment solutions), the Toolbox can instead be installed on an administrator's computer or other machine (e.g., a server, workstation) that is network accessible. In implementing Ghost, ImageX, KACE, Acronis and the like, an administrator can provide conditional implementation and/or features using a graphical user interface (GUI) and/or wizard as part of the Toolbox installation at 11102.

In the GhostCast setting, this storage location can be an administrator's computer or other network-accessible machine. This process is similar to the exemplary execution of the plug-in installer in FIGS. 6-8, above. This storage location 12000 can be modified to permit Universal Naming Convention (UNC) storage (using the UNC allows a target machine to find stored components from anywhere on the subject network). The Microsoft Windows UNC, short for Universal Naming Convention, specifies a common syntax to describe the location of a network resource, such as a shared file, directory, or printer. The UNC syntax for Windows systems has a generic form. Microsoft often refers to this as a "network path."

At 11103 the administrator configures the integration of the UIUSD functions with the relevant deployment solution (e.g., GhostCast). This involves customizing or modifying the Ghost command to include UIUSD and to be executed when the target device boots into the temporary operating system (e.g., WinPE). The administrator can be prompted:

to provide the location of the Windows Assessment and Deployment Kit (WADK);
to provide the location of Ghost executables (e.g., Ghost.exe, Ghost32.exe, Ghost64.exe);
for Ghost arguments (via a GUI, for example); and
network login credentials.

During this deployment solution configuration process a WinPE environment can be created by prompting the administrator for a location to store WinPE files and thereafter to compile a WinPE file and folder structure in a specified location.

As part of this deployment solution integration, a WinPE environment is created by copying the default PE Windows Imaging (WIM) file that typically ships with WADK to a temporary file location to compile a WinPE file and folder structure in that specified location. The WIM file is mounted with ImageX or DISM. Executables, files and a customized StartNet.cmd file are then copied into the WIM. The WIM is then unmounted and is ready for the media creation process that is part of augmentation of the PE "boot image" described in more detail below.

The driver repository that is installed as part of the Toolbox components can then be managed at 11104 as needed. A driver database version can be selected from which drivers will be available after hardware device IDs have been collected for the target device. Selection of the driver database in the Ghost setting can be done in the same way it is done in an SCCM setting, as noted above in connection with FIG. 12. In embodiments using Ghost and/or ImageX, this process can be identical to that used in connection with SCCM (see, e.g., FIG. 12 and associated disclosure).

Custom additions to the driver repository can be included. For example, an O/S agnostic discovery tool executable can generate files that have previously collected hardware IDs (e.g., obtained from arbitrary machines in the environment)—if included, those previously collected hardware IDs are appended to the list of hardware IDs that are discovered in the target device and assembled during UIUPrep in WinPE. In addition, the driver repository management of 11104 can allow for cleaning up and updating the driver database.

At 11105 any imaging solution specific tools can be managed. In the GhostCast example presented here, there are no such solution specific tools so no action is needed.

The final stage in the pre-O/S phase of FIG. 40 is augmenting the WinPE "boot image" at 11106. This step typically is performed independent of the deployment solution being used, so that the administrator essentially "removes" the WinPE boot image from the target device, makes whatever changes are required, then re-introduces the boot image to the target device prior to booting into WinPE. This process begins with the default WinPE environment created during the deployment solution integration process at 11103, above. An administrator can use Microsoft application programming interfaces (APIs) inside a WIM to manipulate the basic WinPE files to include any Toolbox-specific changes identified.

A network driver and/or HDC drivers can be added to allow WinPE to boot on the target device's hardware. WinPE packages and drivers also can be included. Toolbox-specific components for a given solution are also managed and/or implemented, which in the GhostCast example here can include editing the Startup.bat by adding the prepared Ghost command line (with parameters), adding a map command line (netuse) to define the second communication channel used by the target device to communicate with the storage location 12000, adding the driver database version selection (used by UIUPrep), and adding a reboot command to terminate WinPE and boot into a full operating system. Through the process of facilitating configuration changes to new or existing WinPE instances, potential tasks include but are not limited to modifying Sysprep configurations offline, managing or recovering deleted files, managing Windows 8 WindowsToGo implementations, configuring and managing an independent PXE/DHCP environment through a custom Windows Deployment Service (WDS) implementation, and managing Windows BitLocker file encryption implementations.

Part of this process can include creating media for carrying out the required processes. An administrator can be prompted for the media type being used and its location (e.g., a USB device, an ISO, local or network disk, etc.). Required components are compiled from the augmented WinPE boot image in its specified location. Any deployment solution parameters and driver database-specific parameters that were established during the deployment solution integration configuration can also be added. The media is finalized, including any necessary packaging.

Once these pre-O/S phase is completed, the target device can be booted into a temporary operating system (WinPE). The image solution is executed at 11107, for example by applying an O/S. Preparatory processing UIUPrep is run as it is in the SCCM environment (see, e.g., FIGS. 14A-14B and other associated Figures) at 11108, including parsing the Driver.DAT. At 11109 the deployment solution resumes control and completes any needed functions before rebooting the target device at 11110 before Mini-setup is invoked. Rebooting of the target device boots it into the full operating system and the post-deploy processing UIUPD can be executed as it is in the SCCM environment (see, e.g., FIGS. 17A-17B and other associated Figures) at 11111. Once UIUPD has been performed, deployment ends at 11112.

Many features and advantages of the invention are apparent from the written description, and thus, the appended claims are intended to cover all such features and advantages. Further, numerous modifications and changes will readily occur to those skilled in the art, so the present invention is not limited to the exact operation and construction illustrated and described. Therefore, described embodiments are illustrative and not restrictive, and the invention should not be limited to the details given herein but should be defined by the following claims and their full scope of equivalents, whether foreseeable or unforeseeable now or in the future.

What is claimed is:

1. A method for deploying a full operating system to each of a plurality of target devices on a network, the network comprising the plurality of target devices and a deployment device, the method comprising each target device in the plurality of target devices performing the following steps:
   receiving a task sequence from the deployment device;
   executing tasks in the task sequence, execution of the task sequence tasks comprising:
      booting into a temporary operating system;
      performing a preparatory process (UIUPrep) comprising:
         performing a real-time UIUPrep hardware scan in the temporary operating system;
         generating a UIUPrep list of hardware device IDs based on the UIUPrep hardware scan;

comparing the UIUPrep list of hardware device IDs to a plurality of drivers in a driver repository, the driver repository comprising a deployment device memory holding a database containing the plurality of drivers and being accessible to each target device in the plurality of target devices;

receiving a UIUPrep driver set from the driver repository, wherein each driver in the UIUPrep driver set is correlated to at least one of the hardware device IDs in the UIUPrep list; and staging each driver in the UIUPrep driver set;

booting into the full operating system;

installing each driver in the UIUPrep driver set;

performing a post-deploy process (UIUPD) comprising:

performing a real-time UIUPD hardware scan while operating in the full operating system;

generating a UIUPD list of hardware device identifications based on the UIUPD hardware scan, the UIUPD list comprising hardware IDs for hardware devices detected during the UIUPD hardware scan but not found in the UIUPrep hardware scan;

comparing the UIUPD list of hardware device IDs to the plurality of drivers in the driver repository;

receiving a UIUPD driver set from the driver repository, wherein each driver in the UIUPD driver set is correlated to at least one of the hardware device IDs in the UIUPD list; and staging each driver in the UIUPD driver set; and booting into the full operating system and installing each driver in the UIUPD driver set.

2. The method of claim 1 wherein the received task sequence is transmitted from the deployment device using a first channel defined by a systems management software application; and further wherein a second channel is defined by the preparatory process (UIUPrep) and is used for the following:

comparing the UIUPrep list to the plurality of drivers in the driver repository;

delivering the UIUPrep driver set from the driver repository to each target device;

comparing the UIUPD list to the plurality of drivers in the driver repository; and delivering the UIUPD driver set from the driver repository to each target device.

3. The method of claim 2 wherein the second channel comprises:

defining a driver repository storage location accessible by each target device; and defining a communications format between each target device and the defined storage location.

4. The method of claim 2 wherein the systems management software application is Microsoft SCCM.

5. The method of claim 4 further comprising periodically updating the driver repository.

6. The method of claim 2 wherein the temporary operating system is Windows Preinstallation Environment (WinPE).

7. The method of claim 2 wherein the deployment device comprises at least one of the following:

a network server having the driver repository installed thereon;

an SCCM Distribution Point having the driver repository installed thereon.

8. The method of claim 2 wherein the UIUPrep hardware scan and the UIUPD hardware scan is each performed using one or more Windows application programming interfaces (APIs) to generate IDs for hardware devices on each target device.

9. The method of claim 2 wherein the task sequence is administrator-configurable to create instructions to each target device to perform the preparatory process (UIUPrep) during operation in the temporary operating system.

10. The method of claim 2 further comprising repeating the post-deploy process until the real-time hardware scan in the full operating system finds no additional hardware device IDs.

11. The method of claim 2 wherein each target device in the plurality of target devices on the network comprises a different hardware configuration.

12. A method for deploying a full operating system to a target device on a network, the method comprising the target device performing the following steps:

booting into WinPE;

performing a real-time preinstallation hardware scan in WinPE and receiving a plurality of preinstallation drivers from a remote driver repository, wherein each preinstallation driver is correlated to at least one hardware device ID found in the preinstallation hardware scan in WinPE;

booting into the full operating system and installing each preinstallation driver;

performing a real-time post-deploy hardware scan in the full operating system and receiving a plurality of post-deploy drivers from the driver repository, wherein each post-deploy driver is correlated to at least one hardware device ID found in the post-deploy hardware scan in the full operating system; and re-booting into the full operating system and installing each post-deploy driver.

13. The method of claim 12 wherein the target device receives instructions from a deployment device implementing a deployment solution, wherein the instructions are received by the target device prior to booting into WinPE and further wherein the instructions are transmitted to the target device via a first channel established by the deployment solution; and further wherein the preinstallation drivers and post-deploy drivers are sent to the target device from the driver repository using a second channel.

14. The method of claim 13 wherein the driver repository comprises at least one of the following:

a memory installed on the deployment device;

a memory accessed using a Universal Naming Convention storage location;

a memory installed on an SCCM Distribution Point.

15. The method of claim 14 wherein the instructions are administrator-configurable tasks in a task sequence.

16. A method for deploying a full operating system to each of a plurality of target devices on a network, the network comprising the plurality of target devices and a deployment device, the method comprising each target device in the plurality of target devices performing the following steps:

each target device receiving a task sequence, the task sequence being delivered via a first channel to the deployment device and instructing each target device to perform a preparatory process in a preinstallation temporary operating system, the preparatory process comprising:

performing a real-time preinstallation hardware scan of each target device;

generating a preinstallation list of hardware IDs based on the preinstallation hardware scan; and delivering a plurality of preinstallation drivers from a remote driver repository via a second channel, wherein each preinstallation driver is correlated to at least one hardware device ID in the preinstallation list;
booting into the full operating system;
installing each preinstallation driver;
performing a post-deploy process comprising:
   performing a real-time post-deploy hardware scan;
   generating a post-deploy list of hardware device identifications based on the post-deploy hardware scan;
   delivering a plurality of post-deploy drivers from the driver repository via the second channel, wherein each post-deploy driver is correlated to at least one hardware device ID in the post-deploy list; and
booting into the full operating system; and
installing each post-deploy driver.

* * * * *